United States Patent
Liu et al.

(10) Patent No.: US 12,476,500 B2
(45) Date of Patent: Nov. 18, 2025

(54) MOTOR, POWERTRAIN, AND DEVICE

(71) Applicant: Huawei Digital Power Technologies Co., Ltd., Shenzhen (CN)

(72) Inventors: Hongbing Liu, Shanghai (CN); Haisong Xu, Shanghai (CN); Bayaer Eerhemu, Shanghai (CN); Shaobo Yang, Dongguan (CN); Jun Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 260 days.

(21) Appl. No.: 18/321,102

(22) Filed: May 22, 2023

(65) Prior Publication Data
US 2023/0318370 A1      Oct. 5, 2023

Related U.S. Application Data

(63) Continuation of application No. PCT/CN2021/098023, filed on Jun. 2, 2021.

(30) Foreign Application Priority Data

Nov. 25, 2020   (CN) ......................... 202011340779.3

(51) Int. Cl.
*H02K 1/20*   (2006.01)

(52) U.S. Cl.
CPC ..................... *H02K 1/20* (2013.01)

(58) Field of Classification Search
CPC .. H02K 1/20; H02K 3/24; H02K 5/20; H02K 5/203; H02K 9/19; H02K 9/197; H02K 9/193; H02K 9/20
(Continued)

(56) References Cited

U.S. PATENT DOCUMENTS 11,909,262 B2 *   2/2024   Joshi ..................... H02K 1/20
12,166,381 B2 *   12/2024  Andersson ............. H02K 9/19
(Continued)

FOREIGN PATENT DOCUMENTS

CN       108649749 A      10/2018
CN       109617319 A       4/2019
(Continued)

OTHER PUBLICATIONS

CN111509876A Translation (Year: 2020).*
WO2020253321A1 Translation (Year: 2020).*

*Primary Examiner* — Oluseye Iwarere
*Assistant Examiner* — Nicholas Lee Setzer
(74) *Attorney, Agent, or Firm* — Maier & Maier, PLLC

(57) ABSTRACT

A motor, a powertrain, and a device. A plurality of first oil channels are formed between an inner surface of a housing and an outer surface of a stator core, second oil channels are formed at groove roots of coil slots of the stator core, to form double-layer oil channels at the outer surface of the stator core and the root of the coil slot of the stator core, and ensure effective cooling of the stator core and a coil winding. After cooling oil is injected from an oil filling port, a flow direction of the cooling oil in some of the second oil channels is opposite to that of cooling oil in a remaining second oil channel, so that interleaved reverse flows are implemented, and axial temperature of the stator core and the coil winding is more even.

18 Claims, 61 Drawing Sheets

(58) Field of Classification Search
USPC .................................................. 310/58, 59
See application file for complete search history.

(56) References Cited

U.S. PATENT DOCUMENTS

| | | | |
|---|---|---|---|
| 2011/0234029 A1* | 9/2011 | Pal .................. | H02K 9/197 |
| | | | 310/54 |
| 2012/0001504 A1* | 1/2012 | Erfanfar .............. | B60K 6/48 |
| | | | 310/54 |
| 2012/0025638 A1* | 2/2012 | Palafox ............... | H02K 9/10 |
| | | | 310/52 |
| 2012/0080982 A1* | 4/2012 | Bradfield ............. | H02K 9/00 |
| | | | 310/60 A |
| 2017/0047822 A1* | 2/2017 | Horii ................. | H02K 5/203 |
| 2019/0123612 A1* | 4/2019 | Weber ................ | H02K 1/20 |
| 2019/0207439 A1* | 7/2019 | Marino ............... | H02K 1/20 |
| 2020/0280244 A1* | 9/2020 | Payne ................ | H02K 9/197 |

FOREIGN PATENT DOCUMENTS

| | | | | | |
|---|---|---|---|---|---|
| CN | 109698574 | A | | 4/2019 | |
| CN | 110601394 | A | | 12/2019 | |
| CN | 111509876 | A | * | 8/2020 | ............. H02K 9/193 |
| CN | 112615445 | A | | 4/2021 | |
| JP | 5496937 | B2 | | 5/2014 | |
| WO | WO-2020253321 | A1 | * | 12/2020 | ............. H02K 5/203 |

\* cited by examiner

MOTOR, POWERTRAIN, AND DEVICE

CROSS-REFERENCE TO RELATED APPLICATIONS

This application is a continuation of International Application No. PCT/CN2021/098023, filed on Jun. 2, 2021, which claims priority to Chinese Patent Application No. 202011340779.3, filed on Nov. 25, 2020. The disclosures of the aforementioned applications are hereby incorporated by reference in their entireties.

TECHNICAL FIELD

The embodiments may relate to the field of motor technologies, a motor, a powertrain, and a device.

BACKGROUND

A motor is an electromagnetic apparatus that implements conversion or transfer of electrical energy according to a law of electromagnetic induction. A main function of the motor is to generate a driving torque and act as a power source of electric appliances or various machines. With miniaturization of a motor in a powertrain, power density of the motor is gradually increased. With an increase in the power density of the motor, improving heat dissipation efficiency and a heat dissipation capability of the motor becomes an issue to be urgently resolved.

At present, the motor may include a housing, a stator core, a rotor, and a coil winding. Structural members may be disposed at two ends of the stator core, the structural members and the housing may form a sealing cavity body, and the stator core, the rotor, and the coil winding may be located inside the sealing cavity body. A large amount of heat is generated when the motor is running A water cooling or oil cooling manner may be used to dissipate heat of the motor.

However, in the oil cooling manner of the motor, effective heat dissipation cannot be implemented on the stator core and the coil winding in the motor, resulting in a poor heat dissipation effect of a stator and the coil winding. This incurs a risk that overtemperature easily occurs in the coil winding when the motor is in low-speed high-torque and high rotational speed conditions.

SUMMARY

The embodiments may provide a motor, a powertrain, and a device, to form double-layer oil channels at an outer surface of a stator core and a root of a coil slot of the stator core, and ensure effective cooling of the stator core and a coil winding, thereby ensuring a heat dissipation requirement of the motor in low-speed high-torque and high rotational speed conditions, and resolving a problem that overtemperature easily occurs in the coil winding when the motor is in the low-speed high-torque and high rotational speed conditions because of poor heat dissipation of the stator core and the coil winding in the existing motor.

A first aspect of the embodiments may provide a motor, including a housing, where at least a stator is disposed in the housing, the stator includes a stator core and a coil winding, an inner surface of the stator core is provided with a plurality of coil slots disposed at intervals, and the coil winding is partially located inside the coil slots;
  a plurality of first oil channels may be formed between an inner surface of the housing and an outer surface of the stator core, where the plurality of first oil channels may be circumferentially disposed at intervals along a periphery of the stator core, and the oil channels are all connected to an oil filling port provided on the housing;
  second oil channels are formed at slot bottoms of at least some of the coil slots; and
  one end of the plurality of first oil channels is connected to one end of some of the second oil channels, the other end of the some of the second oil channels is connected to nozzles at one end of the motor, the other end of the plurality of first oil channels is connected to one end of a remaining second oil channel, and the other end of the remaining second oil channel is connected to nozzles at the other end of the motor.

The plurality of first oil channels may be formed between the inner surface of the housing and the outer surface of the stator core, the second oil channels are formed at groove roots of the coil slots of the stator core, the first oil channel can cool the outer surface of the stator core, and the second oil channel can dissipate heat around the coil slot of the stator core and heat of the coil winding, to form double-layer oil channels at the outer surface of the stator core and the root of the coil slot of the stator core. The two-layer oil channels may increase a contact area between cooling oil and the stator, thereby significantly improving heat dissipation capabilities of the stator and coils. In addition, one end of the plurality of first oil channels is connected to the some of the second oil channels, the other end of the plurality of first oil channels is connected to the remaining second oil channel, and the second oil channels are connected to the nozzles at the end parts of the motor. After the cooling oil is injected from the oil filling port, a flow direction of the cooling oil in the some of the second oil channels is opposite to that of the cooling oil in the remaining second oil channel, so that interleaved reverse flows are implemented, and axial temperature of the stator core and the coil winding is more even. Therefore, the motor provided in this embodiment ensures effective cooling of the stator core and the coil winding, thereby ensuring a heat dissipation requirement of the motor in low-speed high-torque and high rotational speed conditions, and resolving a problem that overtemperature easily occurs in the coil winding when the motor is in the low-speed high-torque and high rotational speed conditions because of poor heat dissipation of the stator core and the coil winding in the existing motor.

In a possible implementation, the motor further includes a first end cap and a second end cap, where
  the first end cap and the second end cap are respectively located at two ends of the stator core;
  the first end cap is provided with a plurality of first nozzles disposed at intervals, and the second end cap is provided with a plurality of second nozzles disposed at intervals;
  one end of the plurality of first oil channels is connected to one end of the some of the second oil channels through the first end cap, and the other end of the some of the second oil channels is connected to the plurality of second nozzles; and
  the other end of the plurality of first oil channels is connected to one end of the remaining second oil channel through the second end cap, and the other end of the remaining second oil channel is connected to the plurality of first nozzles.

In a possible implementation, a third oil channel is formed between the first end cap and one end face of the stator core; a fourth oil channel is formed between the second end cap and the other end face of the stator core;

one end of the plurality of first oil channels is connected to one end of the some of the second oil channels through the third oil channel, and the other end of the plurality of first oil channels is connected to one end of the remaining second oil channel through the fourth oil channel; and the first nozzle is spaced from the third oil channel and is connected to the fourth oil channel, and the second nozzle is spaced from the fourth oil channel and is connected to the third oil channel. By using the third oil channel and the fourth oil channel, a flow mixing function of the cooling oil is implemented at the third oil channel and the fourth oil channel, and flows of the cooling oil are circumferentially distributed more evenly, so that unevenness of circumferential temperature of the stator is reduced, and even heat dissipation is circumferentially implemented on the stator.

In a possible implementation, the first end cap includes at least a first annular end plate, and the third oil channel is formed between the first annular end plate and one end face of the stator core; and the second end cap includes at least a second annular end plate, and the fourth oil channel is formed between the second annular end plate and the other end face of the stator core.

In a possible implementation, the plurality of first nozzles may be circumferentially disposed at intervals along the first annular end plate; and the plurality of second nozzles may be circumferentially disposed at intervals along the second annular end plate. In this way, the cooling oil sprayed out from the plurality of first nozzles can circumferentially perform even heat dissipation on a first end part of the coil winding, and the cooling oil sprayed out from the plurality of second nozzles can circumferentially perform even heat dissipation on a second end part of the coil winding.

In a possible implementation, orthographic projections of the plurality of second nozzles towards the first annular end plate and the plurality of first nozzles are circumferentially arranged alternately on the first annular end plate.

In a possible implementation, an inner edge of the first annular end plate is provided with a plurality of first separation blocks disposed at intervals, one end of the first separation block abuts on one end face of the stator core, the first separation block is provided with the first nozzle, and the first nozzle is separated from the third oil channel by using the first separation block; and an inner edge of the second annular end plate is provided with a plurality of second separation blocks disposed at intervals, one end of the second separation block abuts on the other end face of the stator core, the second separation block is provided with the second nozzle, and the second nozzle is separated from the fourth oil channel by using the second separation block.

In a possible implementation, the first separation block is provided with a first recessed portion, and the first nozzle is located at the first recessed portion; and the second separation block is provided with a second recessed portion, and the second nozzle is located at the second recessed portion.

In a possible implementation, the first end cap further includes an axially protruded first extension plate connected to an outer edge of the first annular end plate, and the second end cap further includes an axially protruded second extension plate connected to an outer edge of the second annular end plate;

a first oil injection chamber is formed between an outer surface of the first extension plate and the housing, and the first extension plate is provided with a third nozzle connected to the first oil injection chamber;

a second oil injection chamber is formed between an outer surface of the second extension plate and the housing, and the second extension plate is provided with a fourth nozzle connected to the second oil injection chamber; and both the first oil injection chamber and the second oil injection chamber are connected to the oil filling port.

In a possible implementation, both the first extension plate and the second extension plate are of annular structures, and both the first oil injection chamber and the second oil injection chamber are annular chambers.

In a possible implementation, both the first extension plate and the second extension plate are arc segments, and the first extension plate and the second extension plate are located at top outer edges of the first annular end plate and the second annular end plate, respectively.

In a possible implementation, a plurality of first through grooves and a plurality of second through grooves are provided on the outer surfaces of the first extension plate and the second extension plate, respectively;

two ends of the plurality of first through grooves are connected to the first oil injection chamber and one end of the plurality of first oil channels, respectively; and two ends of the plurality of second through grooves are connected to the second oil injection chamber and the other end of the plurality of first oil channels, respectively.

In a possible implementation, a fifth oil channel is disposed in the housing, and the fifth oil channel is connected to all of the oil filling port, the first oil injection chamber, and the second oil injection chamber. In this case, the first oil injection chamber and the second oil injection chamber are connected to the oil filling port through the fifth oil channel in the housing. The cooling oil enters the first oil injection chamber and the second oil injection chamber through the fifth oil channel in the housing and cools the first end part and the second end part of the coil winding. This shortens a flow path of the cooling oil when the cooling oil cools the first end part and the second end part of the coil winding, thereby achieving relatively desirable heat dissipation for the first end part and the second end part of the coil winding.

In a possible implementation, the first end cap further includes an axially protruded first extension plate connected to an outer edge of the first annular end plate, and the second end cap further includes an axially protruded second extension plate connected to an outer edge of the second annular end plate;

a first oil injection chamber is formed between an outer surface of the first extension plate and the housing, and the first extension plate is provided with the plurality of first nozzles connected to the first oil injection chamber; and a second oil injection chamber is formed between an outer surface of the second extension plate and the housing, and the second extension plate is provided with the plurality of second nozzles connected to the second oil injection chamber.

In a possible implementation, a plurality of sixth oil channels may be disposed in the first annular end plate, and two ends of the plurality of sixth oil channels are connected to the first oil injection chamber and the some of the second oil channels, respectively; and a plurality of seventh oil channels may be disposed in the second annular end plate, and two ends of the plurality of seventh oil channels are connected to the second oil injection chamber and the remaining second oil channel, respectively.

In a possible implementation, a plurality of first grooves may be provided on the outer surface of the first extension plate, and two ends of the first groove are connected to the sixth oil channel and the first oil injection chamber, respectively; and a plurality of second grooves may be provided on the outer surface of the second extension plate, and two ends of the second groove are connected to the seventh oil channel and the second oil injection chamber, respectively.

In a possible implementation, oil outlet ports are respectively provided on groove walls that are of the first groove and the second groove and that are close to the stator core, the oil outlet port on the first groove is connected to the sixth oil channel, and the oil outlet port on the second groove is connected to the seventh oil channel;

surfaces that are of the first annular end plate and the second annular end plate and that face the stator core are respectively provided with a plurality of first separation blocks disposed at intervals and a plurality of second separation blocks disposed at intervals, a first oil inlet port connected to the sixth oil channel is provided on the first separation block, and a second oil inlet port connected to the seventh oil channel is provided on the second separation block;

the plurality of sixth oil channels may be connected to the some of the second oil channels through the first oil inlet port; and the plurality of seventh oil channels may be connected to the remaining second oil channel through the second oil inlet port.

In a possible implementation, a third groove is provided on the outer surface of the first extension plate, and the first oil injection chamber is enclosed by the third groove and the inner surface of the housing; and a fourth groove is provided on the outer surface of the second extension plate, and the second oil injection chamber is enclosed by the fourth groove and the inner surface of the housing.

In a possible implementation, a plurality of oil grooves may be provided on the outer surface of the stator core, the plurality of oil grooves may be circumferentially disposed at intervals along the periphery of the stator core, and two ends of each oil groove extend to two end faces of the stator core; and the first oil channel is enclosed by the oil groove and the inner surface of the housing.

In a possible implementation, groove bottoms of at least some of the oil grooves are uneven and arcuate groove bottoms.

In a possible implementation, the plurality of oil grooves may be even in groove widths, the plurality of oil grooves may be different in groove widths, or groove widths of some of the plurality of oil grooves are greater than a groove width of a remaining oil groove.

In a possible implementation, a plurality of first bumps disposed at intervals may be provided at an outer edge of a surface that is of the first end cap and that faces the stator core, the plurality of first bumps may be circumferentially disposed along the outer edge of the first end cap, and one end of the first bump may abut on one end face of the stator core;

a plurality of second bumps disposed at intervals may be provided at an outer edge of a surface that is of the second end cap and that faces the stator core, the plurality of second bumps may be circumferentially disposed along the outer edge of the second end cap, and one end of the second bump may abut on the other end face of the stator core; and the first bump and the second bump are respectively staggered from two ends of the first oil channel in a circumferential direction.

In a possible implementation, the nozzle is of a flat structure or the nozzle is of a circular structure.

In a possible implementation, the nozzle is an inclined nozzle that inclines towards a direction of the coil winding.

In a possible implementation, fifth grooves are provided at the slot bottoms of the at least some of the coil slots, an insulation layer is disposed in the coil slot, and the coil winding is insulated from the stator core by using the insulation layer; and the second oil channel is enclosed by the fifth groove and some of the insulation layers.

In a possible implementation, a notch width of the fifth groove is a, a slot bottom width of the coil slot is b, and a is less than b.

In a possible implementation, a groove bottom width of the fifth groove is c, and c is greater than a.

A second aspect of the embodiments may provide a powertrain, including at least a reducer and the motor according to any one of the foregoing implementations. The motor is connected to the reducer through a rotating shaft. The motor is included, so that double-layer oil channels are formed at an outer surface of a stator core and a root of a coil slot of the stator core. In this way, a first oil channel can cool the outer surface of the stator core, and a second oil channel can dissipate heat around the coil slot of the stator core and heat of a coil winding. After cooling oil is injected from an oil filling port, a flow direction of the cooling oil in some of second oil channels is opposite to that of cooling oil in a remaining second oil channel, so that interleaved reverse flows are implemented, and axial temperature of the stator core and the coil winding is more even. This ensures effective cooling of the stator core and the coil winding, thereby ensuring a heat dissipation requirement of the motor in low-speed high-torque and high rotational speed conditions. In addition, the powertrain can be miniaturized, and a desirable heat dissipation capability of the powertrain is ensured, thereby improving performance of the powertrain.

A third aspect of the embodiments may provide a device, including at least a wheel, a transmission component, and the motor according to any one of the foregoing implementations. The motor is connected to the wheel through the transmission component. The motor is included, so that double-layer oil channels are formed at an outer surface of a stator core and a root of a coil slot of the stator core. In this way, a first oil channel can cool the outer surface of the stator core, and a second oil channel can dissipate heat around the coil slot of the stator core and heat of a coil winding. After cooling oil is injected from an oil filling port, a flow direction of the cooling oil in some of second oil channels is opposite to that of cooling oil in a remaining second oil channel, so that interleaved reverse flows are implemented, and axial temperature of the stator core and the coil winding is more even. This ensures effective cooling of the stator core and the coil winding, thereby ensuring a heat dissipation requirement of the motor in low-speed high-torque and high rotational speed conditions and ensuring desirable working performance of the device in different working conditions.

DETAILED DESCRIPTION OF THE EMBODIMENTS

Figure 1:
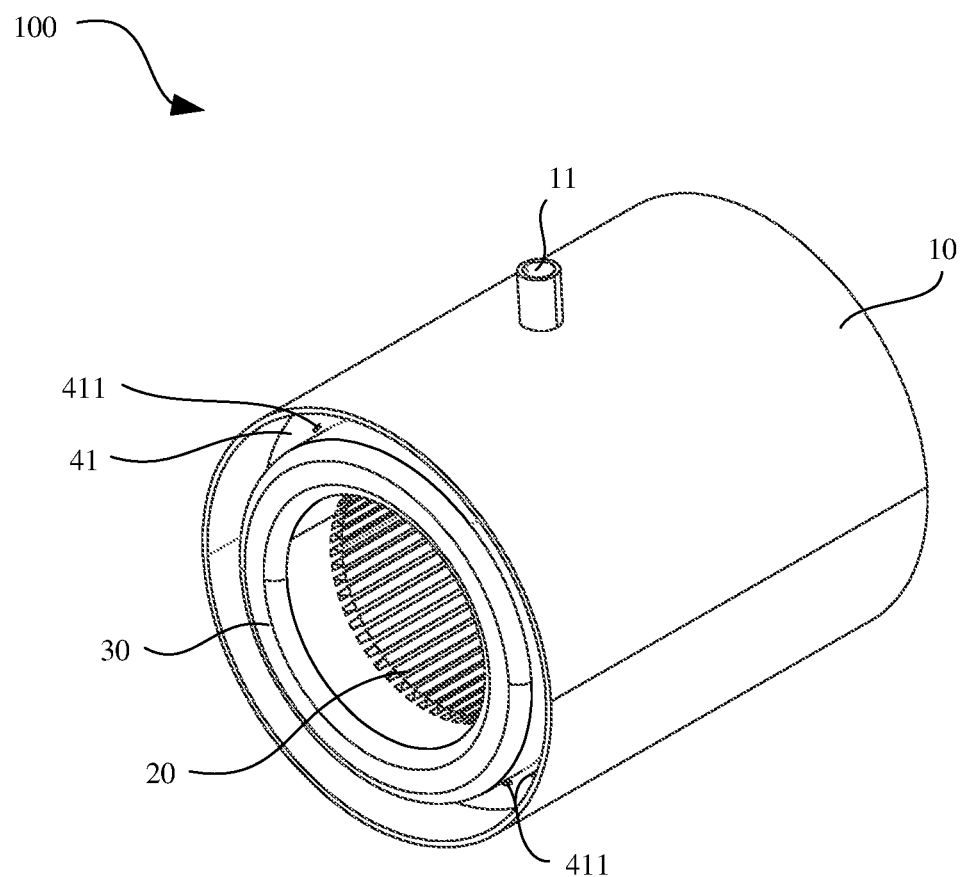
FIG. 1 is a schematic diagram of a motor according to an embodiment.

Terms used in the embodiments are merely used to describe but are not intended to limit.

A large amount of heat may be generated when a motor is running. To cool the motor, an oil channel may be provided on an outer surface of a stator core in the motor, and the stator core is cooled by using the oil channel; or an oil channel is provided in a coil winding in the motor, and the coil winding is cooled by using the oil channel in the coil winding.

Driven by markets, powertrains develop towards miniaturization. To keep same power as an original powertrain, a highest rotational speed and current density of a motor in a miniaturized powertrain need to be further increased. However, an increase in the highest rotational speed leads to an increase in a loss of a stator core, and an increase in the current density leads to a significant increase in a loss of coils. With an existing heat dissipation capability, at low-speed high-torque conditions, a coil winding is at an overtemperature risk due to the increase in the current density, while at a high speed, the increase in the loss of the stator core causes the middle of the coils (that is, a part of the coil winding located in a coil slot of the stator core) to be at an overtemperature risk. Consequently, an existing motor cooling manner may restrict miniaturization of the powertrain.

To resolve the foregoing problem, an embodiment may provide a motor. A plurality of first oil channels 101 may be formed between an inner surface 12 of a housing 10 in the motor 100 and an outer surface of a stator core 20, second oil channels 102 are formed at groove roots of coil slots 23 of the stator core 20, the first oil channel 101 can cool the outer surface of the stator core 20, and the second oil channel 102 can directly dissipate heat around the coil slot 23 of the stator core 20 and heat of a coil winding 30, to form double-layer oil channels at the outer surface of the stator core 20 and the root of the coil slot 23 of the stator core 20. The two-layer oil channels may increase a contact area between cooling oil and a stator, thereby significantly improving heat dissipation capabilities of the stator and coils. In addition, one end of the plurality of first oil channels 101 is connected to some of the second oil channels 102, the other end of the plurality of first oil channels 101 is connected to a remaining second oil channel 102, and the second oil channels 102 are connected to nozzles at end parts of the motor 100. After the cooling oil is injected from an oil filling port, a flow direction of the cooling oil in the some of the second oil channels 102 is opposite to that of the cooling oil in the remaining second oil channel 102, so that interleaved reverse flows are implemented, and axial temperature of the stator core 20 and the coil winding 30 is more uniform. Therefore, the motor 100 provided in this embodiment may ensure effective cooling of the stator core 20 and the coil winding 30, thereby ensuring a heat dissipation requirement of the motor 100 in low-speed high-torque and high rotational speed conditions, and resolving a problem that overtemperature easily occurs in the coil winding 30 when the motor 100 is in the low-speed high-torque and high rotational speed conditions because of poor heat dissipation of the stator core 20 and the coil winding 30 in the existing motor 100.

This embodiment may provide the motor 100. The motor 100 can be applied to an electric vehicle (EV), a pure device (Pue. Electric Vehicle/Battery Electric Vehicle), a hybrid electric vehicle (HEV), a range extended electric vehicle (REEV), a plug-in hybrid electric vehicle (PHEV), a new energy vehicle, a battery management device, a motor & driver, a power converter, a reducer, and the like.

Figure 2:
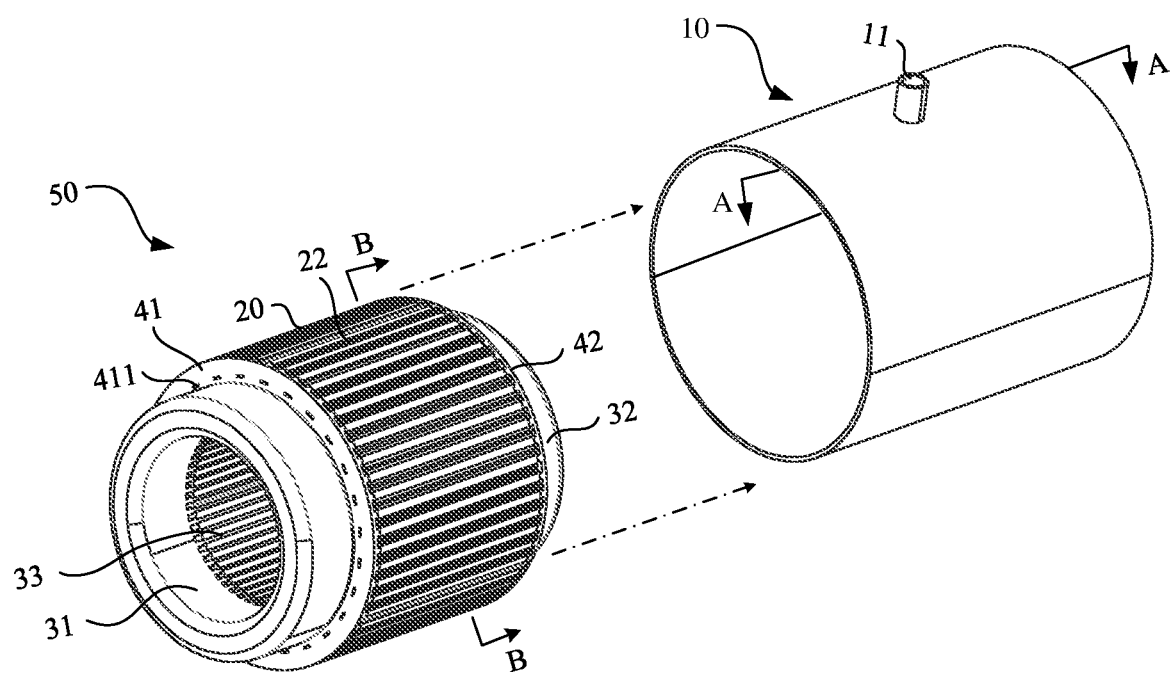
FIG. 2 is a schematic diagram of a partial split structure of a motor according to an embodiment.

In this embodiment, referring to FIG. 1 and FIG. 2, the motor 100 includes the housing 10, a rotor (not shown) and a stator 50 are disposed in the housing 10, the stator 50 is sheathed on a periphery of the rotor, the stator 50 includes the stator core 20 and the coil winding 30, and the coil winding 30 is wound around the stator core 20.

Figure 3A:
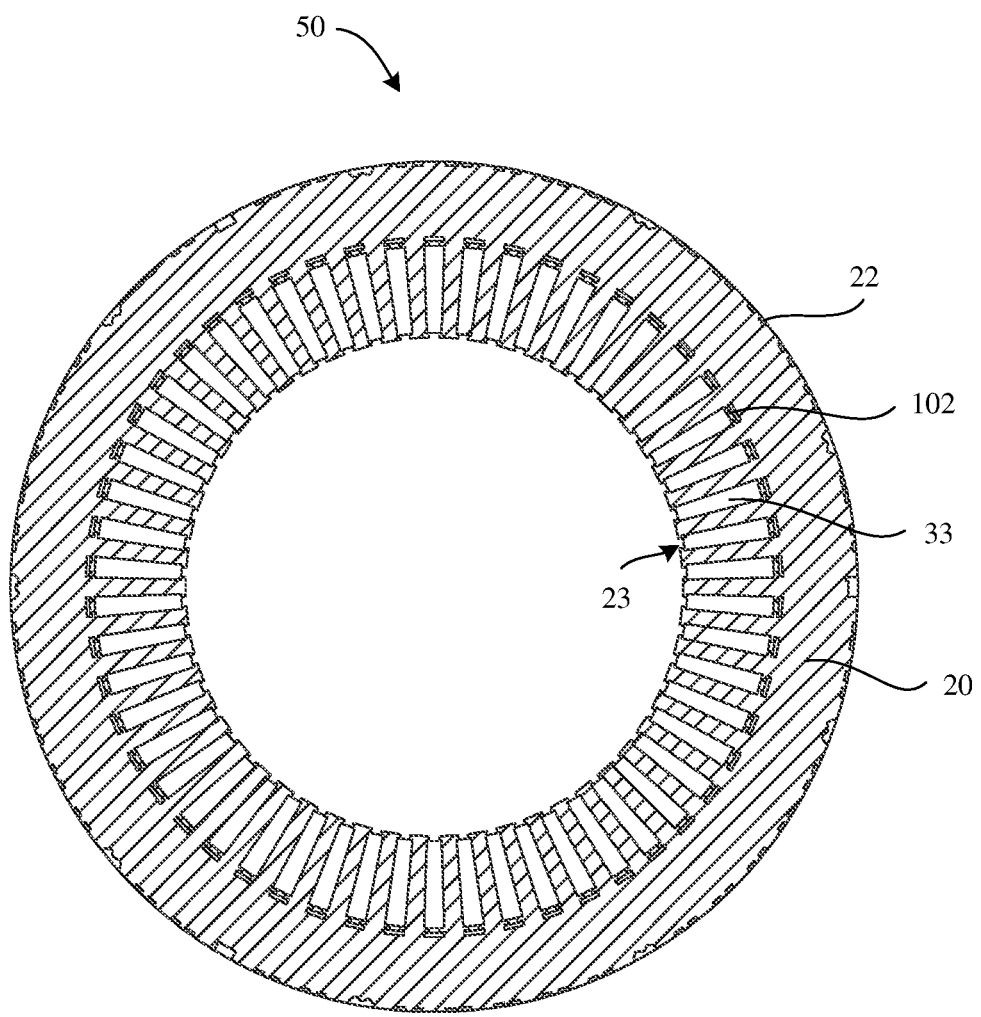
FIG. 3A is a schematic diagram of a cross-section of a stator in FIG. 2 along a B-B direction.

When the coil winding 30 is wound around the stator core 20, referring to FIG. 3A, a plurality of coil slots 23 may be evenly distributed on an inner surface of the stator core 20 in a circumferential direction, the plurality of coil slots 23 may be disposed at intervals, and the coil winding 30 may be wound around the stator core 20 through the coil slots 23.

When the coil winding 30 is wound in the coil slots 23 of the stator core 20, two end parts of the coil winding 30 extend outwardly from two ends of the stator core 20 (refer to FIG. 2). In other words, an axial length of the coil winding 30 may be greater than that of the stator core 20. In this embodiment, the end parts of the coil winding 30 are two ends of the coil winding 30 that extend from the two ends of the stator core 20. For example, in FIG. 2, the coil winding 30 includes middle coils 33 located in the coil slot 23, and a first end part 31 and a second end part 32 that extend from the coil slot 23. Then, referring to FIG. 3A, the middle coils 33 of the coil winding 30 are located in the coil slot 23.

In this embodiment, to input the cooling oil into the motor 100 to dissipate heat of the stator core 20 and the coil winding 30, referring to FIG. 2, the oil filling port 11 is provided on the housing 10, and the cooling oil is injected from the oil filling port 11 into the oil channels in the motor 100. It should be noted that a structure of the oil filling port 11 includes, but is not limited to, the structure shown in FIG. 2. In actual application, when the oil filling port 11 is provided on the housing 10, the oil filling port 11 is flush with an outer surface of the housing 10. In other words, a hole depth of the oil filling port 11 is consistent with a wall thickness of the housing 10.

Figure 3B:
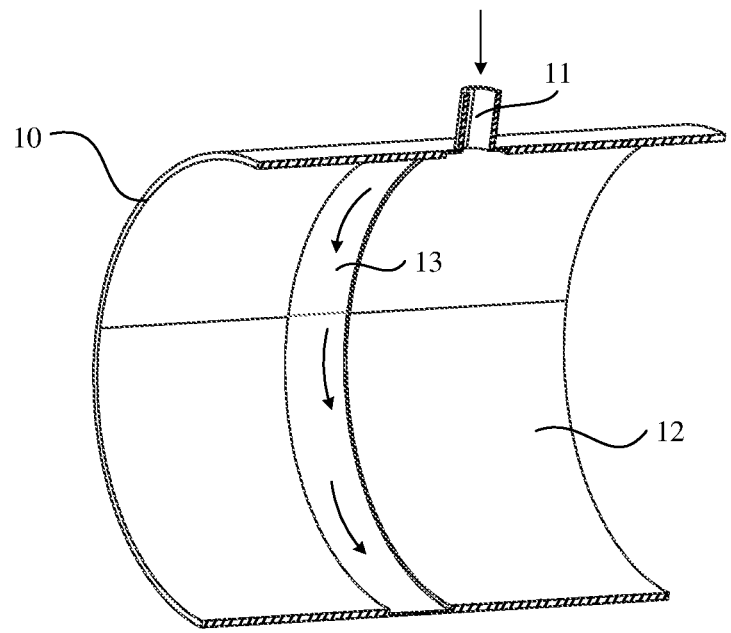
FIG. 3B is a schematic diagram of a cross-section in FIG. 2 along an A-A direction of a stator in FIG. 2.

To allow the cooling oil injected from the oil filling port 11 to flow to the oil channels in the motor 100, referring to FIG. 3B, the inner surface 12 of the housing 10 is provided with a connecting groove 13 along a circumferential direction of the housing 10, and the connecting groove 13 is connected to the oil filling port 11. In this way, the coolant injected from the oil filling port 11 can circumferentially flows in the housing 10 through the connecting groove 13, and after the cooling oil is injected from the oil filling port 11, the cooling oil can be diffused to each circumferential location of the outer surface of the stator core 20 through the connecting groove.

Figure 4A:
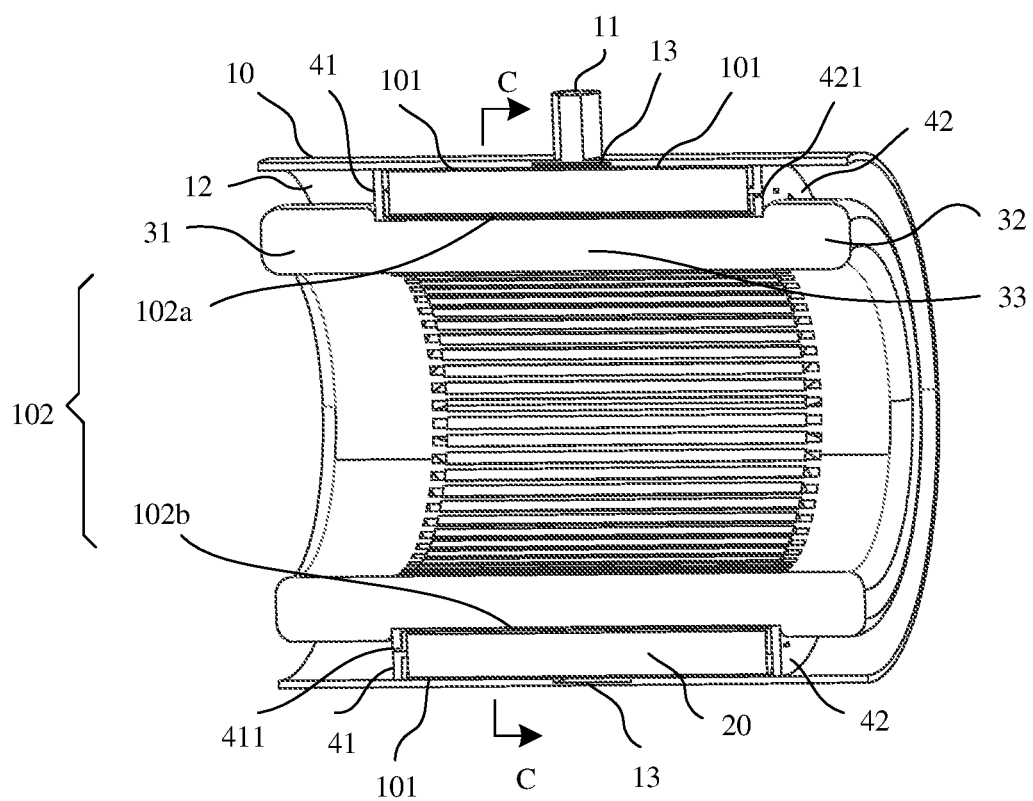
FIG. 4A is a cross-sectional view of a motor according to an embodiment.

In this embodiment, to cool the outer surface of the stator core 20 by using the cooling oil, referring to FIG. 4A, the plurality of first oil channels 101 may be formed between the inner surface 12 of the housing 10 and the outer surface of the stator core 20, and the plurality of first oil channels 101 may be circumferentially disposed at intervals along a periphery of the stator core 20. For example, the plurality of first oil channels 101 may be circumferentially disposed at intervals on the outer surface of the stator core 20. Through the connecting groove 13, the plurality of first oil channels 101 may be connected to the oil filling port 11 provided on the housing 10. In this way, after the cooling oil is injected from the oil filling port 11, the cooling oil can be diffused to each first oil channel 101 through the connecting groove 13. Therefore, the cooling oil in the first oil channels 101 can cool the outer surface of the stator core 20.

To also cool the coil winding 30 and the inner surface of the stator core 20, referring to FIG. 2 and FIG. 4A, the second oil channels 102 are formed at slot bottoms of the coil slots 23 of the stator core 20. It should be noted that the plurality of coil slots 23 may be circumferentially disposed at intervals along the inner surface of the stator core 20, and the second oil channels 102 may be formed at the slot bottoms of all the coil slots 23, or second oil channels 102 may be formed at slot bottoms of some of the coil slots 23 and no second oil channel 102 may be formed at slot bottoms of some other coil slots 23. Therefore, the second oil channels 102 may be formed at slot bottoms of at least some of the coil slots 23. In this embodiment, to dissipate heat of the coil winding 30 in each coil slot 23, the second oil channels 102 (refer to FIG. 3A) are formed at the slot bottoms of all the coil slots 23, and the plurality of second oil channels 102 may be circumferentially disposed at intervals along the inner surface of the stator core 20. In this way, the cooling oil entering the second oil channels 102 can dissipate heat of the middle coils 33 of the coil winding 30 and a region that is of the stator core 20 and that is close to the second oil channels 102.

To make the cooling oil in the first oil channel 101 enter the second oil channel 102, the first oil channel 101 and the second oil channel 102 need to be connected to each other. In this embodiment, to implement axial even heat dissipation on the coil winding 30 and the stator core 20, one end of the plurality of first oil channels 101 is connected to one end of the some of the second oil channels 102, and the other end of the some of the second oil channels 102 is connected to nozzles at one end of the motor 100. For example, referring to FIG. 4A, the cooling oil may enter the some of the second oil channels 102 (for example, a second oil channel 102a) from a left end of the first oil channel 101, and may be sprayed out from the nozzles (for example, a second nozzle 421) at one end of the motor 100 after passing through the second oil channel 102. The other end of the plurality of first oil channels 101 is connected to one end of the remaining second oil channel 102, and the other end of the remaining second oil channel 102 is connected to nozzles at the other end of the motor 100. For example, the cooling oil may enter the remaining second oil channel 102 (for example, a second oil channel 102b) from a right end of the first oil channel 101, and may be sprayed out from the nozzles (for example, a first nozzle 411) at the other end of the motor 100 after passing through the remaining second oil channel 102.

It should be noted that, when the cooling oil is injected from the oil filling port 11, the cooling oil may be under pressure. Therefore, the cooling oil is sprayed out from the first nozzle 411 and the second nozzle 421 to the first end part 31 and the second end part 32 of the coil winding 30 with a pressure.

Figure 4B:
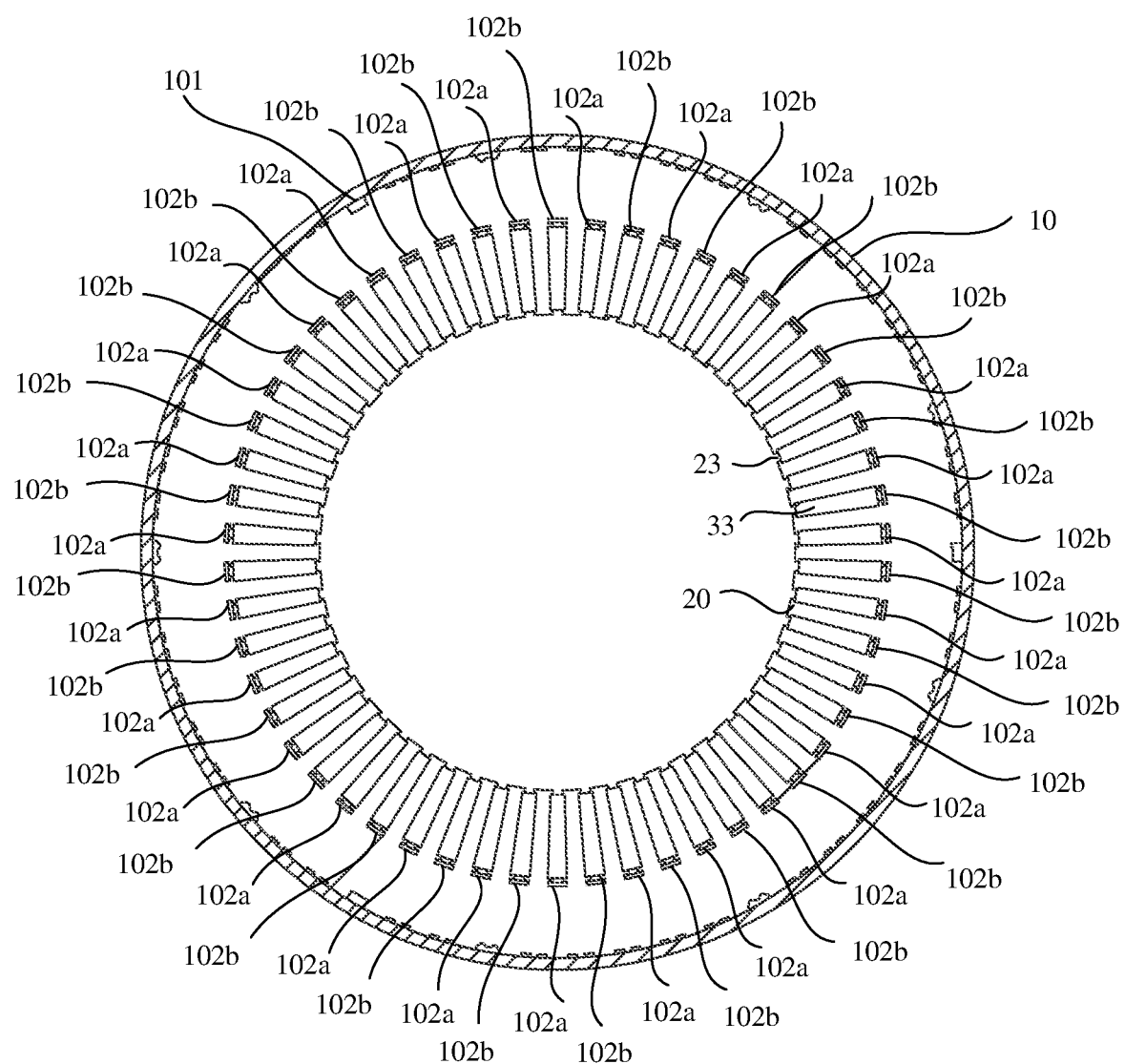
FIG. 4B is a schematic diagram of a cross-section of a motor along a C-C direction in FIG. 4A according to an embodiment.
Figure 5:
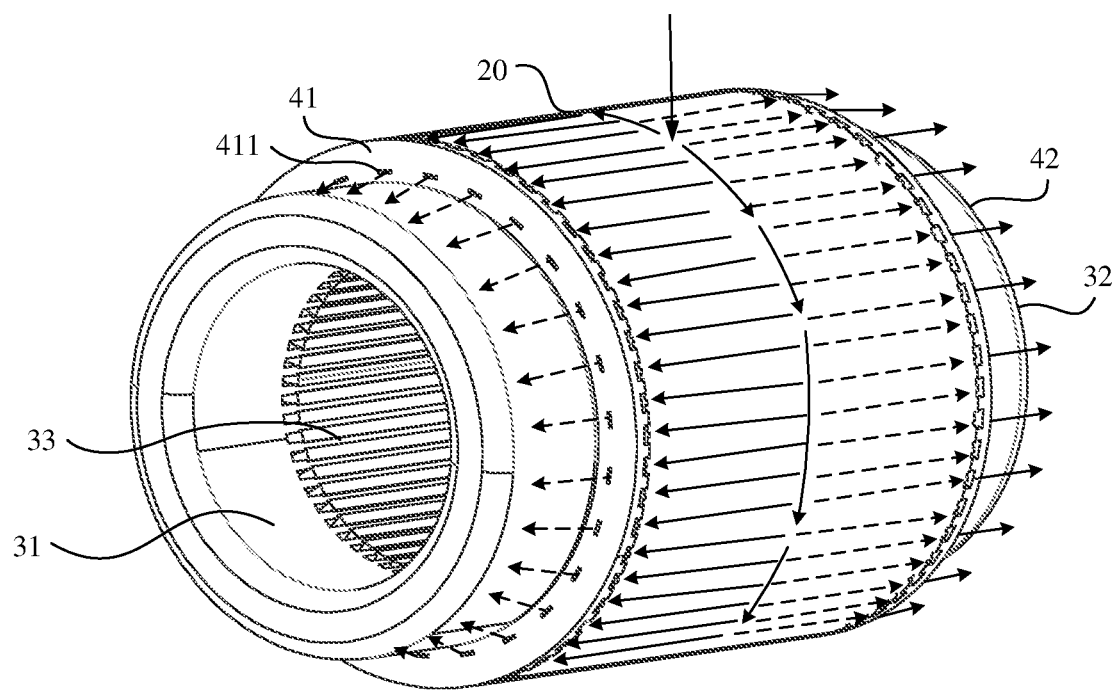
FIG. 5 is a schematic diagram of flow directions of cooling oil on a motor according to an embodiment.
Figure 6:
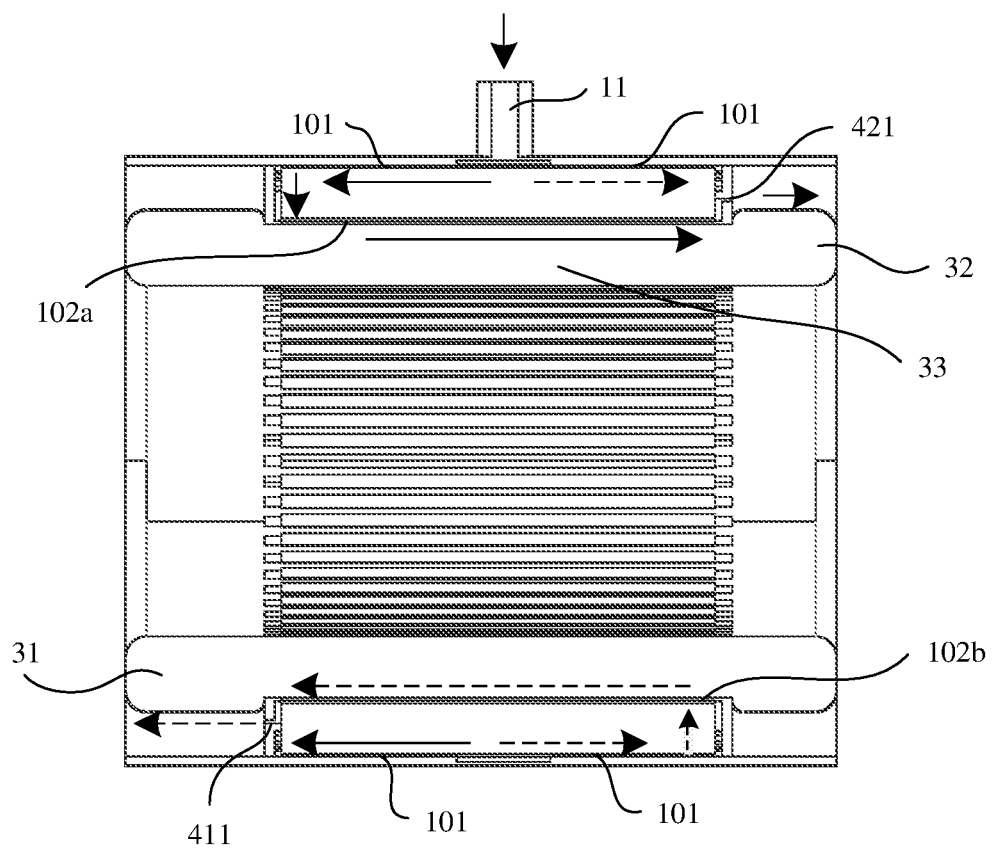
FIG. 6 is a schematic diagram of flow directions of cooling oil in the structure shown in FIG. 4.

In this embodiment, distribution of second oil channels 102a and second oil channels 102b is shown in FIG. 4B, and a plurality of second oil channels 102a and a plurality of second oil channels 102b are alternately disposed at intervals along an axial direction of the stator core 20. Then, referring to FIG. 5, after entering the first oil channels 101, the cooling oil separately flows to two ends of the first oil channels 101 along solid arrows and dashed arrows. FIG. 6 is a schematic diagram of cutting the stator along one of the second oil channels 102a at a top of the stator. Referring to FIG. 6, the cooling oil enters the plurality of second oil channels 102a from one end of the plurality of first oil channels 101 (refer to solid arrows in FIG. 6), and the cooling oil enters the plurality of second oil channels 102b from the other end of the plurality of first oil channels 101 (refer to dashed arrows in FIG. 6). A flow direction of the cooling oil in the plurality of second oil channels 102a is opposite to that of the cooling oil in the plurality of second oil channels 102b (refer to the solid arrows and the dashed arrows in FIG. 6), so that interleaved reverse flows are implemented. In this way, the cooling oil can separately flow to the two end parts of the coil winding 30, thereby implementing even heat dissipation on the two end parts of the coil winding 30.

When the cooling oil in the second oil channels 102a and the cooling oil in the second oil channels 102b are sprayed out from nozzles on different sides, referring to FIG. 6, the cooling oil in the second oil channels 102a is sprayed out from the second nozzle 421 to the second end part 32 of the coil winding 30. There may be a plurality of second nozzles 421. Referring to the solid arrows on a right side in FIG. 5, the cooling oil is sprayed out from the second nozzles 421 to the second end part 32 of the coil winding 30. The cooling oil in the plurality of second oil channels 102b is sprayed out from the first nozzle 411 to the first end part 31 of the coil winding 30. Referring to FIG. 5, there may be a plurality of first nozzles 411. Referring to the dashed arrows on a left side in FIG. 5, the cooling oil is sprayed out from the plurality of first nozzles 411 to the first end part 31 of the coil winding 30.

Therefore, in this embodiment, the interleaved reverse flows of the cooling oil in the plurality of second oil channels 102 ensure that the cooling oil sprayed out from the first nozzles 411 and the second nozzles 421 can respectively cool the first end part 31 and the second end part 32 of the coil winding 30. In this way, the cooling oil in the first oil channels 101 implements effective heat dissipation on the outer surface of the stator core, and the cooling oil in the second oil channels 102 implements effective heat dissipation on an inner side of the stator core 20 and the middle coils 33 of the coil winding 30. In addition, the interleaved reverse flows of the cooling oil in the second oil channels 102 implements heat dissipation on the two end parts of the coil winding 30. Finally, not only effective heat dissipation is implemented on the stator, but also axial even heat dissipation is ensured for the stator. This avoids a risk that overtemperature occurs because of poor partial heat dissipation of the coil winding 30 and the stator core 20.

It should be noted that in some examples, distribution of the plurality of second oil channels 102a and the plurality of second oil channels 102b includes, but is not limited to, the structure shown in FIG. 4B. For example, two or more second oil channels 102b may be distributed between two adjacent second oil channels 102a. An arrangement manner may be: a second oil channel 102a, a second oil channel 102b, a second oil channel 102b, a second oil channel 102a, a second oil channel 102b, and a second oil channel 102b.

Figure 7:
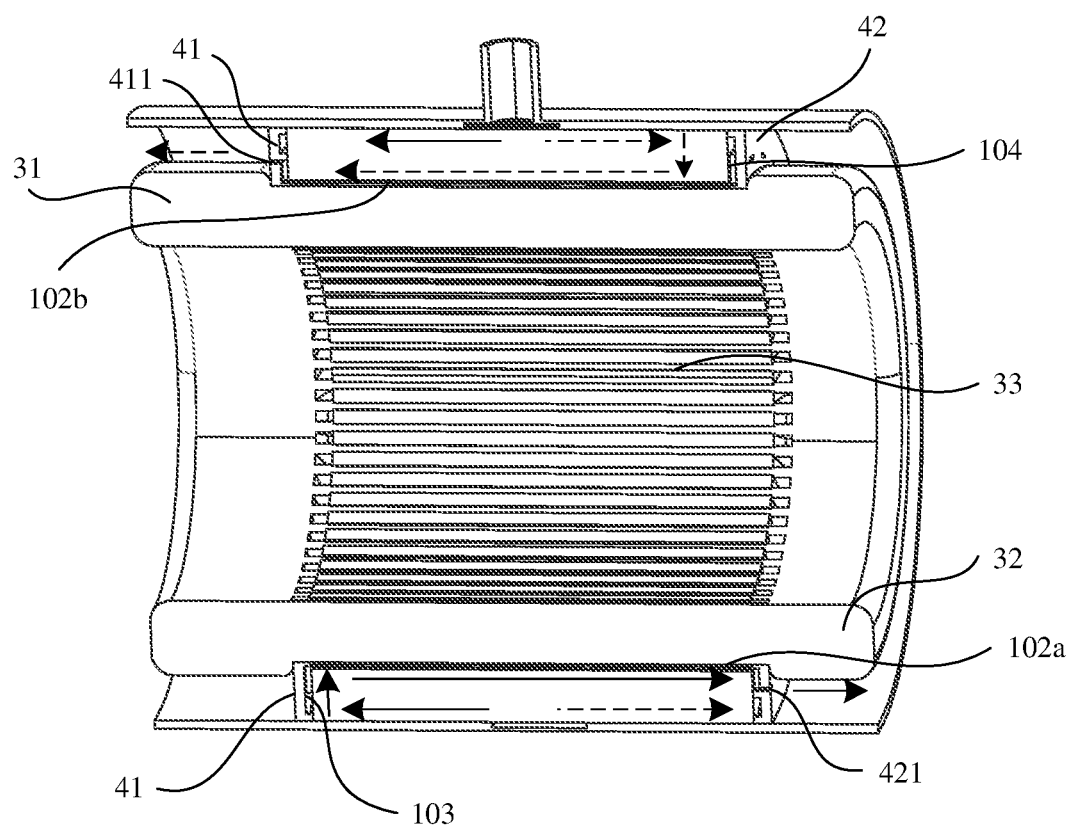
FIG. 7 is a cross-sectional view of a motor in another direction according to an embodiment.

FIG. 7 is a schematic diagram when a second oil channel 102b is cut along the top of the stator. Flow directions of the cooling oil in the first oil channel 101 and the second oil channel 102 are indicated by solid arrows and dashed arrows in FIG. 7. The cooling oil is sprayed out from the first nozzle 411 along the dashed arrows, and the cooling oil is sprayed out from the second nozzle 421 along the solid arrows.

It should be noted that, when one end of the plurality of first oil channels 101 is connected to the plurality of second oil channels 102a, one end of each first oil channel 101 may be connected to all the second oil channels 102a, or one end of the plurality of first oil channels 101 may be connected to all the second oil channels 102a, respectively. For example, cooling oil flowing from one end of the plurality of first oil channels 101 converges and then enters each second oil channel 102a. To prevent the cooling oil at one end of the plurality of first oil channels 101 from entering the second oil channels 102b, two ends of the second oil channels 102a and two ends of the second oil channels 102b are blocked. This ensures that one end of the plurality of first oil channels 101 is connected to the plurality of second oil channels 102a and is not connected to the plurality of second oil channels 102b.

To implement the connection between the first oil channels 101 and the second oil channels 102 and the interleaved reverse flows of the cooling oil in the plurality of second oil channels 102, referring to FIG. 7, a first end cap 41 and a second end cap 42 are further included. The first end cap 41 and the second end cap 42 are respectively located at the two ends of the stator core 20. The first end cap 41 is provided with a plurality of first nozzles 411 disposed at intervals, and the second end cap 42 is provided with a plurality of second nozzles 421 disposed at intervals. One end of the plurality of first oil channels 101 is connected to one end of the some of the second oil channels 102 (for example, a second oil channel 102a) through the first end cap 41, and the other end of the some of the second oil channels 102 is connected to the plurality of second nozzles 421. The other end of the plurality of first oil channels 101 is connected to one end of the remaining second oil channel 102 (for example, a second oil channel 102b) through the second end cap 42, and the other end of the remaining second oil channel 102 is connected to the plurality of first nozzles 411.

Referring to FIG. 7, a third oil channel 103 is formed between the first end cap 41 and one end face of the stator core 20, and a fourth oil channel 104 is formed between the second end cap 42 and the other end face of the stator core 20. It should be noted that the third oil channel 103 is distributed throughout a circumferential direction between the first end cap 41 and the end face of the stator core 20, the fourth oil channel 104 is correspondingly distributed throughout a circumferential direction between the second end cap 42 and the other end face of the stator core 20, and the third oil channel 103 and the fourth oil channel 104 are annular oil channels.

One end of the plurality of first oil channels 101 is connected to one end of the some of the second oil channels 102 through the third oil channel 103, and the other end of the plurality of first oil channels 101 is connected to one end of the remaining second oil channel 102 through the fourth oil channel 104. One end of the plurality of first oil channels 101 is connected to the third oil channel 103, that is, the cooling oil flows from one end of the plurality of first oil channels 101 to the third oil channel 103 for convergence, and then mixed cooling oil enters the some of the second oil channels 102a. Correspondingly, the other end of the plurality of first oil channels 101 is connected to the fourth oil channel 104, that is, the cooling oil flows from the other end of the plurality of first oil channels 101 to the fourth oil channel 104 for convergence, and then mixed cooling oil enters the some of the second oil channels 102b.

In this embodiment, by using the third oil channel 103 and the fourth oil channel 104, a flow mixing function of the cooling oil is implemented at the third oil channel 103 and the fourth oil channel 104, and flows of the cooling oil are circumferentially distributed more evenly, so that unevenness of circumferential temperature of the stator is reduced, and even heat dissipation is circumferentially implemented on the stator.

It should be noted that the first nozzle 411 on the first end cap 41 is spaced from (that is, not connected to) the third oil channel 103 and is connected to the fourth oil channel 104, and the second nozzle 421 on the second end cap 42 is spaced from (that is, not connected to) the fourth oil channel 104 and is connected to the third oil channel 103. This ensures that the cooling oil entering the third oil channel 103 is not directly sprayed out from the first nozzle 411, and correspondingly the cooling oil entering the fourth oil channel 104 is not directly sprayed out from the second nozzle 421.

Figure 8A:
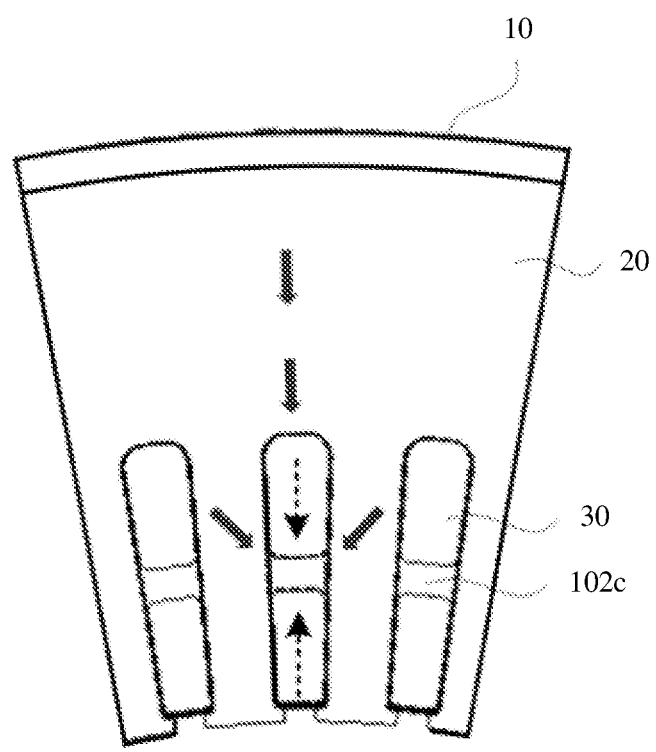
FIG. 8A is a partial schematic diagram of a heat transfer path when an oil channel is disposed in a coil winding in a motor.

A heat dissipation effect of the motor 100 provided in this embodiment is simulated. In this embodiment, two motors 100 with different structures are selected as reference for simulation. FIG. 8A is a partial schematic diagram of a heat transfer path when an oil channel is disposed in a coil winding 30 in a motor 100. Referring to FIG. 8A, an oil channel 102c is disposed only in the coil winding 30 (in the middle coils 33 of the coil winding 30), heat of the outer surface of the stator core 20 and heat that is of the stator core 20 and that is close to the coil slot 23 are diffused to the oil channel 102c along solid arrow directions for heat dissipation, and heat of the coil winding 30 is diffused to the oil channel 102c along two dashed arrow directions.

Figure 8B:
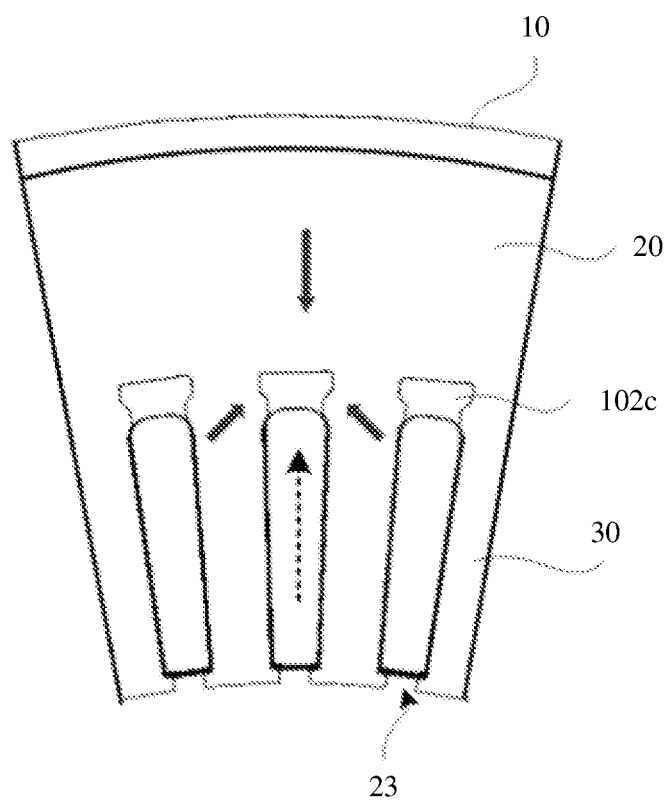
FIG. 8B is a partial schematic diagram of a heat transfer path when an oil channel is disposed at a groove root of a coil slot in a motor.

FIG. 8B is a partial schematic diagram of a heat transfer path when an oil channel is disposed at a groove root of a coil slot 23 in a motor 100. As shown in FIG. 8B, an oil channel 102c is formed at the groove root of the coil slot 23, heat of the outer surface of the stator core 20 and heat that is of the stator core 20 and that is close to the coil slot 23 are diffused to the oil channel 102c along solid arrow directions for heat dissipation, and heat of the coil winding 30 is diffused to the oil channel 102c along a dashed arrow direction. The heat transfer path for the outer surface of the stator core 20 in FIG. 8B is shortened compared with FIG. 8A.

Figure 8C:
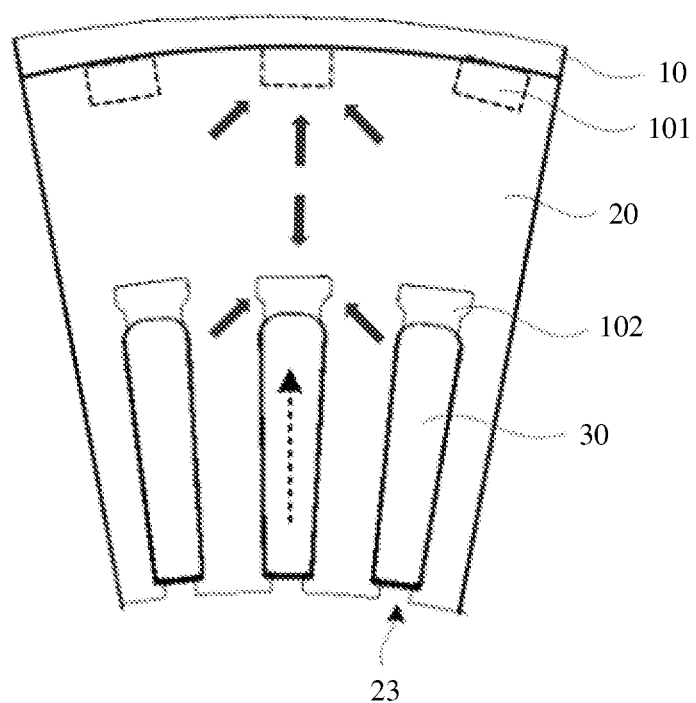
FIG. 8C is a partial schematic diagram of a heat transfer path during heat dissipation of a motor according to an embodiment.

FIG. 8C is a partial schematic diagram of a heat transfer path during heat dissipation of a motor 100 according to an embodiment. As shown in FIG. 8C, the first oil channel 101 is formed between the outer surface of the stator core 20 and the housing 10, and the second oil channel 102 is formed at the groove root of the coil slot 23. In this case, a part of heat in the middle of the stator core 20 and heat that is of the stator core 20 and that is close to the coil slot 23 are transferred to the second oil channel 102 along solid arrows for heat dissipation, heat of the coil winding 30 is transferred to the second oil channel 102 along a dashed arrow direction for heat dissipation, and heat of the outer surface of the stator core 20 and a part of heat in the middle of the stator core 20 are transferred to the first oil channel 101 along other solid arrows for heat dissipation.

Compared with FIG. 8A and FIG. 8B, in the motor 100 provided in this embodiment, two-layer oil channels, that is, the first oil channel 101 and the second oil channel 102, are disposed to shorten the heat transfer path, and the two-layer oil channels increase a contact area between the stator core 20 and the oil channels. Through simulation, it is found that the motor 100 provided in this embodiment may reduce maximum temperature of the stator by approximately 15° C. compared with the case in which the oil channel is disposed only at the groove root of the coil slot 23, and reduces the maximum temperature of the stator by approximately 30° C. compared with the case in which the oil channel is disposed in the coil winding 30. Therefore, the motor 100 provided in this embodiment improves a cooling effect on the stator and implements effective heat dissipation on the stator core 20 and the coil winding 30.

Therefore, for the motor 100 provided in this embodiment, the plurality of first oil channels 101 may be formed between the inner surface 12 of the housing 10 in the motor 100 and the outer surface of the stator core 20, the second oil channels 102 are formed at the groove roots of the coil slots 23 of the stator core 20, the first oil channel 101 can cool the outer surface of the stator core 20, and the second oil channel 102 can directly dissipate heat around the coil slot 23 of the stator core 20 and heat of the coil winding 30, to form the double-layer oil channels at the outer surface of the stator core 20 and the root of the coil slot 23 of the stator core 20. The two-layer oil channels may increase the contact area between the cooling oil and the stator, thereby significantly improving the heat dissipation capabilities of the stator and the coils. In addition, one end of the plurality of first oil channels 101 is connected to the some of the second oil channels 102, the other end of the plurality of first oil channels 101 is connected to the remaining second oil channel 102, and the second oil channels 102 are connected to the nozzles at the end parts of the motor 100. After the cooling oil is injected from the oil filling port 11, the flow direction of the cooling oil in the some of the second oil channels 102 is opposite to that of the cooling oil in the remaining second oil channel 102, so that interleaved reverse flows are implemented, and axial temperature of the stator core 20 and the coil winding 30 is more uniform. Therefore, the motor 100 provided in this embodiment may ensure effective cooling of the stator core 20 and the coil winding 30, thereby ensuring the heat dissipation requirement of the motor 100 in the low-speed high-torque and high rotational speed conditions, and resolving the problem that overtemperature easily occurs in the coil winding 30 when the motor 100 is in the low-speed high-torque and high rotational speed conditions because of poor heat dissipation of the stator core 20 and the coil winding 30 in the existing motor 100.

Figure 9:
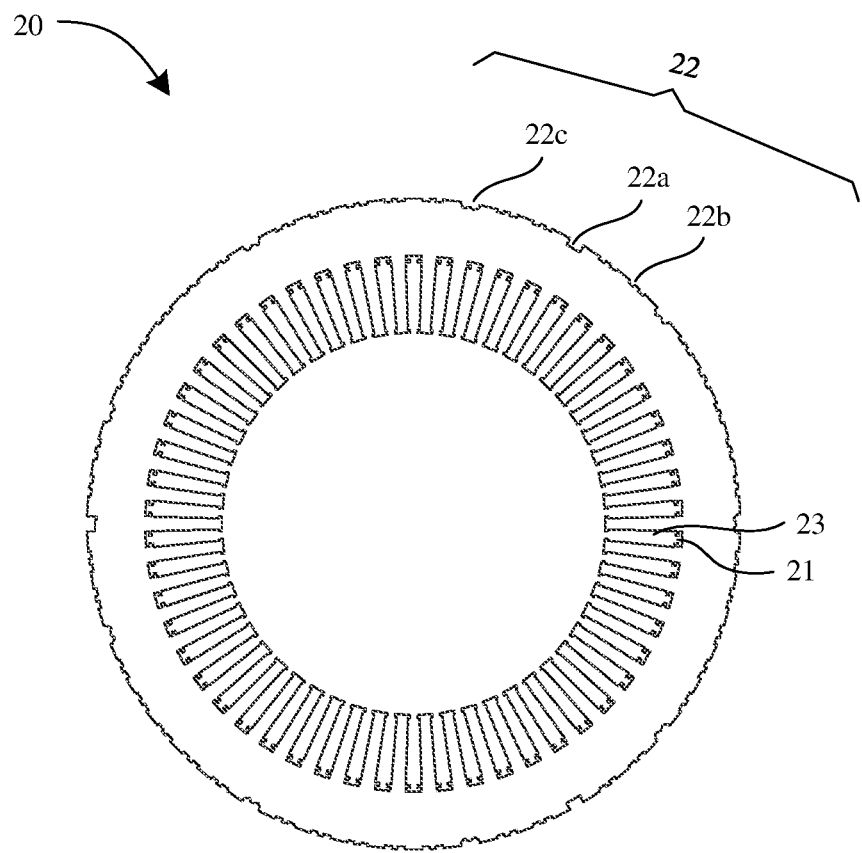
FIG. 9 is a schematic diagram of a stator core in a motor according to an embodiment.

In this embodiment, when the plurality of first oil channels 101 may be formed between the outer surface of the stator core 20 and the inner surface of the housing 10, a possible implementation is as follows: As shown in FIG. 9, a plurality of oil grooves 22 may be provided on the outer surface of the stator core 20, the plurality of oil grooves 22 may be circumferentially disposed at intervals along the periphery of the stator core 20, and two ends of each oil groove 22 extend to two end faces of the stator core 20; and the first oil channel 101 is enclosed by the oil groove 22 and the inner surface 12 of the housing 10.

Alternatively, in another possible implementation, a plurality of oil grooves 22 may be provided on the inner surface 12 of the housing 10, and the plurality of oil grooves 22 may be circumferentially disposed at intervals along an inner circumference of the housing 10; and the first oil channel 101 is enclosed by the oil groove 22 and the outer surface of the stator core 20.

Alternatively, in another possible implementation, a plurality of oil grooves 22 may be provided on the outer surface of the stator core 20, the plurality of oil grooves 22 may be circumferentially disposed at intervals along the periphery of the stator core 20, and two ends of each oil groove 22 extend to two end faces of the stator core 20; and a plurality of oil grooves 22 may be provided on the inner surface 12 of the housing 10, and the plurality of oil grooves 22 may be circumferentially disposed at intervals along an inner circumference of the housing 10. The first oil channel 101 is enclosed by the oil groove 22 on the inner surface of the housing 10 and the oil groove 22 on the outer surface of the stator core 20.

In this embodiment, the following provides a description by using an example in which the first oil channel 101 is enclosed by the oil groove 22 on the outer surface of the stator core 20 and the inner surface of the housing 10.

Figure 10:
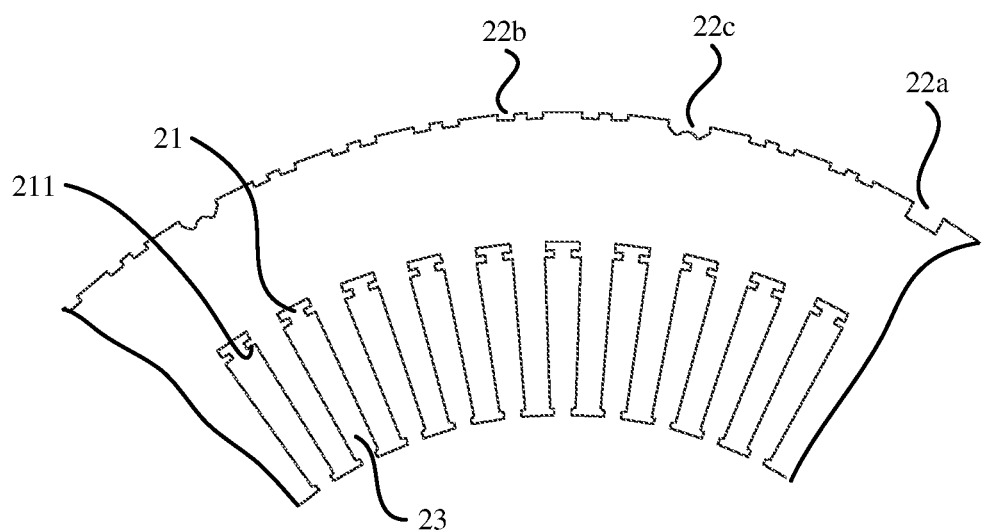
FIG. 10 is a partially enlarged schematic diagram of the stator core shown in FIG. 9.

In this embodiment, when the oil grooves 22 are provided on the outer surface of the stator core 20, groove widths or cross-sectional shapes of the plurality of oil grooves 22 may be the same; or as shown in FIG. 10, groove widths or cross-sectional shapes of the plurality of oil grooves 22 are different.

In this embodiment, groove bottoms of at least some of the oil grooves 22 are uneven and arcuate groove bottoms. For example, referring to FIG. 10, in the plurality of oil grooves 22, a groove bottom of an oil groove 22c is uneven and arcuate. In this way, when the cooling oil passes through the first oil channel 101, a contact area between the stator core 20 and the cooling oil is increased, thereby implementing effective heat dissipation on the outer surface of the stator core 20. Alternatively, the plurality of oil grooves 22 may be even in groove widths, the plurality of oil grooves 22 may be different in groove widths, or referring to FIG. 10, groove widths of some of the plurality of oil grooves 22 are greater than a groove width of a remaining oil groove 22. For example, a groove width of an oil groove 22b is less than a groove width of an oil groove 22a. In this case, a quantity of the oil grooves 22b to be provided can be increased with a same area. This increases the contact area between the cooling oil and the stator core 20, thereby desirably cooling the outer surface of the stator core 20.

Figure 11:
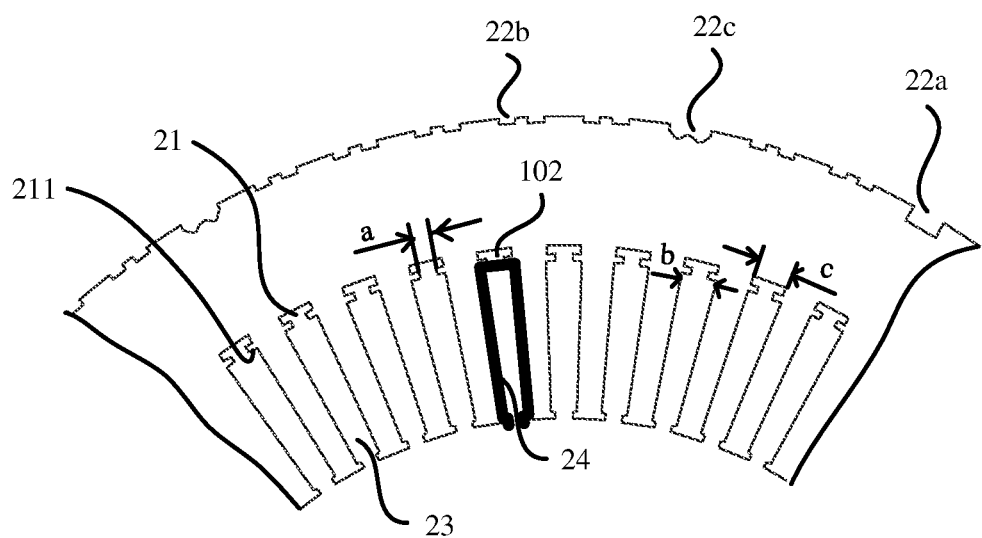
FIG. 11 is a schematic diagram of a partial structure of a stator core in a motor according to an embodiment.

In this embodiment, when the first oil channel 101 is formed at the slot bottoms (that is, groove roots) of the at least some of the coil slots 23, a possible implementation is as follows: Fifth grooves 21 are provided at the slot bottoms of the at least some of the coil slots 23. For example, referring to FIG. 10, a fifth groove 21 is provided at a slot bottom of each coil slot 23. Referring to FIG. 11, an insulation layer 24 is disposed in the coil slot 23. For example, the insulation layer 24 is disposed on a groove wall of the coil slot 23, and the coil winding 30 is insulated from the stator core 20 by using the insulation layer 24. The insulation layer 24 may be used to prevent the coil winding 30 from being in electrical contact with the groove wall of the coil slot 23 of the stator core 20. The second oil channel 102 is enclosed by the fifth groove 21 and some of the insulation layers 24. For example, a part that is of the insulation layer 24 and that is located at a notch of the fifth groove 21 seals the notch of the fifth groove 21, so that the second oil channel 102 is enclosed by the insulation layer 24 at the notch of the fifth groove 21 and a groove wall of the fifth groove 21.

In some other examples, an opening may alternatively be disposed at a slot bottom that is of the stator core 20 and that is close to the coil slot 23, to form the second oil channel 102. In this embodiment, the second oil channel 102 may be formed in a manner shown in FIG. 11.

In this embodiment, to facilitate arrangement of the insulation layer 24 at the notch of the fifth groove 21, referring to FIG. 11, a notch width of the fifth groove 21 is a, a slot bottom width of the coil slot 23 is b, and a is less than b. In this way, a step 211 is formed at a junction between the fifth groove 21 and the coil slot 23, and the insulation layer 24 may abut on the step to seal the notch of the fifth groove 21. It is convenient to dispose the insulation layer 24 at the notch of the fifth groove 21 because a is less than b.

In this embodiment, when a is less than b, contact areas between the cooling oil and the coil winding 30 and between the cooling oil and the stator core 20 are relatively small. To implement desirable heat dissipation on the coil winding 30 and the stator core 20, in this embodiment, a groove bottom width of the fifth groove 21 is c, and c is greater than a. In this way, the formed first oil channel 101 can accommodate more cooling oil, thereby desirably cooling the coil winding 30 and the stator core 20.

In this embodiment, referring to FIG. 11, an outer cross-sectional contour of the fifth groove 21 is T-shaped. In some other examples, the outer cross-sectional contour of the fifth groove 21 may alternatively be umbrella-shaped or fan-shaped.

It should be noted that in this embodiment, the groove bottom width c of the fifth groove 21 may be greater than or equal to the slot bottom width b of the coil slot 23.

Figure 12:
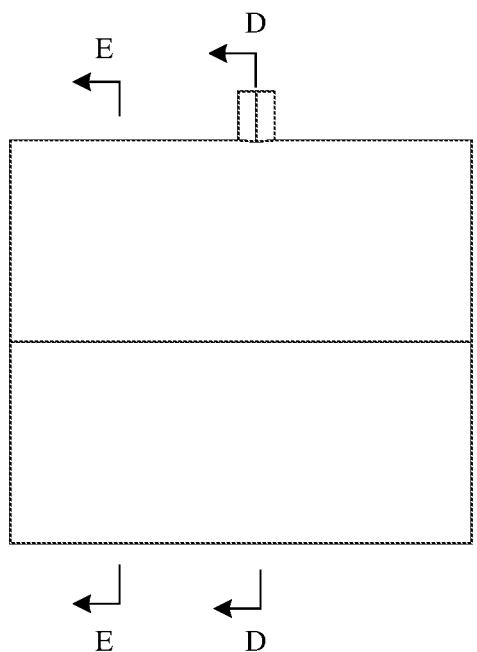
FIG. 12 is a front view of a motor according to an embodiment.
Figure 13:
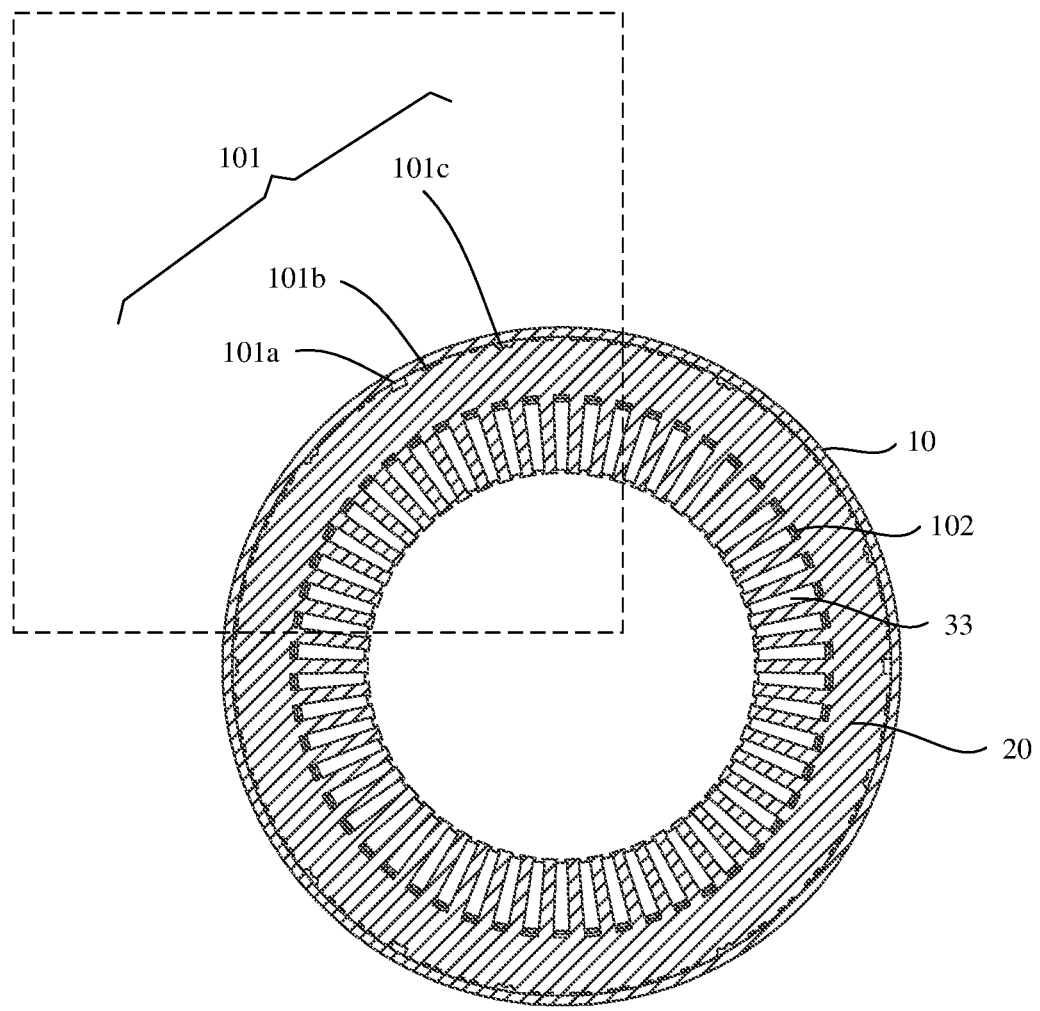
FIG. 13 is a schematic diagram of a cross-section in FIG. 12 along an E-E direction of a stator in FIG. 2.
Figure 14:
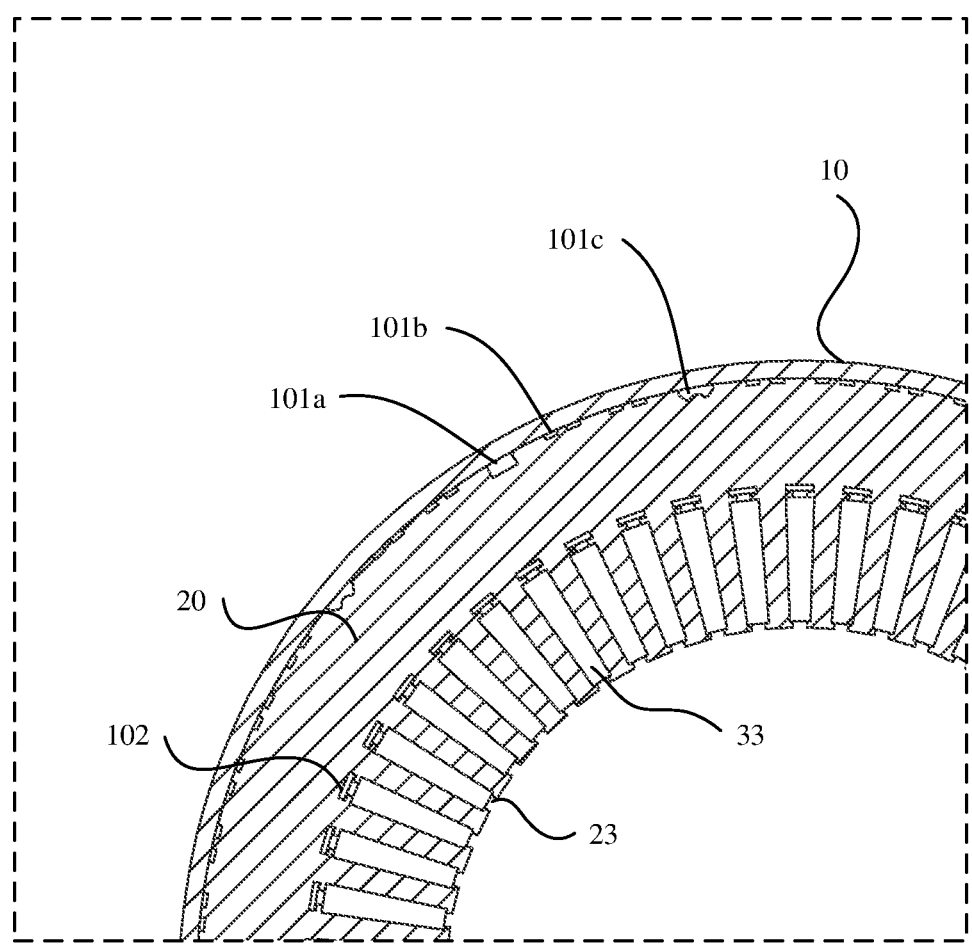
FIG. 14 is an enlarged schematic diagram of a dashed-line box portion in FIG. 13.

In this embodiment, FIG. 13 is a schematic diagram of a cross-section in FIG. 12 along an E-E direction. Referring to FIG. 13 and FIG. 14, a first oil channel 101a is formed between the oil groove 22a (refer to FIG. 10) and the inner surface of the housing 10, a first oil channel 101b is formed between the oil groove 22b (refer to FIG. 10) and the inner surface of the housing 10, and a first oil channel 101c is formed between the oil groove 22c (refer to FIG. 10) and the inner surface of the housing 10.

Figure 15:
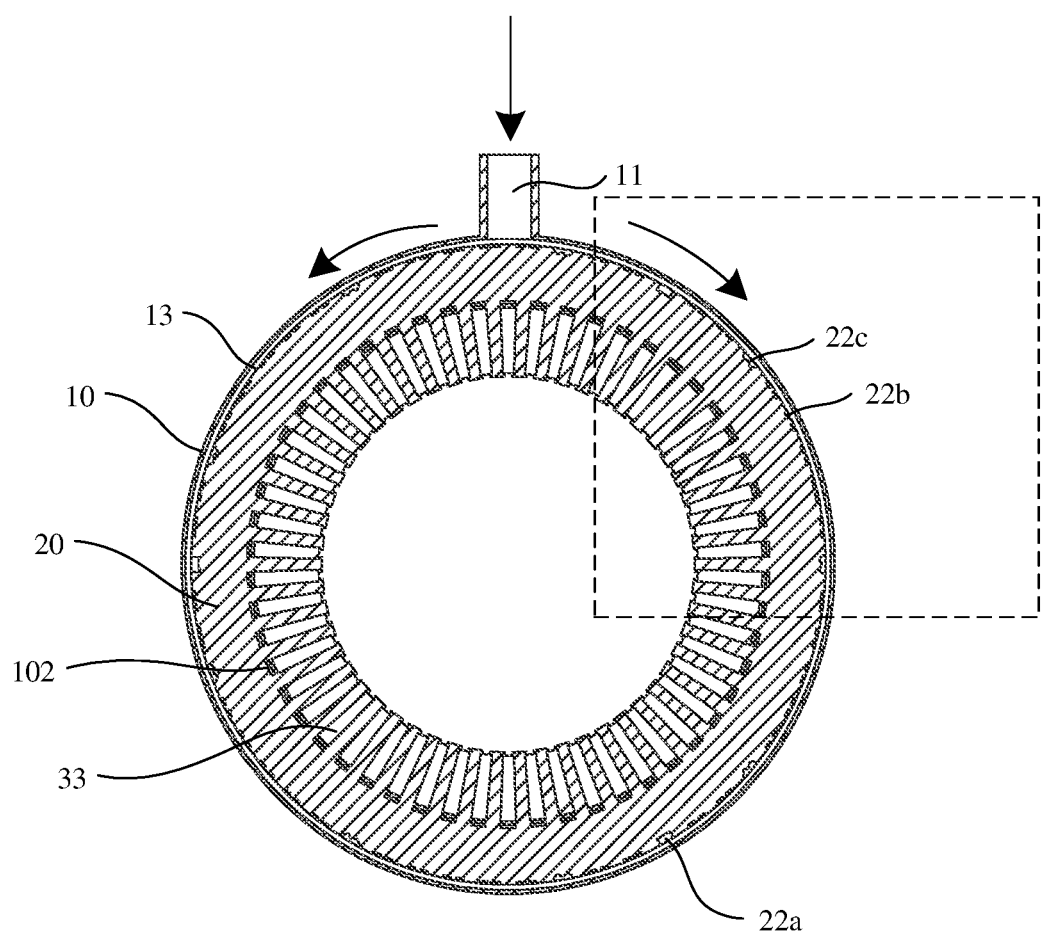
FIG. 15 is a schematic diagram of a cross-section in FIG. 12 along a D-D direction of a stator in FIG. 2.
Figure 16:
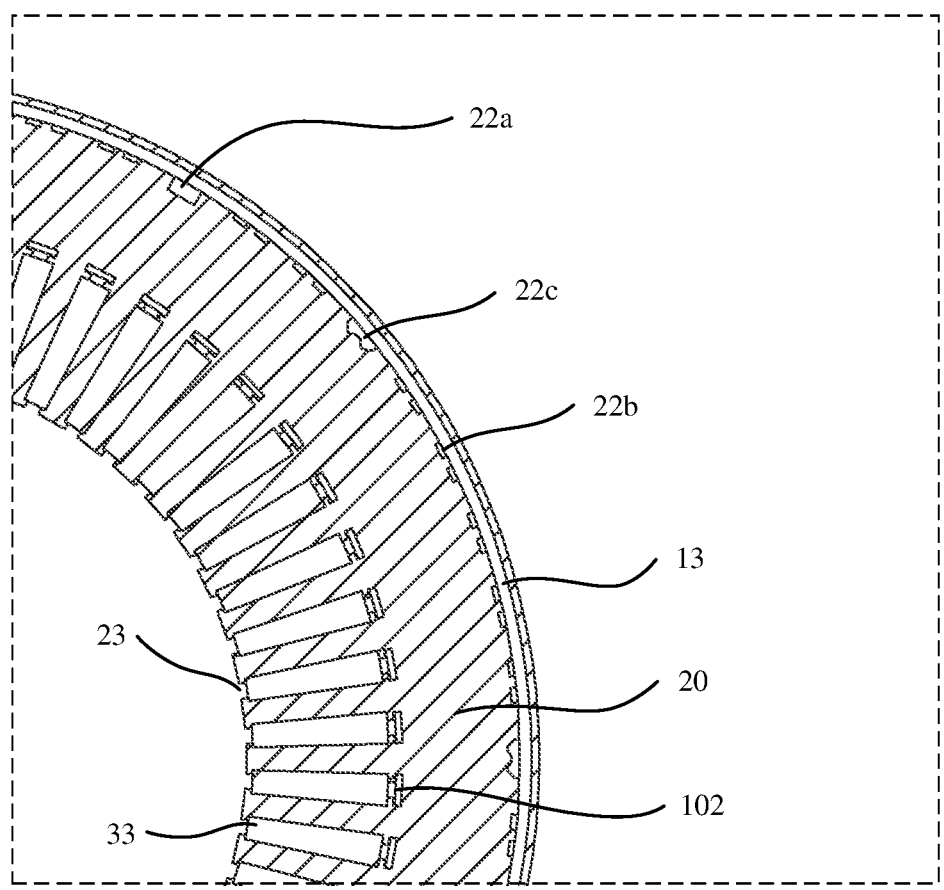
FIG. 16 is an enlarged schematic diagram of a dashed-line box portion in FIG. 15.

In this embodiment, FIG. 16 is an enlarged schematic diagram of a dashed-line box portion in FIG. 15. Referring to FIG. 16, the cooling oil injected from the oil filling port 11 enters the connecting groove 13, and the cooling oil enters each first oil channel 101 through the connecting groove 13.

In the following five embodiments, a manner is detailed in which one end of the plurality of first oil channels 101 is connected to the some of the second oil channels 102a through the first end cap 41 and the other end of the plurality of first oil channels 101 is connected to the remaining second oil channel 102b through the second end cap 42.

Embodiment 1

Figure 21:
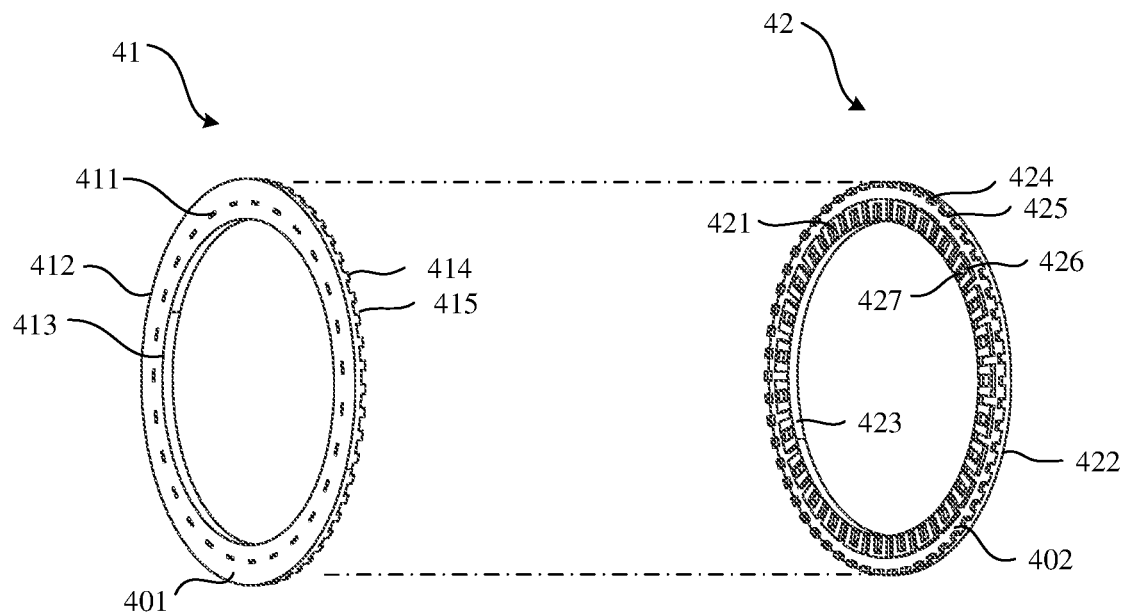
FIG. 21 is a schematic diagram of structures of a first end cap and a second end cap in a motor according to an embodiment.

In this embodiment, referring to FIG. 17, the first end cap 41 includes at least a first annular end plate 401, and the third oil channel 103 is formed between the first annular end plate 401 and one end face of the stator core 20 (refer to FIG. 25 below). Referring to FIG. 21, the second end cap 42 includes at least a second annular end plate 402, and the fourth oil channel 104 is formed between the second annular end plate 402 and the other end face of the stator core 20 (refer to FIG. 25 below).

Figure 17:
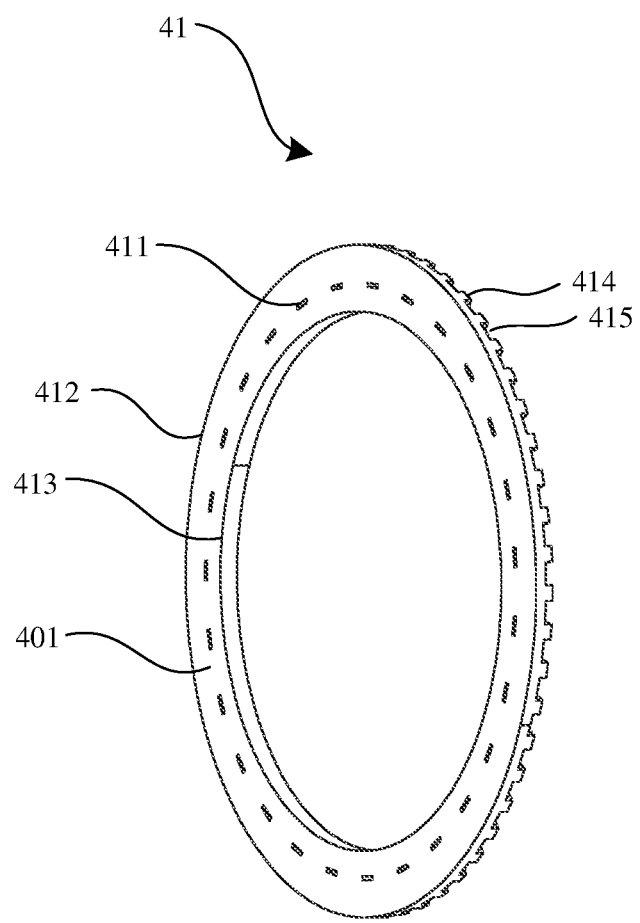
FIG. 17 is a schematic diagram of a structure of a first end cap in a motor according to an embodiment.
Figure 20:
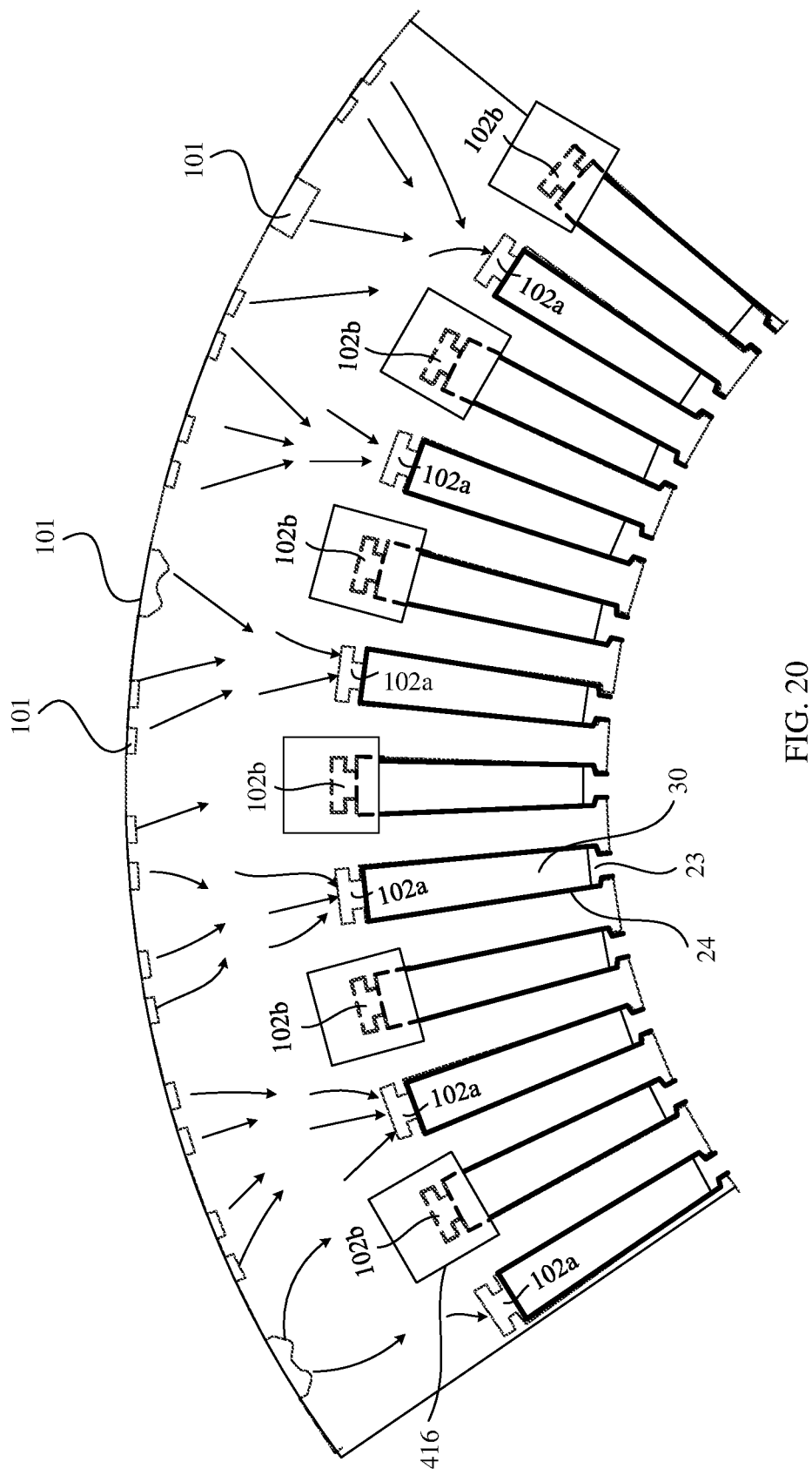
FIG. 20 is a schematic diagram of a partial end face of a stator core and a first separation block that is on a first end cap in a motor according to an embodiment.

Referring to FIG. 17, the plurality of first nozzles 411 may be circumferentially disposed at intervals along the first annular end plate 401. Referring to FIG. 20, the plurality of second nozzles 421 may be circumferentially disposed at intervals along the second annular end plate 402. In this way, the cooling oil sprayed out from the plurality of first nozzles 411 can circumferentially perform even heat dissipation on the first end part 31 of the coil winding 30, and the cooling oil sprayed out from the plurality of second nozzles 421 can circumferentially perform even heat dissipation on the second end part 32 of the coil winding 30.

Figure 18:
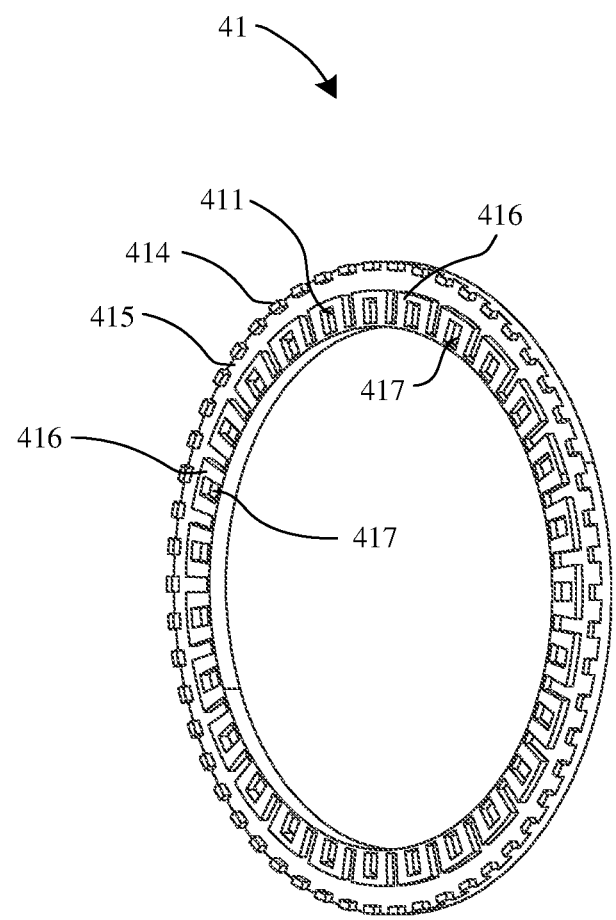
FIG. 18 is a schematic diagram of a structure of a first end cap, which is in a motor, in another direction according to an embodiment.
Figure 19:
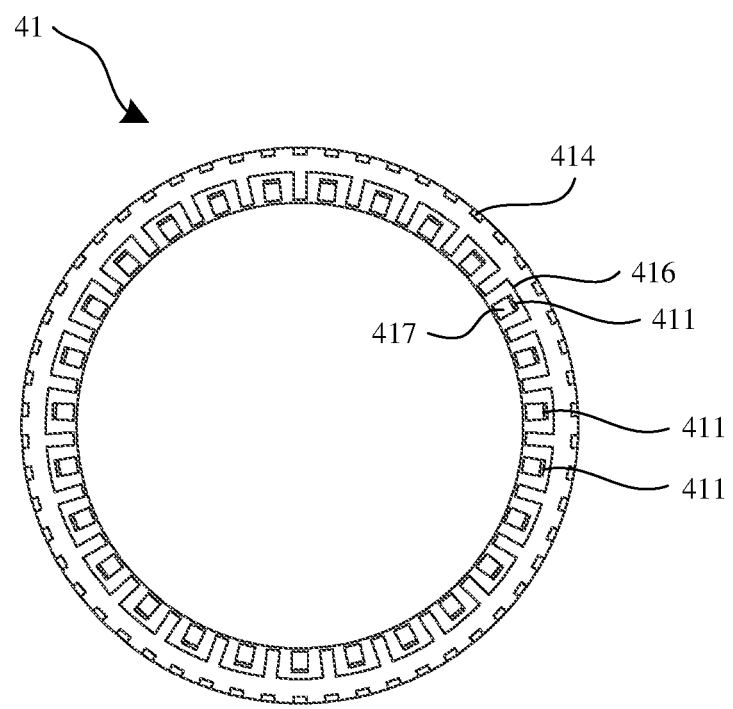
FIG. 19 is a schematic rear view of a first end cap in a motor according to an embodiment.

Referring to FIG. 18, an inner edge 413 (refer to FIG. 17) of the first annular end plate 401 is provided with a plurality of first separation blocks 416 disposed at intervals, and one end of the first separation block 416 abuts on one end face of the stator core 20. Referring to FIG. 19, the first separation block 416 is provided with the first nozzle 411, and the first nozzle 411 is separated from the third oil channel 103 by using the first separation block 416. Referring to FIG. 20, after the first end cap 41 is mounted, the first separation block 416 seals one end that is of the plurality of second oil channels 102b and that is toward the first end cap 41, so that the third oil channel 103 is not connected to the plurality of second oil channels 102b but is connected to the plurality of second oil channels 102a (refer to solid arrows in FIG. 20). The first nozzle 411 is provided on the first separation block 416, to ensure that the second oil channel 102b is connected to the first nozzle 411. Therefore, in this embodiment, disposing the first separation block 416 implements separation between the third oil channels 103 and some second oil channels 102b and the connection between the some second oil channels 102b and the first nozzles 411.

Referring to FIG. 18, the first separation block 416 is provided with a first recessed portion 417, and the first nozzle 411 is located at the first recessed portion 417. Referring to FIG. 19, an opening area of the first recessed portion 417 is greater than that of the first nozzle 411. In this way, the other end of the some of the second oil channels 102b is connected to the first recessed portion 417, so that the some of the second oil channels 102b can be connected to the first nozzles 411, thereby reducing a difficulty in mounting the first nozzles 411 and the second oil channels 102b in a one-to-one correspondence manner. In addition, after the first recessed portion 417 is connected to the second oil channel 102b, a location of the first nozzle 411 is not limited to a location of one end of the second oil channel 102b. For example, when the first nozzle 411 is close to the first end part 31 of the coil winding 30, the cooling oil sprayed out from the first nozzle 411 may come into contact with a region that is of the first end part 31 and that is close to the stator core 20 and cools this region, while poor heat dissipation occurs in a region that is of the first end part 31 and that is far away from the stator core 20, because this region may not come into contact with the cooling oil. Therefore, in this embodiment, when the first nozzle 411 is provided on the first recessed portion 417, the first nozzle 411 may be vertically far away from the first end part 31, so that the cooling oil sprayed out from the first nozzle 411 can also cool an outer end of the first end part 31.

Correspondingly, referring to FIG. 21, an inner edge 423 of the second annular end plate 402 is provided with a plurality of second separation blocks 426 disposed at intervals, one end of the second separation block 426 abuts on the other end face of the stator core 20, the second separation block 426 is provided with the second nozzle 421, and the second nozzle 421 is separated from the fourth oil channel 104 by using the second separation block 426. In this way, the second separation block 426 separates the fourth oil channel 104 from some of the second oil channels 102a and connects the some of the second oil channels 102a and the second nozzles 421.

Referring to FIG. 21, the second separation block 426 is provided with a second recessed portion 427, and the second nozzle 421 is located at the second recessed portion 427. For a function of the second recessed portion 427, reference may be made to the function of the first recessed portion 417 described above.

Referring to FIG. 21, a plurality of first bumps 414 disposed at intervals may be provided at an outer edge 412 of a surface that is of the first end cap 41 and that faces the stator core 20, a first spacing 415 is provided between two adjacent first bumps 414, and the plurality of first bumps 414 may be circumferentially disposed along the outer edge of the first end cap 41. Second bumps 424 are provided at an outer edge 422 of a surface that is of the second end cap 42 and that faces the stator core 20, a second spacing 425 is provided between two adjacent second bumps 424, and the plurality of second bumps 424 may be circumferentially disposed along the outer edge of the second end cap 42.

Figure 22:
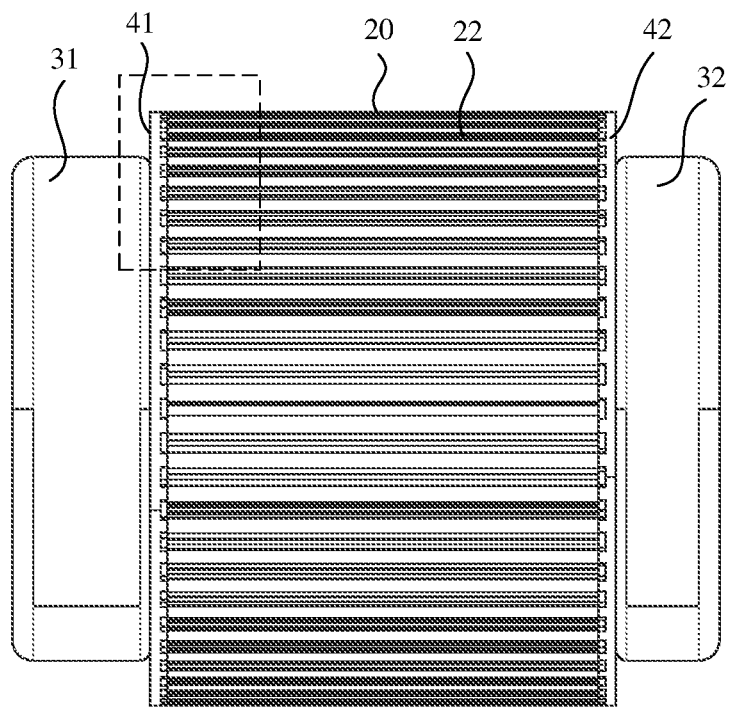
FIG. 22 is a schematic diagram of assembly of a first end cap, a second end cap, a coil winding, and a stator core in a motor according to an embodiment.
Figure 23:
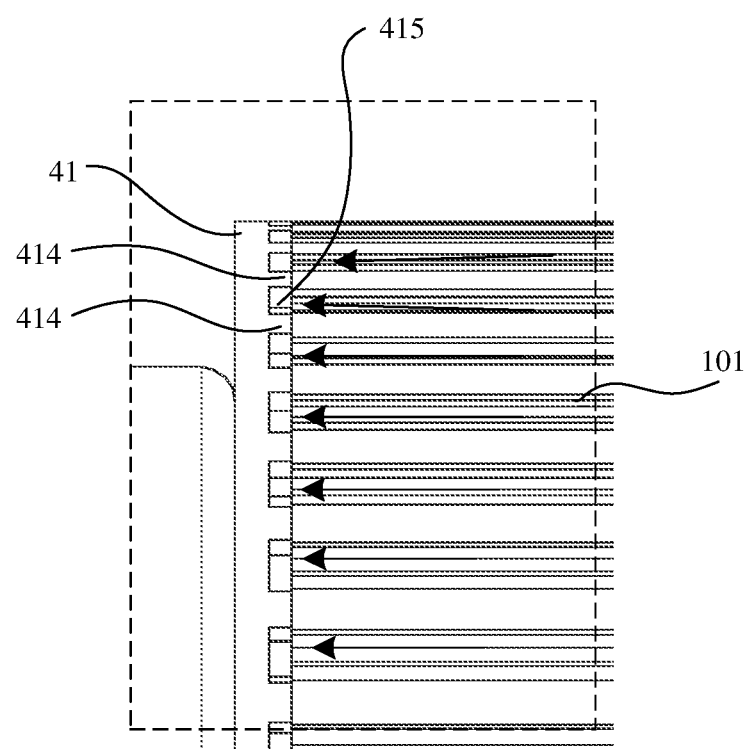
FIG. 23 is an enlarged schematic diagram of a dashed-line box portion in FIG. 22.

FIG. 23 is an enlarged schematic diagram of a dashed-line box portion in FIG. 22. As shown in FIG. 23, one end of the first bump 414 abuts on one end face of the stator core 20, and one end of the second bump 424 abuts on the other end face of the stator core 20. Referring to FIG. 23, each first bump 414 is staggered from one end of the first oil channel 101 in a circumferential direction, so that the cooling oil in the first oil channel 101 can enter the third oil channel 103 through the first spacing 415 (refer to FIG. 25). Correspondingly, each second bump 424 is staggered from the other end of the first oil channel 101 in a circumferential direction, so that the cooling oil enters the fourth oil channel 104 through the second spacing 425 (refer to FIG. 25).

Figure 24:
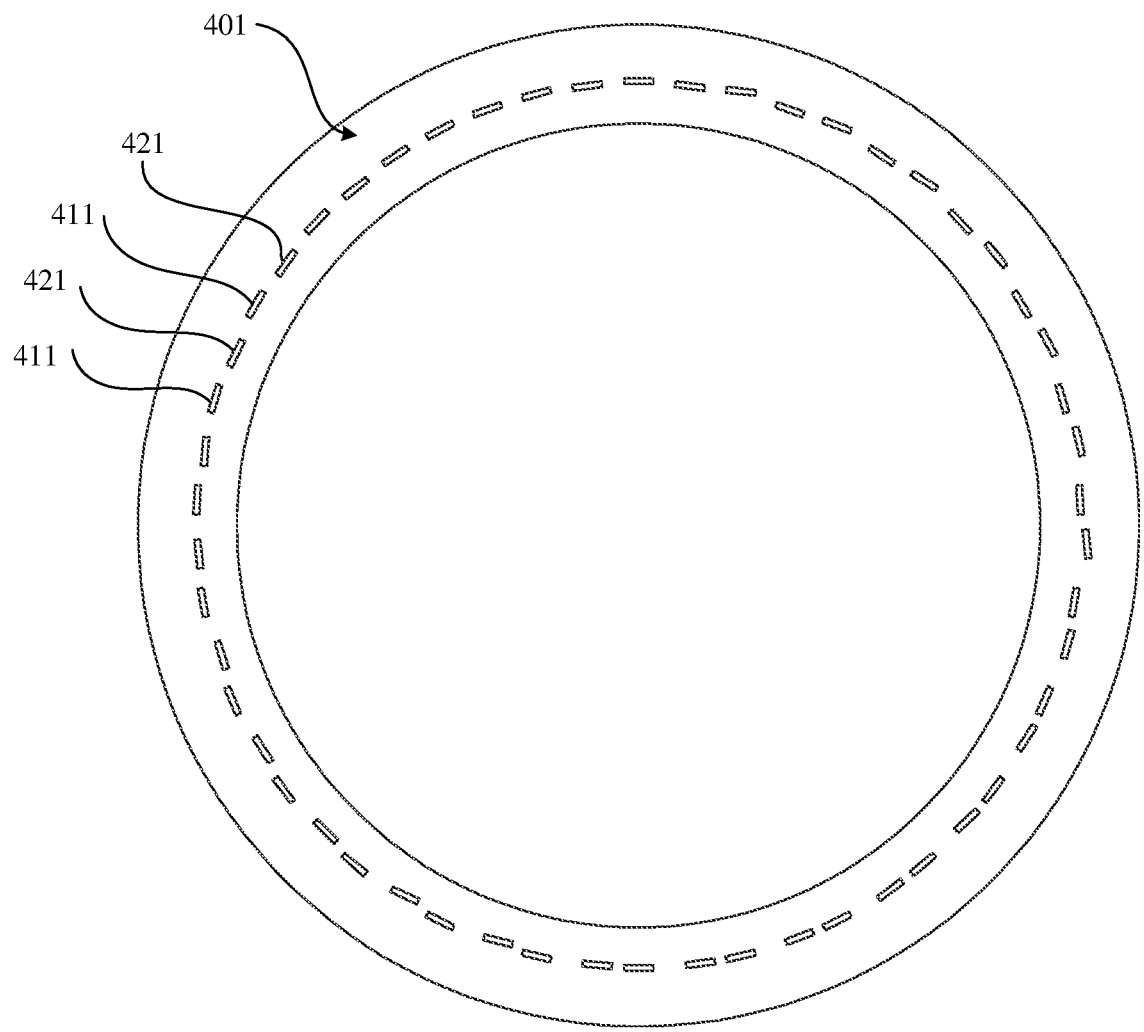
FIG. 24 is a schematic diagram of a first end cap when second nozzles on a second end cap in a motor are projected towards the first end cap according to an embodiment.

In this embodiment, referring to FIG. 24, orthographic projections of the plurality of second nozzles 421 toward the first annular end plate 401 and the plurality of first nozzles 411 may be circumferentially arranged alternately on the first annular end plate 401. This can implement axial even heat dissipation on the two end parts of the coil winding 30.

In this embodiment, as shown in FIG. 24, the first nozzles 411 and the second nozzles 421 are flat nozzles. For example, the first nozzles 411 and the second nozzles 421 may be rectangular or strip-shaped. In this way, coverage regions of the cooling oil sprayed out from the first nozzles 411 and the second nozzles 421 are wider, so that a contact area between the two end parts of the coil winding 30 and the cooling oil is larger and a heat dissipation effect is better.

Figure 25:
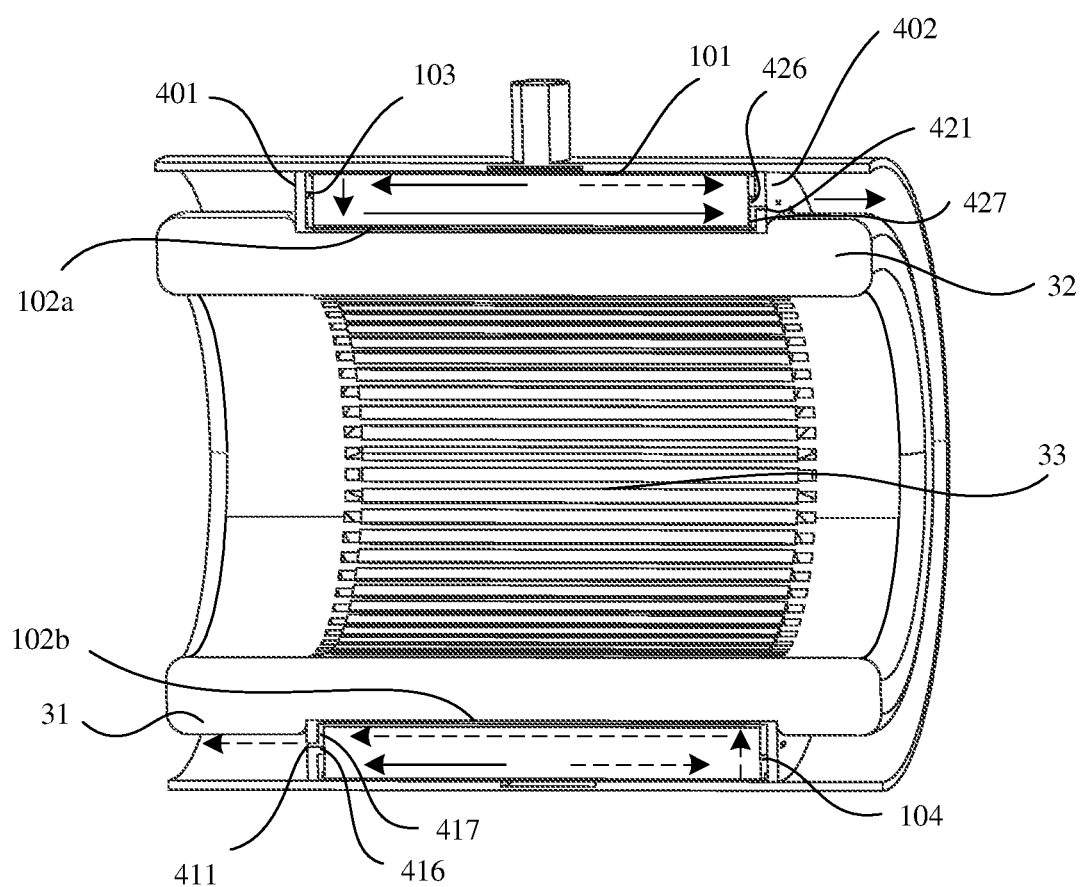
FIG. 25 is a schematic diagram of a cross-section of a motor according to an embodiment.
Figure 26:
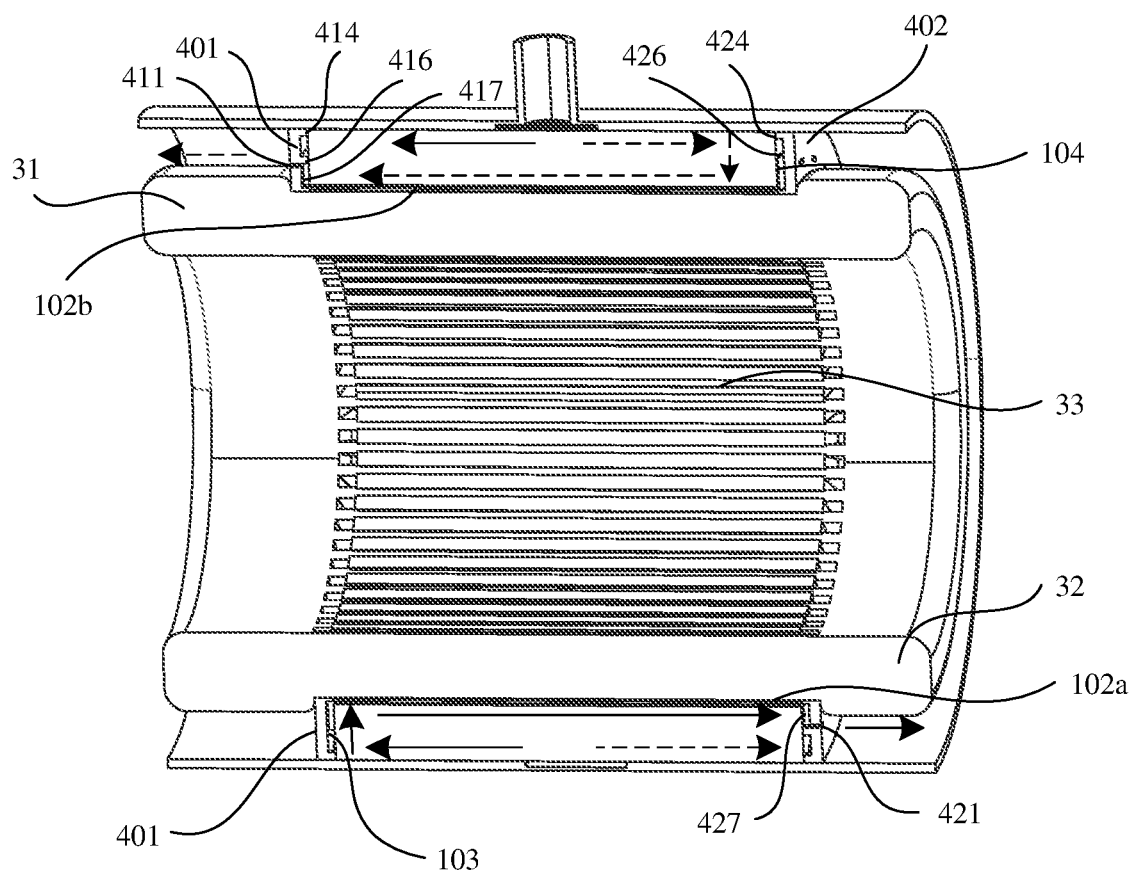
FIG. 26 is a schematic diagram of a cross-section of a motor in another direction according to an embodiment.

FIG. 25 and FIG. 26 are schematic diagrams of cross-sections of the motor 100 at two different locations according to this embodiment. Referring to FIG. 25, the first separation block 416 and the second separation block 426 respectively abut on the two end faces of the stator core 20 to isolate the oil channels. Referring to FIG. 26, after the cooling oil in the first oil channel 101 flows along a solid arrow and enters the third oil channel 103, the cooling oil cannot enter each second oil channel 102b due to blocking of each first separation block 416, but enters each second oil channel 102a through the third oil channel 103 and is finally sprayed out from the second nozzle 421. In contrast, after the cooling oil in the first oil channel 101 flows along a dashed arrow and enters the fourth oil channel 104, the cooling oil enters each second oil channel 102b through the fourth oil channel 104, but cannot enter each second oil channel 102a due to blocking of each first separation block 426, and is finally sprayed out from the first nozzle 411.

Embodiment 2

Figure 27:
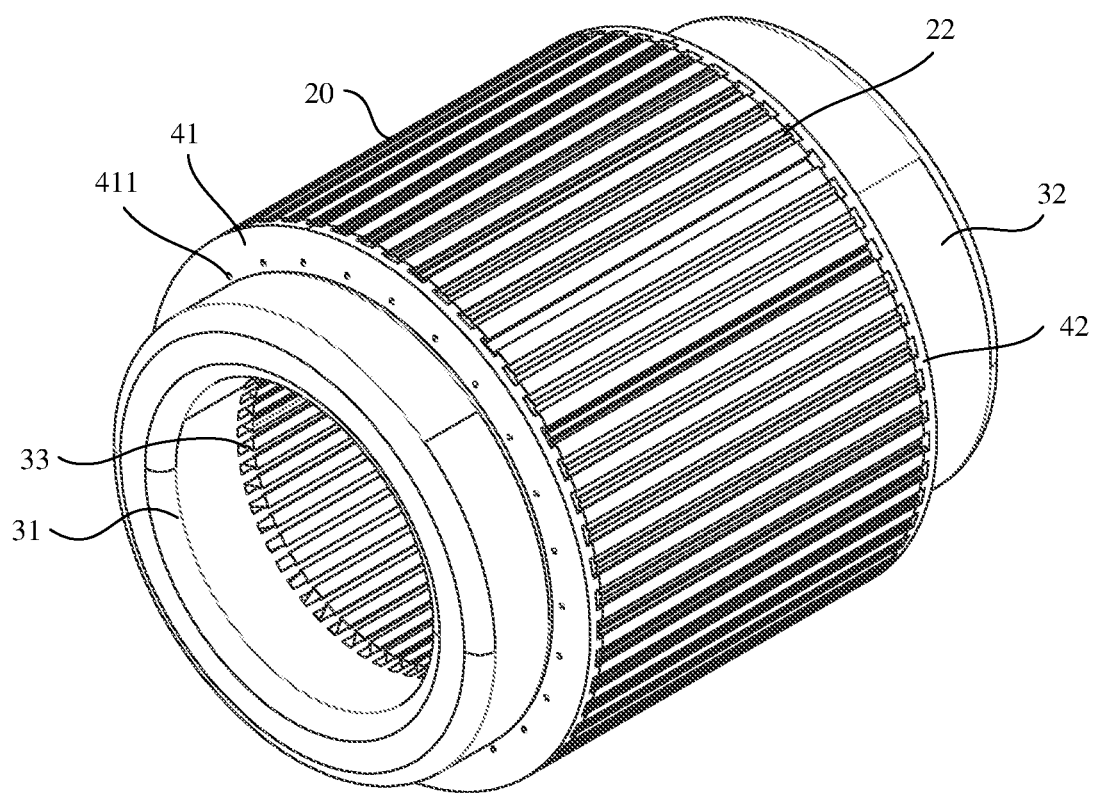
FIG. 27 is a schematic diagram of a motor when no housing is disposed in the motor according to an embodiment.
Figure 28A:
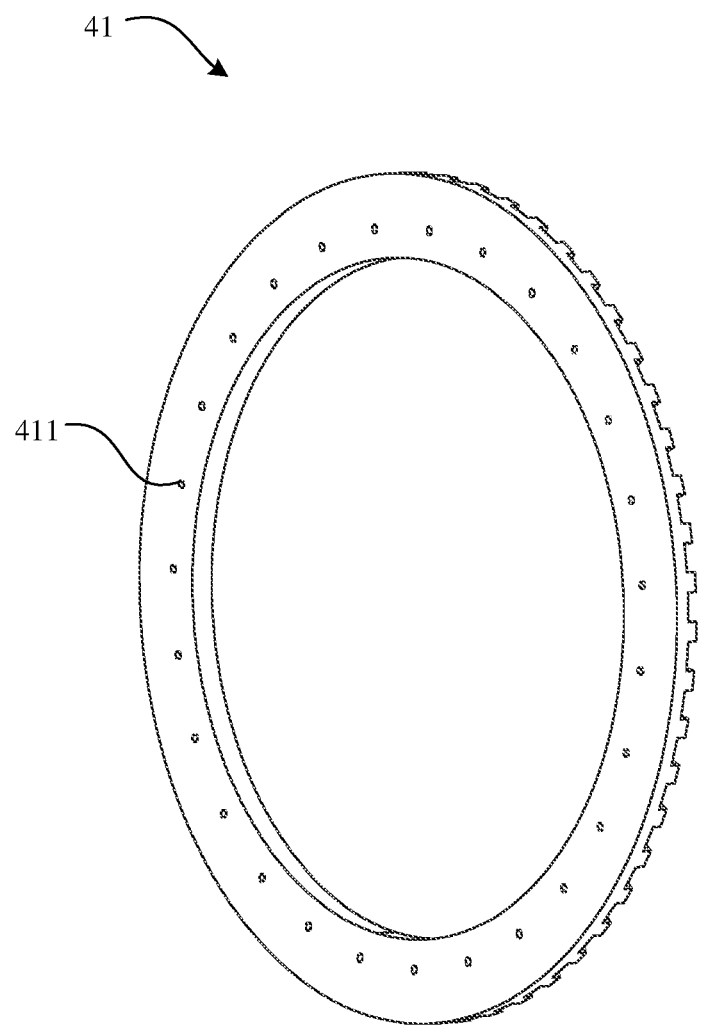
FIG. 28A is a schematic diagram of a first end cap in a motor according to an embodiment.
Figure 28B:
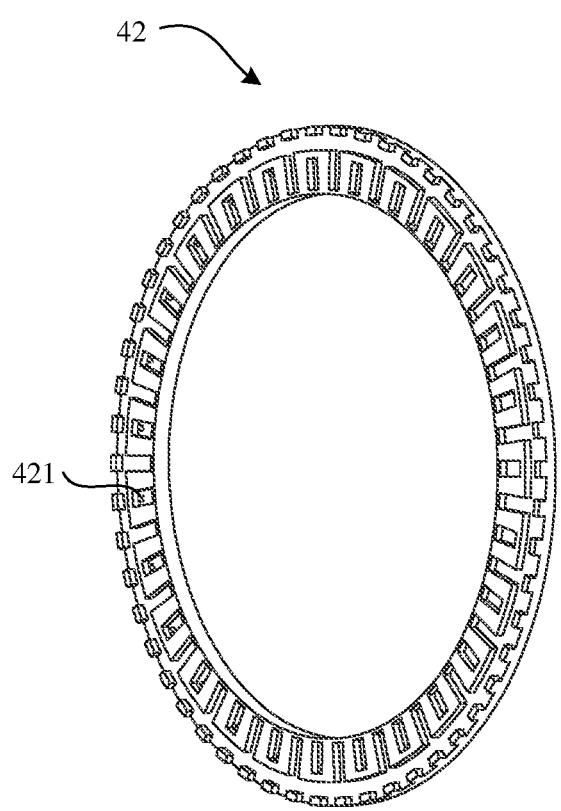
FIG. 28B is a schematic diagram of a second end cap in a motor according to an embodiment.
Figure 29:
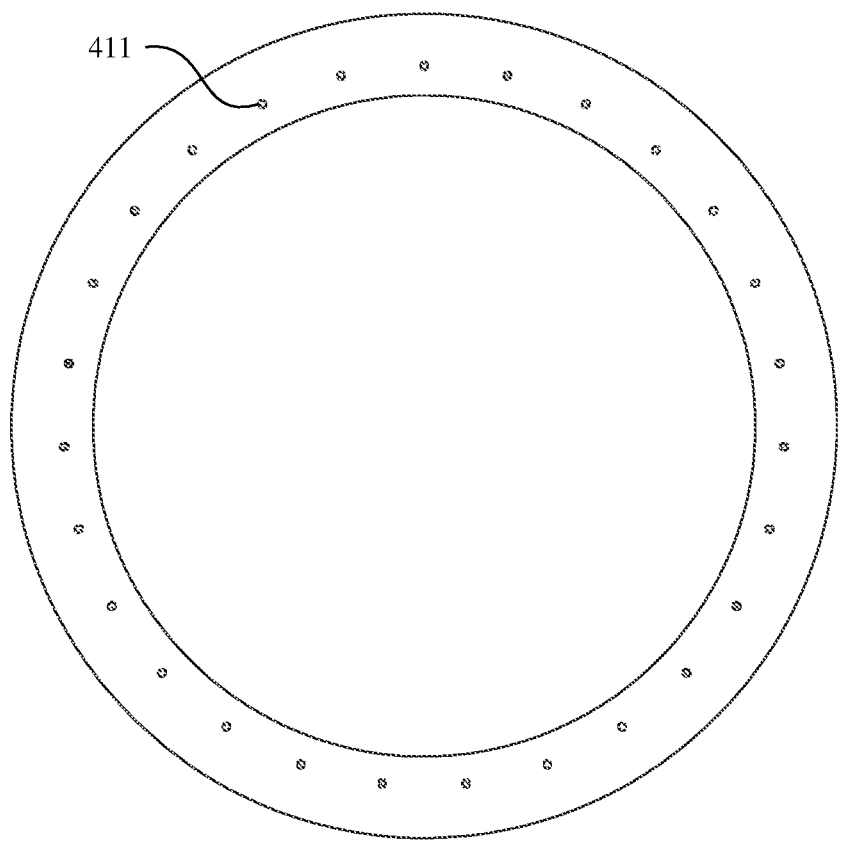
FIG. 29 is a schematic front view of a first end cap in a motor according to an embodiment.
Figure 30:
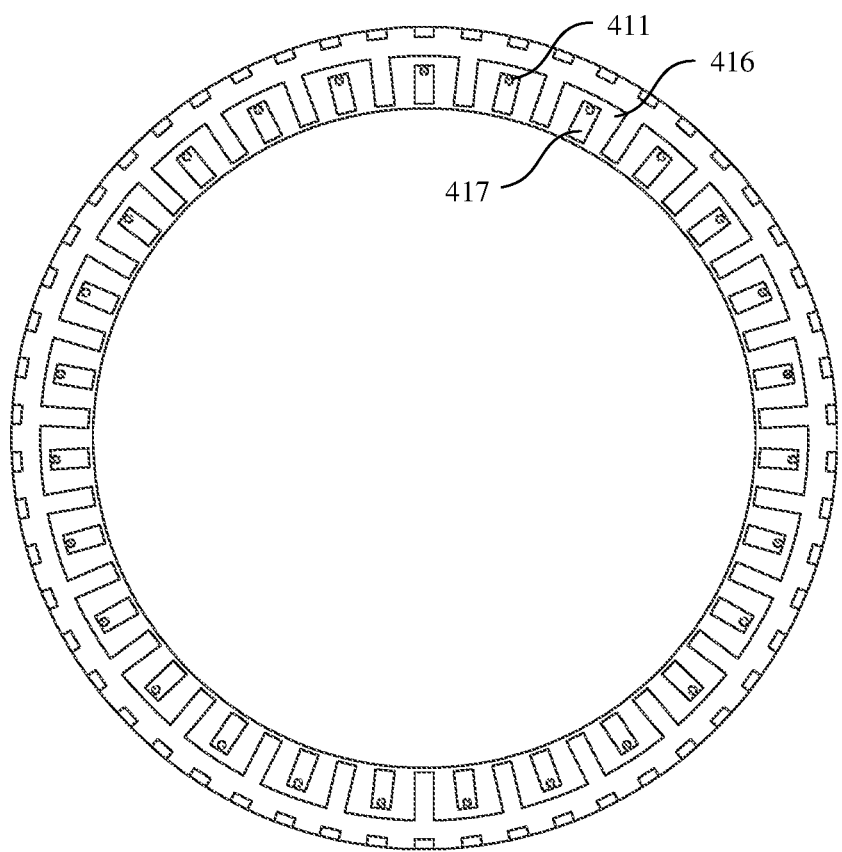
FIG. 30 is a schematic rear view of a first end cap in a motor according to an embodiment.

A difference between this embodiment and Embodiment 1 lies in that, in this embodiment, referring to FIG. 27 and FIG. 28A, the first nozzle 411 is a circular nozzle; and referring to FIG. 28B, the second nozzle 421 is a circular nozzle. Referring to FIG. 29, the plurality of first nozzles 411 may be circumferentially disposed evenly at intervals. Referring to FIG. 30, the first nozzle 411 is provided on the first recessed portion 417 of the first separation block 416, and the first nozzle 411 is close to the outer edge of the first end cap 41.

In this embodiment, when the first nozzle 411 and the second nozzle 421 are configured as circular nozzles, the circular nozzles can cause the cooling oil to be sprayed out to the two end parts of the coil winding 30 at a higher speed under same oil pressure.

Figure 31:
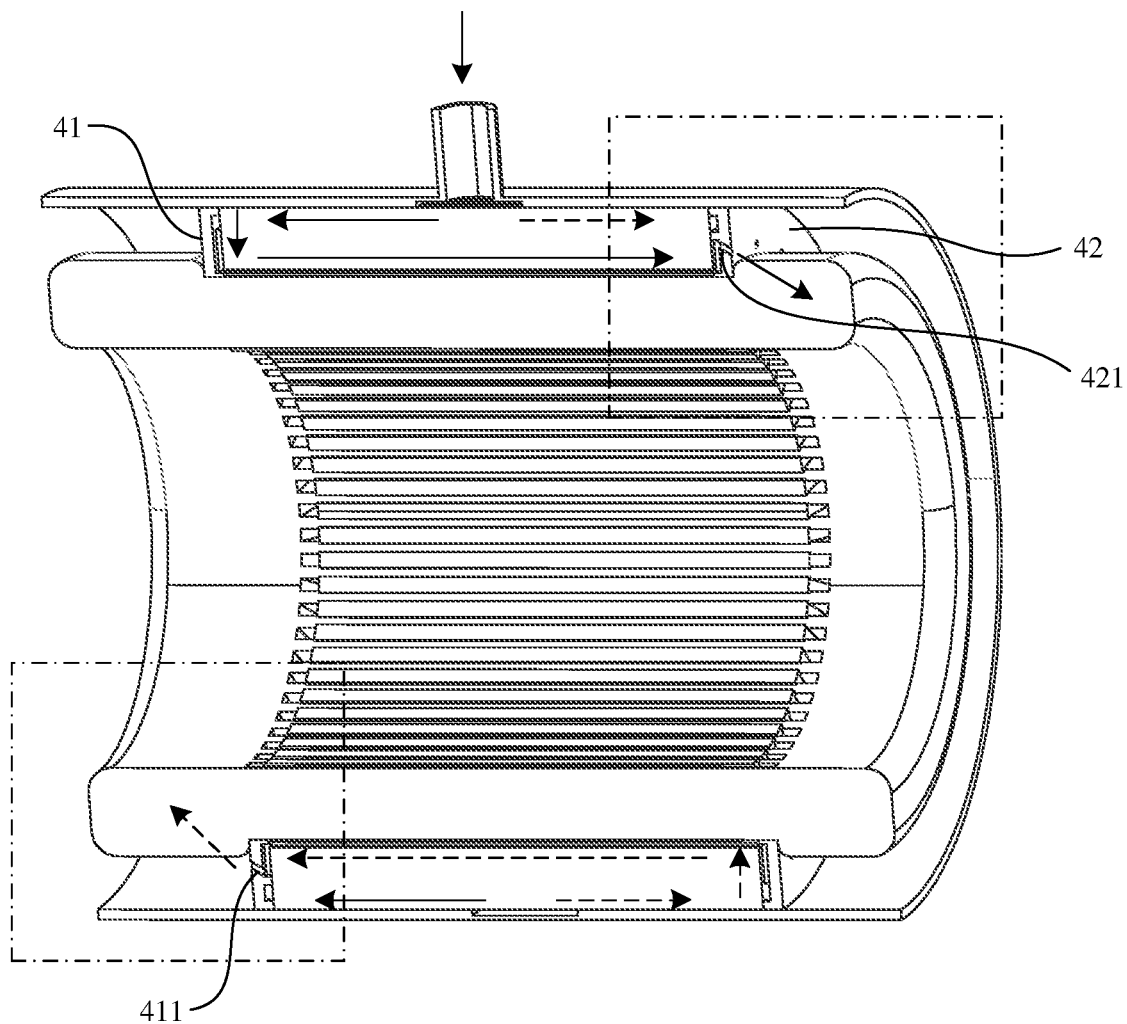
FIG. 31 is a schematic diagram of a cross-section of a motor according to an embodiment.
Figure 32:
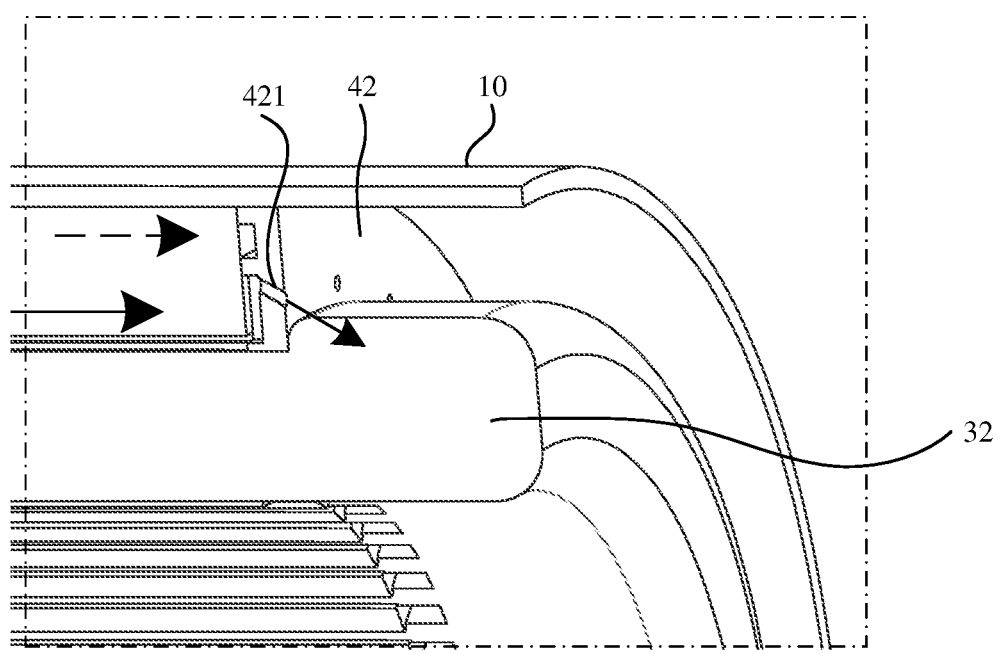
FIG. 32 is an enlarged schematic diagram of a dashed-line box portion in an upper right corner in FIG. 31.
Figure 33:
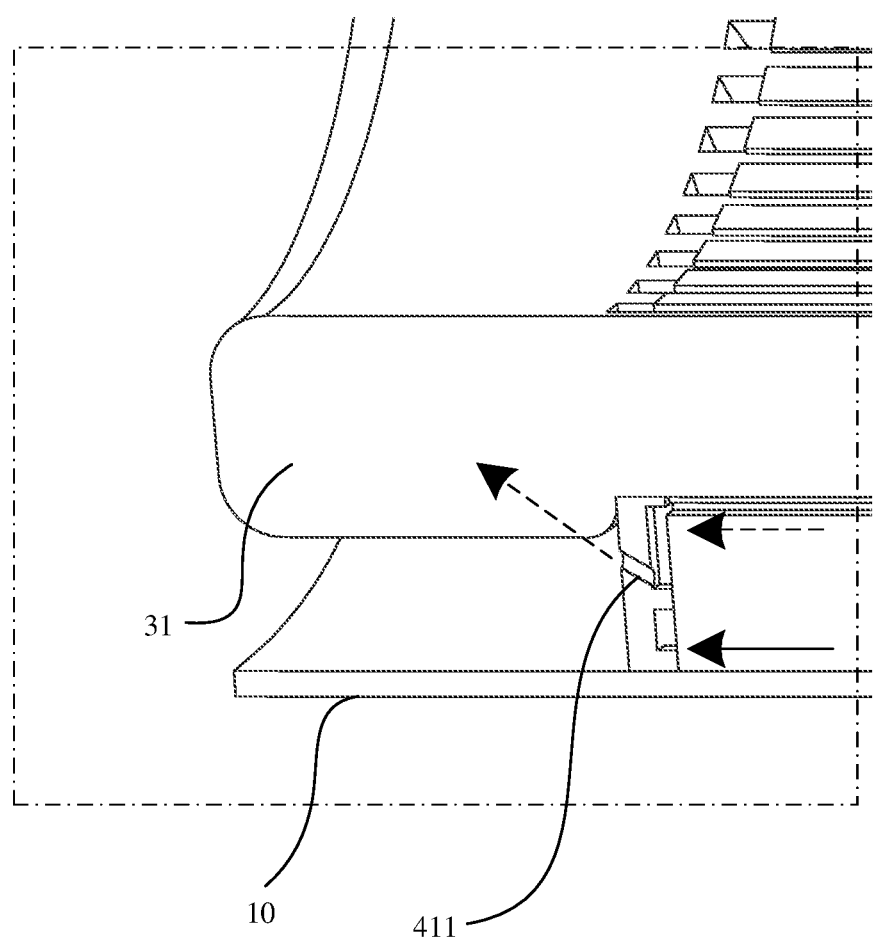
FIG. 33 is an enlarged schematic diagram of a dashed-line box portion in a lower left corner in FIG. 31.

In this embodiment, the nozzle is an inclined nozzle that inclines towards a direction of the coil winding 30. For example, referring to FIG. 31 and FIG. 32, the second nozzle 421 is inclined towards a direction of the second end part 32 of the coil winding 30, so that the cooling oil can be centrally sprayed out to the second end part 32 along an inclined solid arrow in FIG. 32. Referring to FIG. 33, the first nozzle 411 is inclined towards a direction of the first end part 31 of the coil winding 30, so that the cooling oil can be centrally sprayed out to the first end part 31 along an inclined dashed arrow in FIG. 33.

It should be noted that when the first nozzle 411 and the second nozzle 421 are inclined nozzles, the shapes of the first nozzle 411 and the second nozzle 421 include, but are not limited to, circular shapes. When the first nozzle 411 and the second nozzle 421 are of flat structures, the first nozzle 411 and the second nozzle 421 may be configured to be inclined.

The first nozzle 411 and the second nozzle 421 are inclined towards the first end part 31 and the second end part 32, respectively, so that the cooling oil is centrally sprayed out to the two end parts of the coil winding 30, thereby implementing desirable heat dissipation on the two end parts of the coil winding 30.

Embodiment 3

Figure 34:
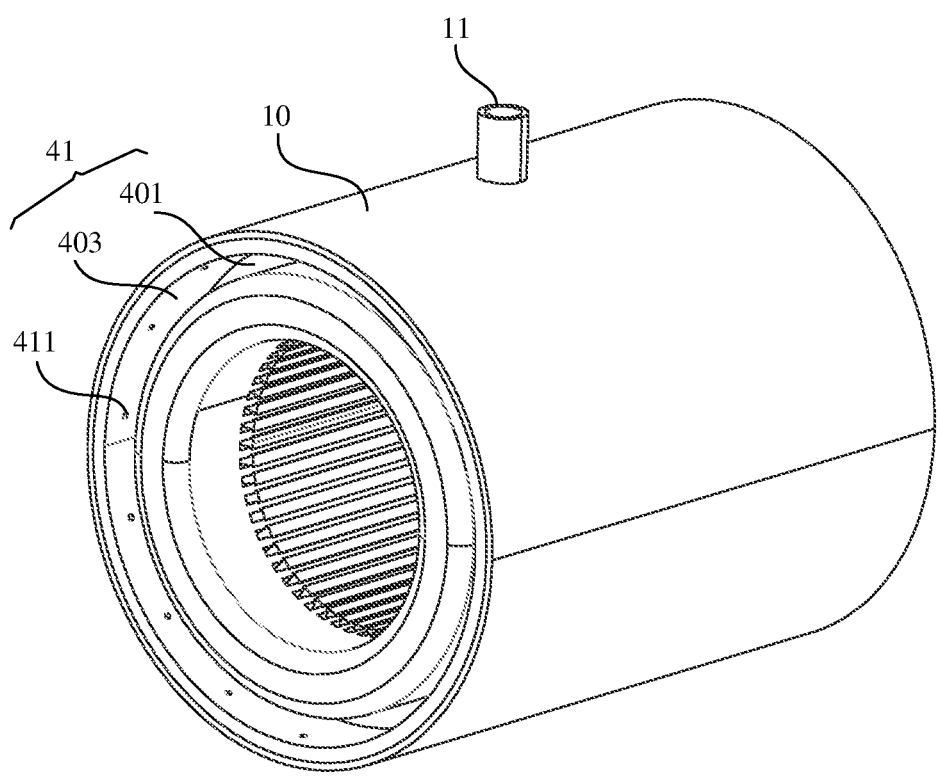
FIG. 34 is a schematic diagram of a three-dimensional structure of a motor according to an embodiment.
Figure 35:
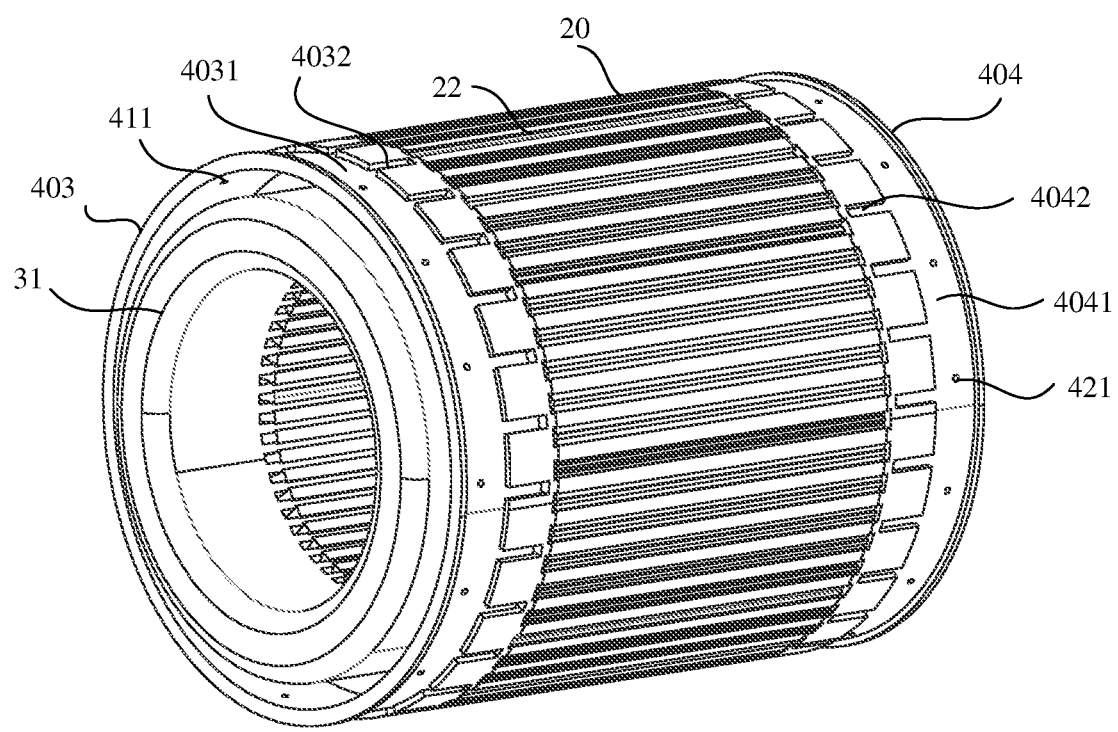
FIG. 35 is a schematic diagram of a three-dimensional structure of a motor after a housing is removed from the motor according to an embodiment.

A difference between this embodiment and the foregoing two embodiments lies in that, in this embodiment, the first nozzle 411 and the second nozzle 421 may be disposed face to face with the first end part 31 and the second end part 32. FIG. 35 is a three-dimensional diagram of a stator after the housing 10 in FIG. 34 is removed. Referring to FIG. 35, the first end cap 41 further includes an axially protruded first extension plate 403 connected to an outer edge of the first annular end plate 401. One end of the first extension plate 403 is connected to the outer edge of the first annular end plate 401, and the other end of the first extension plate 403 protrudes outwards along the axial direction of the stator core 20. The second end cap 42 further includes an axially protruded second extension plate 404 connected to an outer edge of the second annular end plate 402. One end of the second extension plate 404 is connected to the outer edge of the second annular end plate 402, and the other end of the second extension plate 404 protrudes outwards along the axial direction of the stator core 20. The first extension plate 403 is disposed face to face with the first end part 31, and the second extension plate 404 is disposed face to face with the second end part 32.

Figure 36:
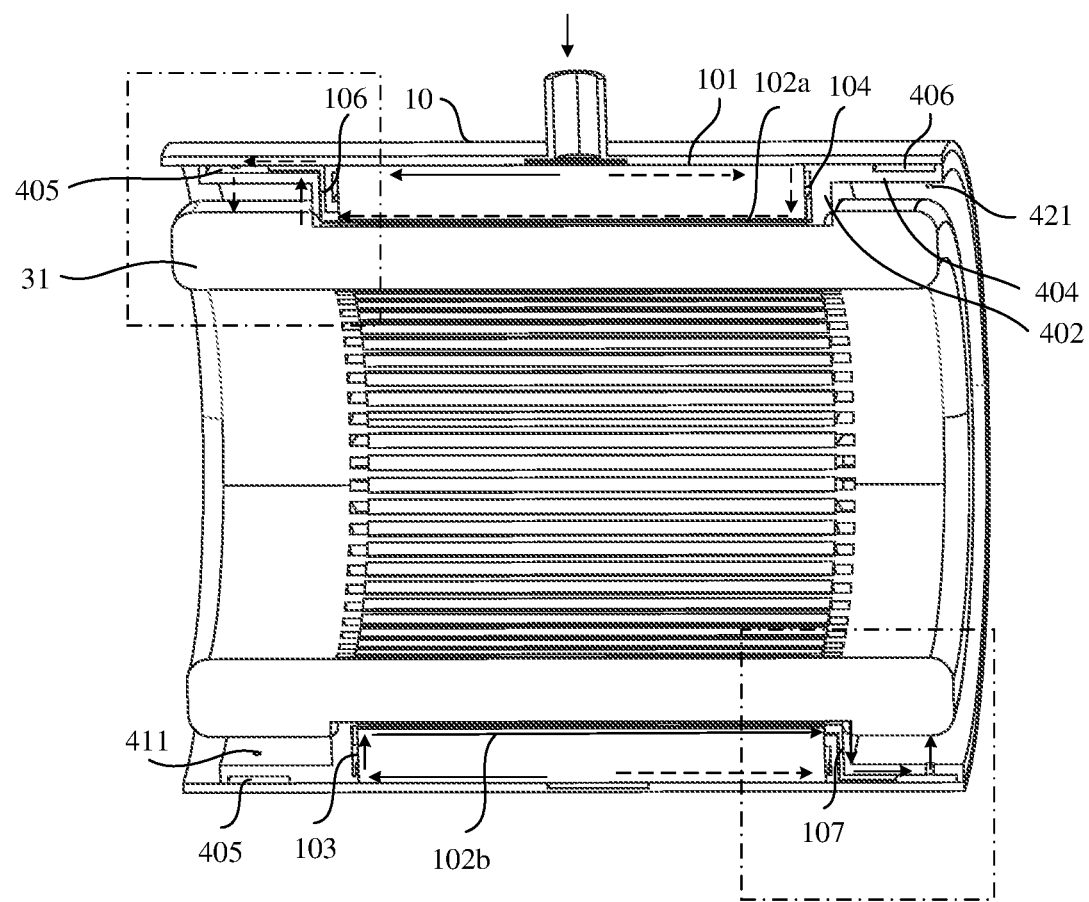
FIG. 36 is a schematic diagram of a cross-section of a motor according to an embodiment.
Figure 37:
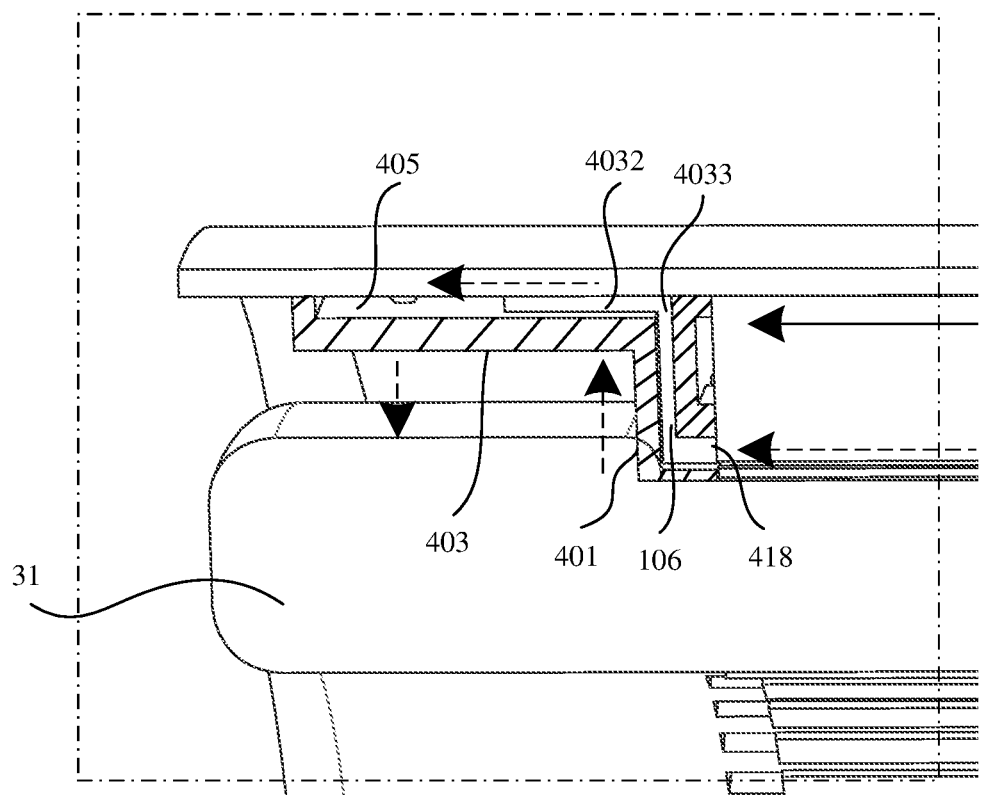
FIG. 37 is an enlarged schematic diagram of a dashed-line box portion in an upper left corner in FIG. 36.

Referring to FIG. 36 and FIG. 37, a first oil injection chamber 405 is formed between an outer surface of the first extension plate 403 and the housing 10, and the first extension plate 403 is provided with the plurality of first nozzles 411 connected to the first oil injection chamber 405. In other words, in this embodiment, the first nozzles 411 are provided on the first extension plate 403. A second oil injection chamber 406 is formed between an outer surface of the second extension plate 404 and the housing 10, and the second extension plate 404 is provided with the plurality of second nozzles 421 connected to the second oil injection chamber 406. In other words, the second nozzles 421 are provided on the second extension plate 404.

To implement a connection between the second nozzle 421 and the second oil channel 102a and a connection between the first nozzle 411 and the second oil channel 102b, in this embodiment, both the first oil injection chamber 405 and the second oil injection chamber 406 are connected to the oil filling port 11. In this way, the cooling oil flows from one end of the plurality of first oil channels 101 to the third oil channel 103 along a solid arrow, enters some of the second oil channels 102b after being mixed in the third oil channel 103, enters the second oil injection chamber 406 after passing through the second oil channels 102b, and is finally sprayed out from the second nozzle 421 to the second end part 32. The cooling oil flows from the other end of the plurality of first oil channels 101 to the fourth oil channel 104 along a dashed arrow, enters some of the second oil channels 102a after being mixed in the fourth oil channel 104, enters the first oil injection chamber 405 after passing through the second oil channels 102a, and is finally sprayed out from the first nozzle 411 on the first extension plate 403.

When the first oil injection chamber 405 and the second oil injection chamber 406 are connected to the oil filling port 11, an implementation is as follows: Referring to FIG. 36 and FIG. 37, a plurality of sixth oil channels 106 may be disposed in the first annular end plate 401, the plurality of sixth oil channels 106 may be disposed at intervals in the first annular end plate 401, and two ends of the plurality of sixth oil channels 106 may be connected to the first oil injection chamber 405 and the some of the second oil channels 102a, respectively. In this way, one end of the sixth oil channel 106 is connected to the oil filling port 11 through the second oil channel 102a, the fourth oil channel 104, and the first oil channel 101. The cooling oil enters the first oil injection chamber 405 through the sixth oil channel 106 along dashed arrows in FIG. 37 and is sprayed out from the first nozzle 411 to the first end part 31.

Figure 38:
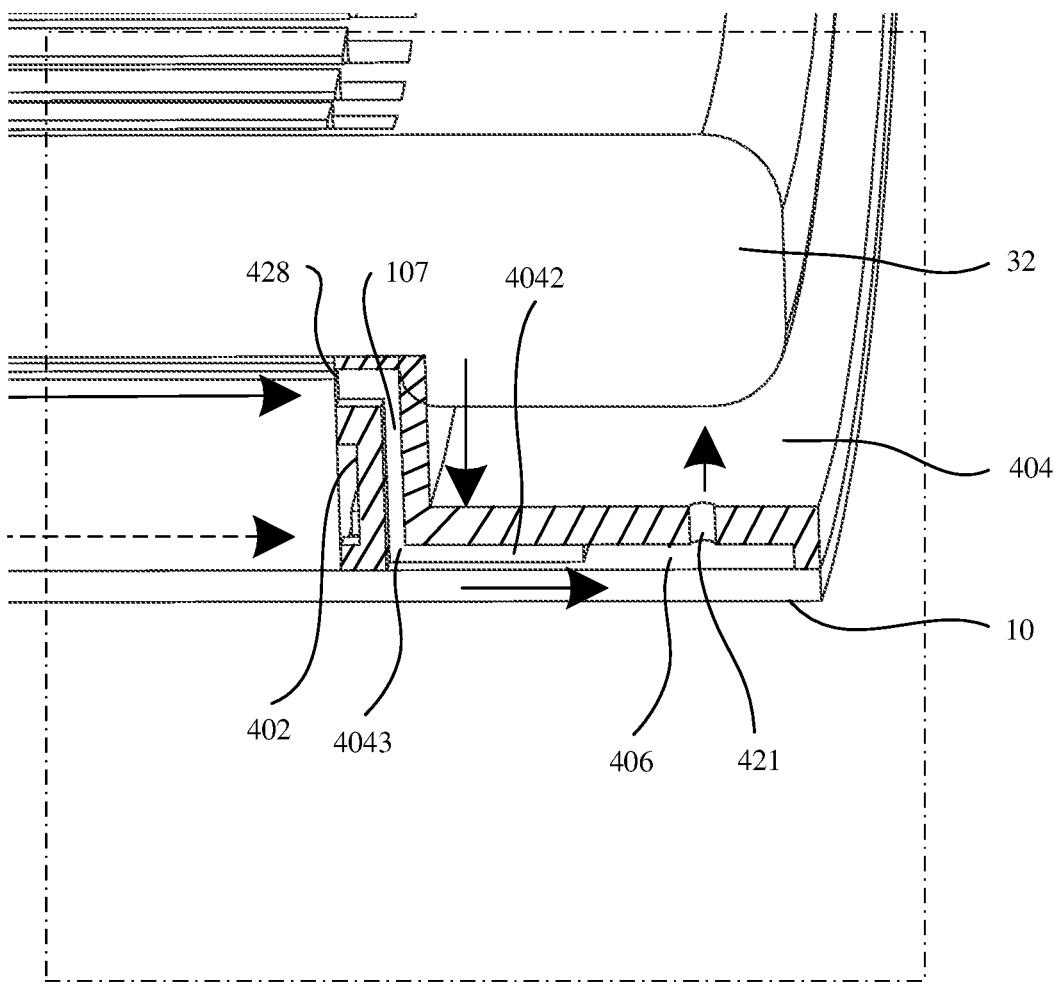
FIG. 38 is an enlarged schematic diagram of a dashed-line box portion in a lower right corner in FIG. 36.

Referring to FIG. 36 and FIG. 38, a plurality of seventh oil channels 107 may be disposed in the second annular end plate 402, and two ends of the plurality of seventh oil channels 107 may be connected to the second oil injection chamber 406 and the remaining second oil channel 102b, respectively. In this way, one end of the seventh oil channel 107 is connected to the oil filling port 11 through the second oil channel 102b, the third oil channel 103, and the first oil channel 101. The cooling oil enters the seventh oil channel 107 along a solid arrow in FIG. 38, enters the second oil injection chamber 406 through the seventh oil channel 107, and is sprayed out from the second nozzle 421 to the second end part 32.

Figure 39:
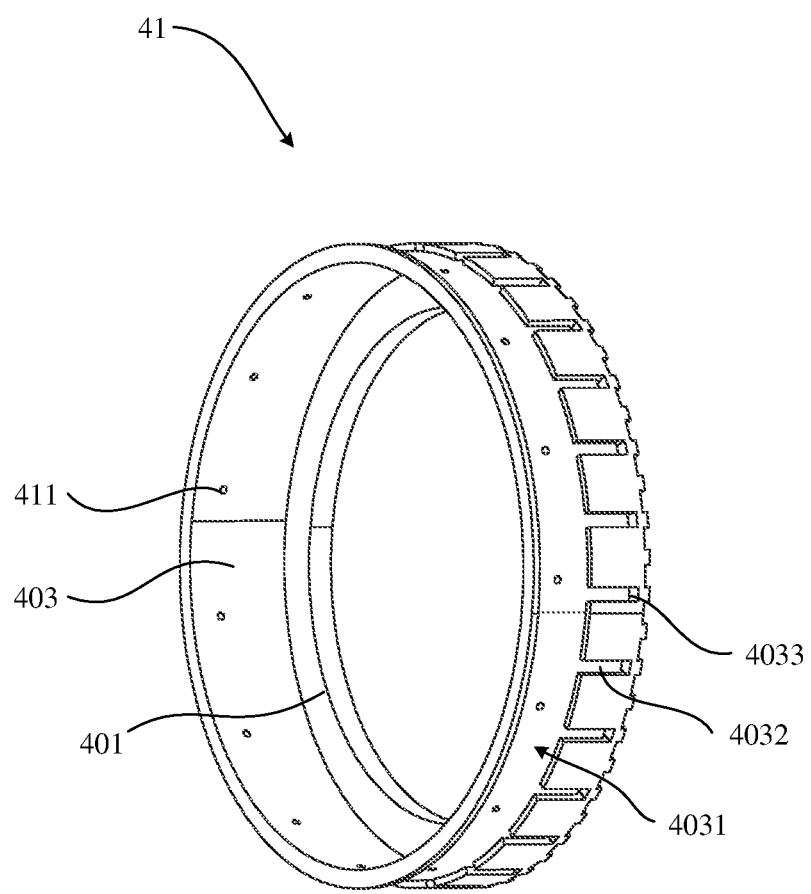
FIG. 39 is a schematic diagram of a structure of a first end cap in a motor according to an embodiment.

In this embodiment, when the first oil injection chamber 405 is formed between the first extension plate 403 and an inner wall of the housing 10, a possible implementation is as follows: Referring to FIG. 39, a third groove 4031 is provided on the outer surface of the first extension plate 403, and the first oil injection chamber 405 is enclosed by the third groove 4031 and the inner surface 12 of the housing 10. A fourth groove 4041 is provided on the outer surface of the second extension plate 404, and the second oil injection chamber 406 is enclosed by the fourth groove 4041 and the inner surface 12 of the housing 10.

In this embodiment, referring to FIG. 35 and FIG. 39, both the first extension plate 403 and the second extension plate 404 are of annular structures, and therefore both the first oil injection chamber 405 and the second oil injection chamber 406 are annular chambers.

In this embodiment, to implement better heat dissipation in circumferential directions of the first end part 31 and the second end part 32, referring to FIG. 39, a plurality of first grooves 4032 may be provided on the outer surface of the first extension plate 403, and two ends of the first groove 4032 may be connected to the sixth oil channel 106 and the first oil injection chamber 405, respectively (refer to FIG. 37). Referring to FIG. 37, the cooling oil passes through the sixth oil channel 106 and then enters the annular first oil injection chamber 405 under the guidance of the first groove 4032 to be mixed. Under the guidance action of the first groove 4032, it is ensured that the cooling oil remains at relatively high oil pressure after being mixed in the second oil injection chamber 406, so that the cooling oil is sprayed out from the first nozzle 411 to the first end part 31 at a relatively high speed.

Figure 41:
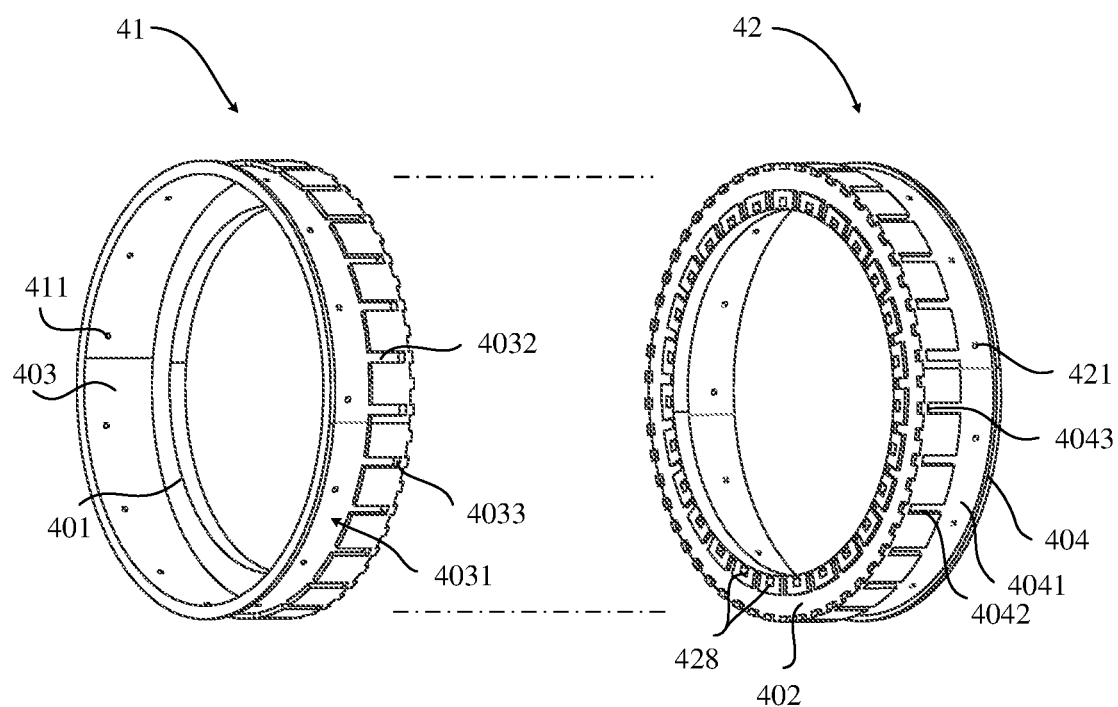
FIG. 41 is a schematic diagram of structures of a first end cap and a second end cap in a motor according to an embodiment.

Referring to FIG. 41, a plurality of second grooves 4042 may be provided on the outer surface of the second extension plate 404, and two ends of the second groove 4042 may be connected to the seventh oil channel 107 and the second oil injection chamber 406, respectively (refer to FIG. 38). In this way, the cooling oil passes through the seventh oil channel 107 and then enters the annular second oil injection chamber 406 under the guidance of the second groove 4042 to be mixed. Under the guidance action of the second groove 4042, it is ensured that the cooling oil remains at relatively high oil pressure after being mixed in the first oil injection chamber 405, so that the cooling oil is sprayed out from the second nozzle 421 to the second end part 32 at a relatively high speed.

In some examples, the sixth oil channel 106 may be directly connected to the first oil injection chamber 405, that is, no first groove 4032 is provided on the first extension plate 403. Correspondingly, the seventh oil channel 107 may also be directly connected to the second oil injection chamber 406, that is, no second groove 4042 is provided on the second extension plate 404.

Referring to FIG. 39, first oil outlet ports 4033 are respectively provided on groove walls (for example, groove bottoms) that are of the first grooves 4032 and that are close to the stator core 20, and the first oil outlet port 4033 is connected to the sixth oil channel 106 (refer to FIG. 37).

Figure 40:
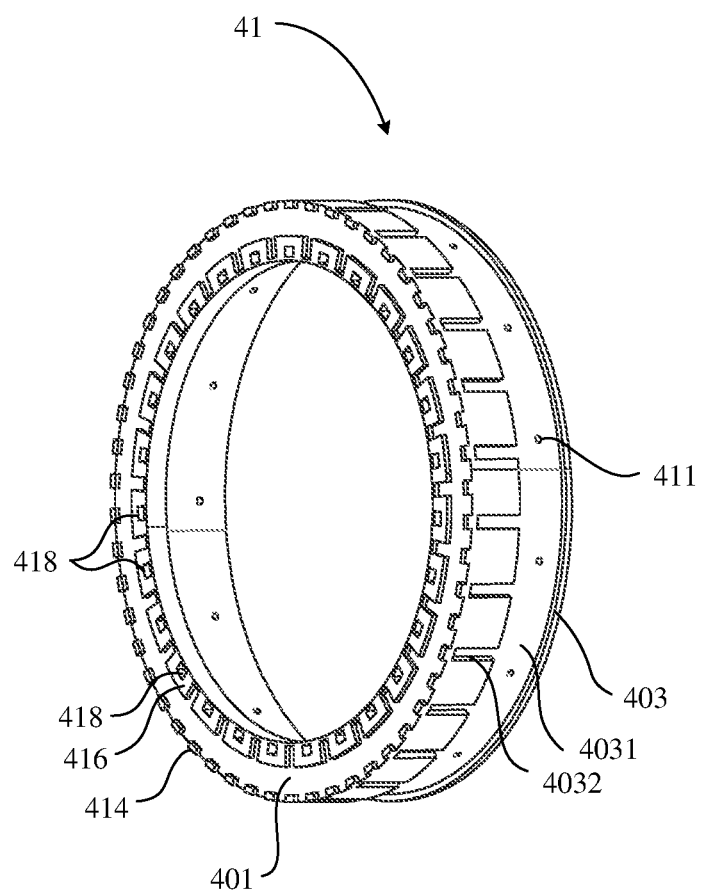
FIG. 40 is a schematic diagram of a structure of a first end cap, which is in a motor, in another direction according to an embodiment.

Referring to FIG. 40, a surface that is of the first annular end plate 401 and that faces the stator core 20 is provided with a plurality of first separation blocks 416 disposed at intervals, and a first oil inlet port 418 (refer to FIG. 37) connected to the sixth oil channel 106 is provided on the first separation block 416. The plurality of sixth oil channels 106 may be connected to the some of the second oil channels 102b through the first oil inlet port 418.

Referring to FIG. 41, second oil outlet ports 4043 are respectively provided on groove walls that are of the second grooves 4042 and that are close to the stator core 20, and the second oil outlet port 4043 is connected to the seventh oil channel 107 (refer to FIG. 38). A surface that is of the second annular end plate 402 and that faces the stator core 20 is provided with a plurality of second separation blocks 426 disposed at intervals, and a second oil inlet port 428 (refer to FIG. 38) connected to the seventh oil channel 107 is provided on the second separation block 426. The plurality of seventh oil channels 107 may be connected to the remaining second oil channel 102b through the second oil inlet port 428.

For a manner of disposing the first separation block 416 and the second separation block 426, reference may be made to the foregoing embodiments. Details are not described in this embodiment again.

Embodiment 4

Figure 42:
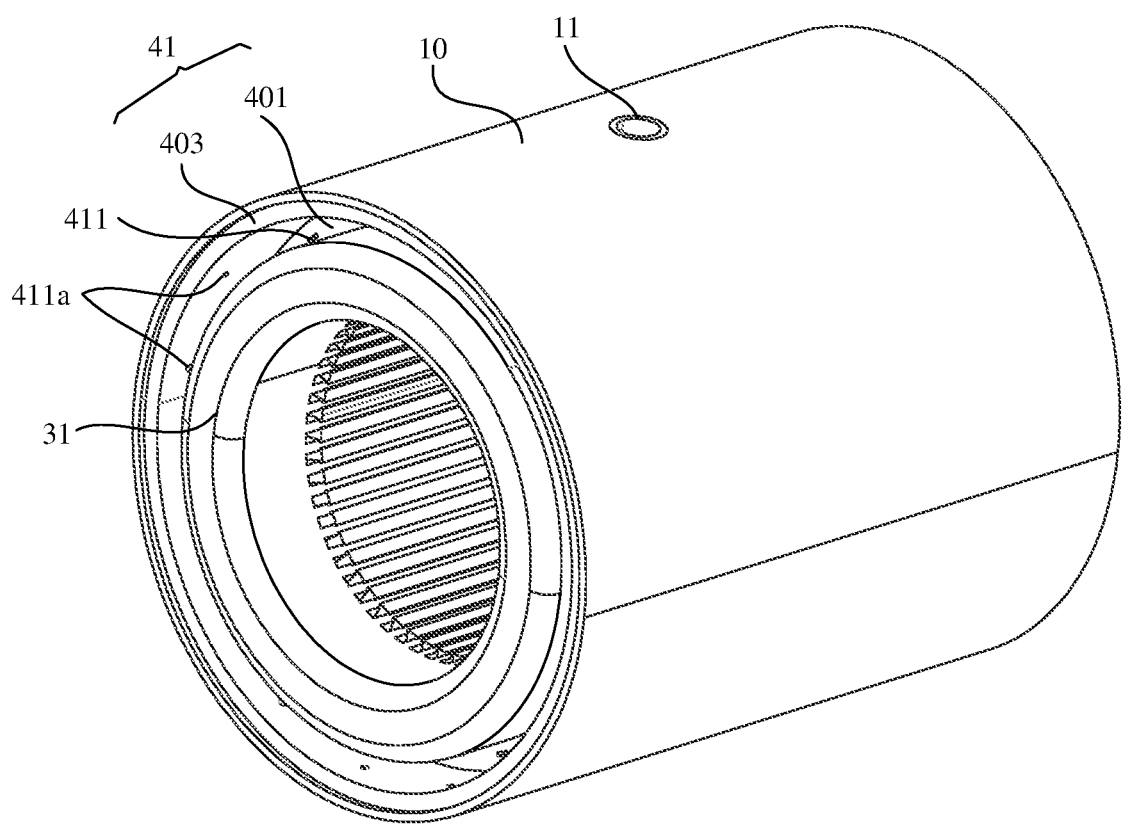
FIG. 42 is a schematic diagram of a three-dimensional structure of a motor according to an embodiment.
Figure 43:
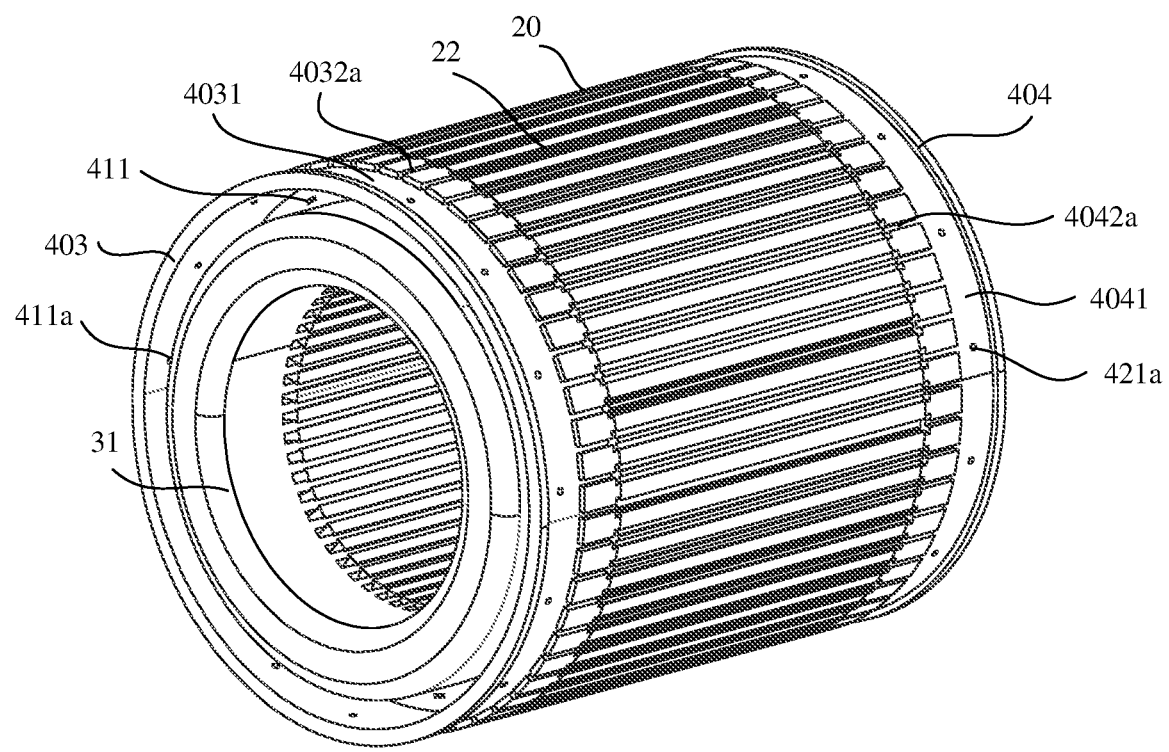
FIG. 43 is a schematic diagram of a three-dimensional structure of a motor after a housing is removed from the motor according to an embodiment.
Figure 44:
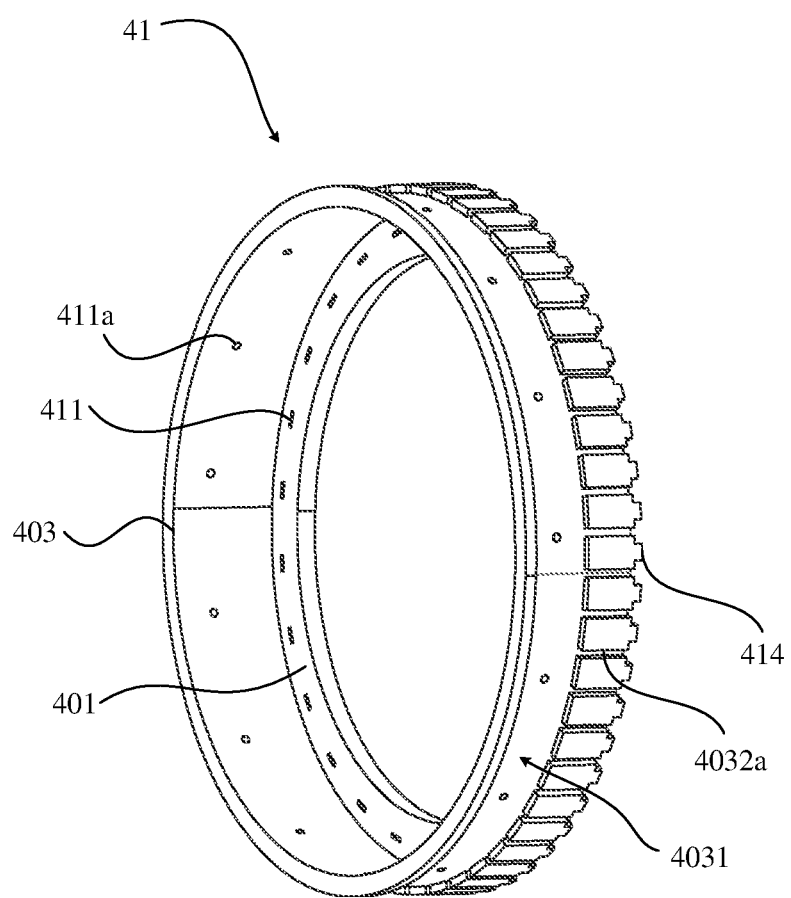
FIG. 44 is a schematic diagram of a structure of a first end cap in a motor according to an embodiment.
Figure 47:
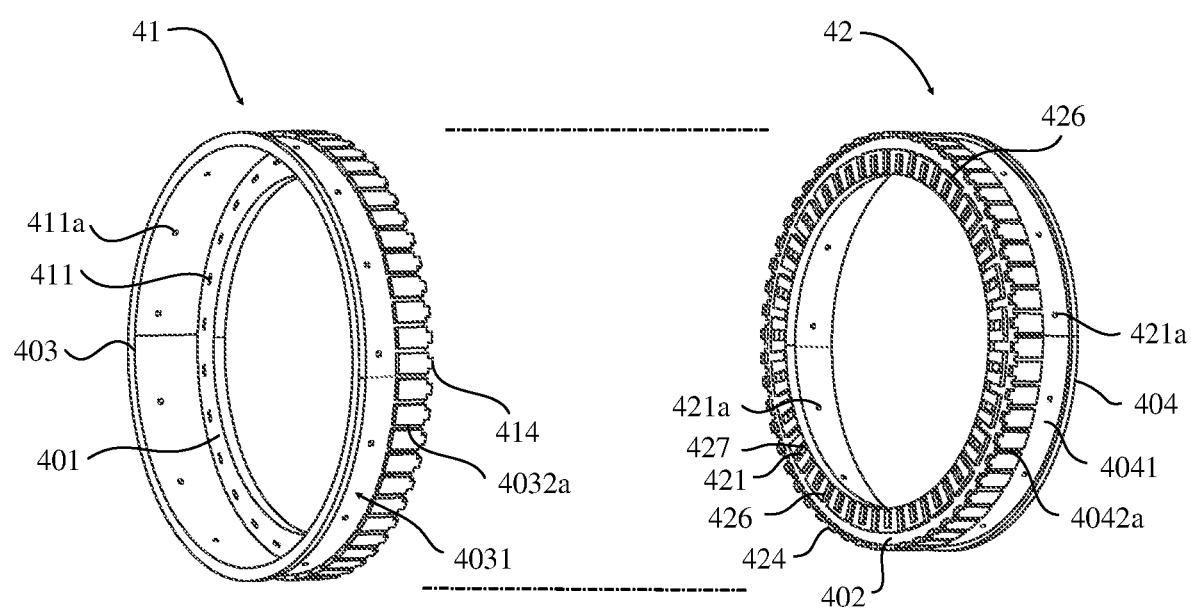
FIG. 47 is a schematic diagram of structures of a first end cap and a second end cap in a motor according to an embodiment.
Figure 48:
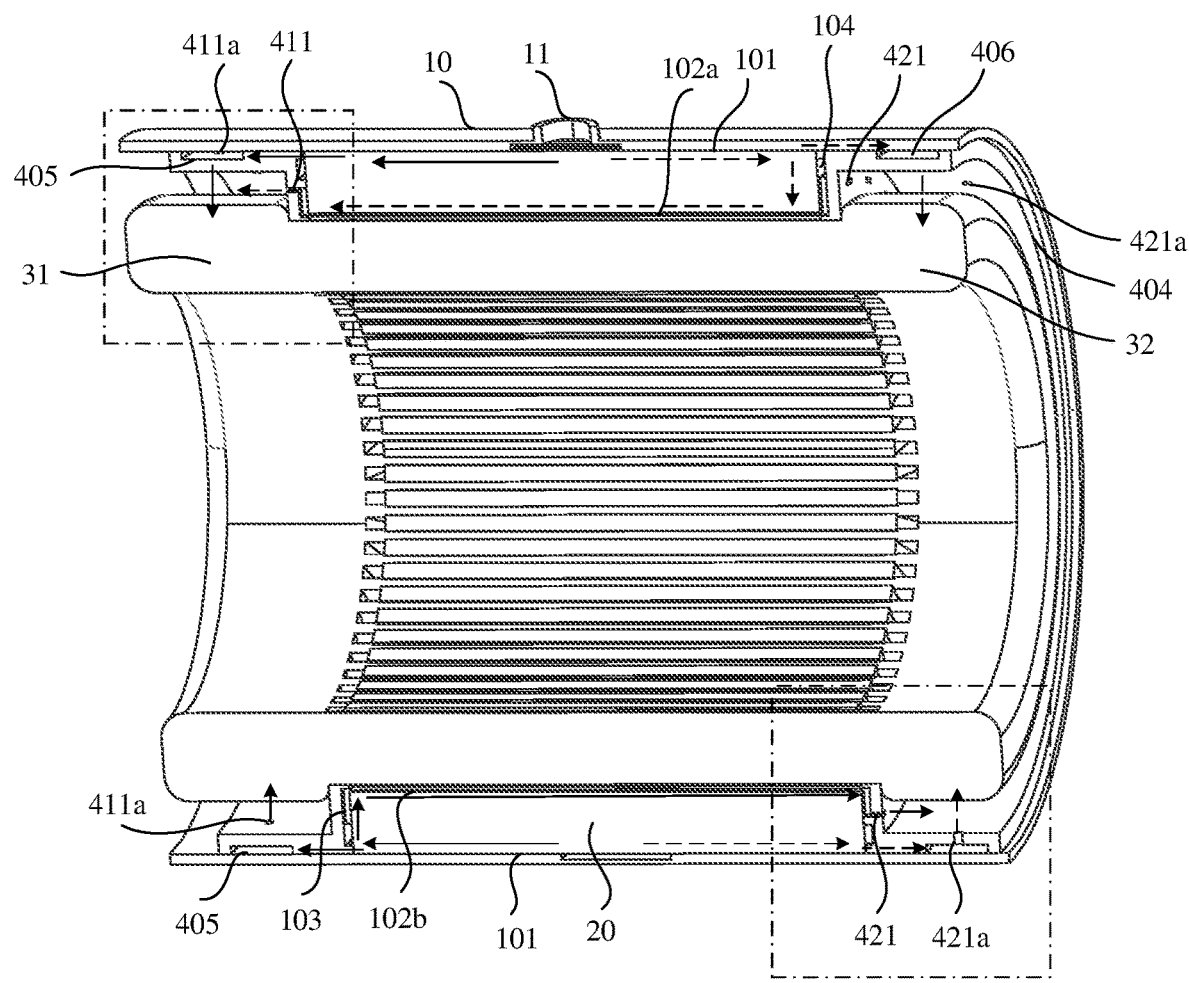
FIG. 48 is a schematic diagram of a cross-section of a motor according to an embodiment.
Figure 49:
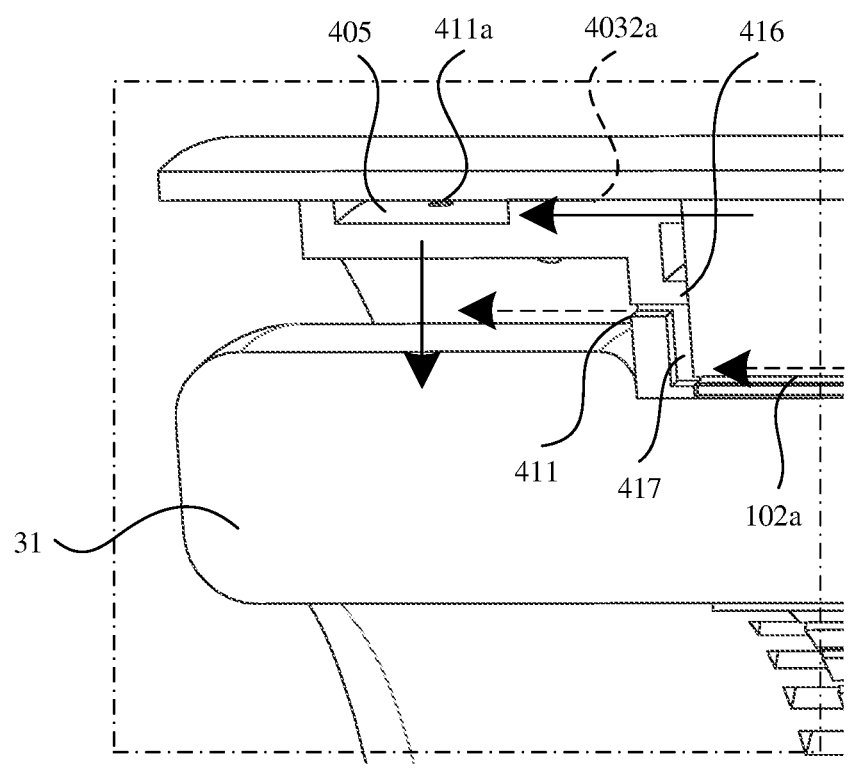
FIG. 49 is an enlarged schematic diagram of a dashed-line box portion in an upper left corner in FIG. 48.
Figure 50:
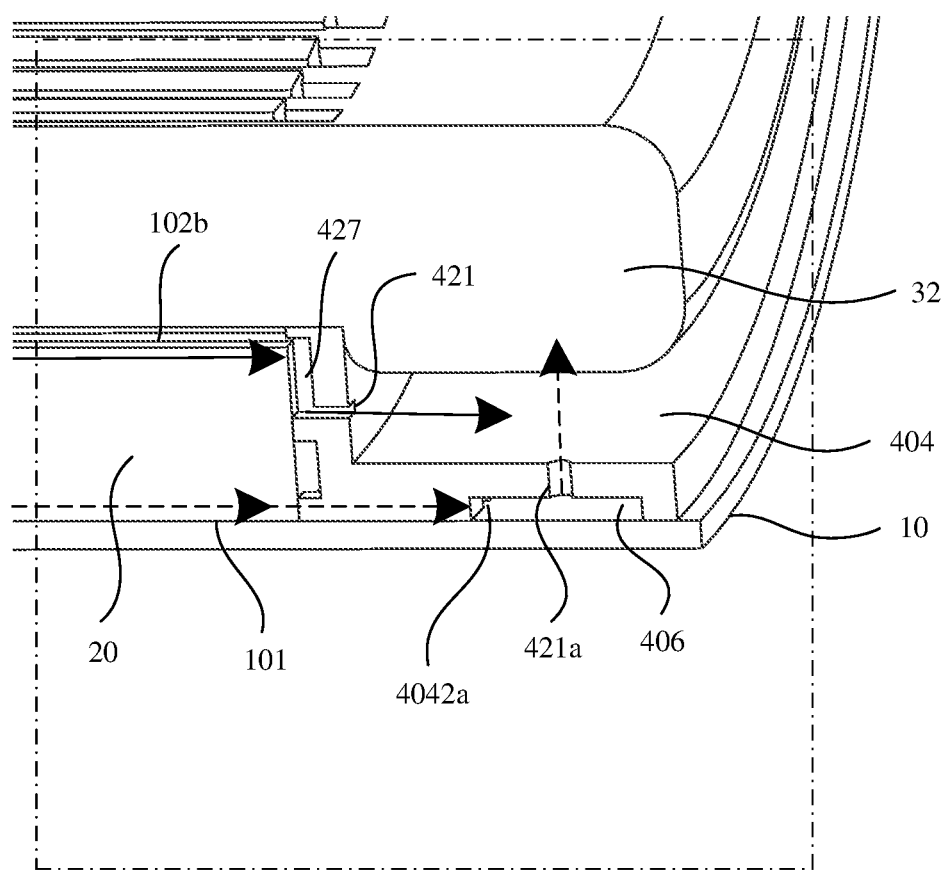
FIG. 50 is an enlarged schematic diagram of a dashed-line box portion in a lower right corner in FIG. 48.

A difference between this embodiment and the foregoing embodiments lies in that, in this embodiment, a nozzle is provided on both the first annular end plate 401 and the first extension plate 403 in the first end cap 41, and a nozzle is provided on both the second annular end plate 402 and the second extension plate 404 in the second end cap 42. Referring to FIG. 42, FIG. 43, and FIG. 44, the first annular end plate 401 is provided with a first nozzle 411, and the first extension plate 403 is provided with a third nozzle 411a. Referring to FIG. 47, the second annular end plate 402 is provided with a second nozzle 421, and the second extension plate 404 is provided with a fourth nozzle 421a. As shown in FIG. 48 and FIG. 49, the cooling oil enters some of the second oil channels 102a along dashed arrows, passes through the first recessed portion 417, and is horizontally sprayed out from the first nozzle 411 on the first annular end plate 401. The cooling oil enters the first oil injection chamber 405 along a solid arrow and is sprayed out from the third nozzle 411a on the first extension plate 403 towards the first end part 31. Referring to FIG. 50, the cooling oil enters the second oil injection chamber 406 along dashed arrows and is sprayed out from the fourth nozzle 421a on the second extension plate towards the second end part 32; and the cooling oil enters the second recessed portion 427 along a solid arrow and is horizontally sprayed out from the second nozzle 421.

Therefore, in this embodiment, the first annular end plate 401 is provided with the first nozzle 411, and the first extension plate 403 is provided with the third nozzle 411a, so that the cooling oil is sprayed out to the first end part 31 in two different directions, and a better cooling effect is achieved on the first end part 31. The second annular end plate 402 is provided with the second nozzle 421, and the second extension plate 404 is provided with the fourth nozzle 421a, so that the cooling oil is sprayed out to the second end part 32 in two different directions, and a better cooling effect is achieved on the second end part 32.

Figure 45:
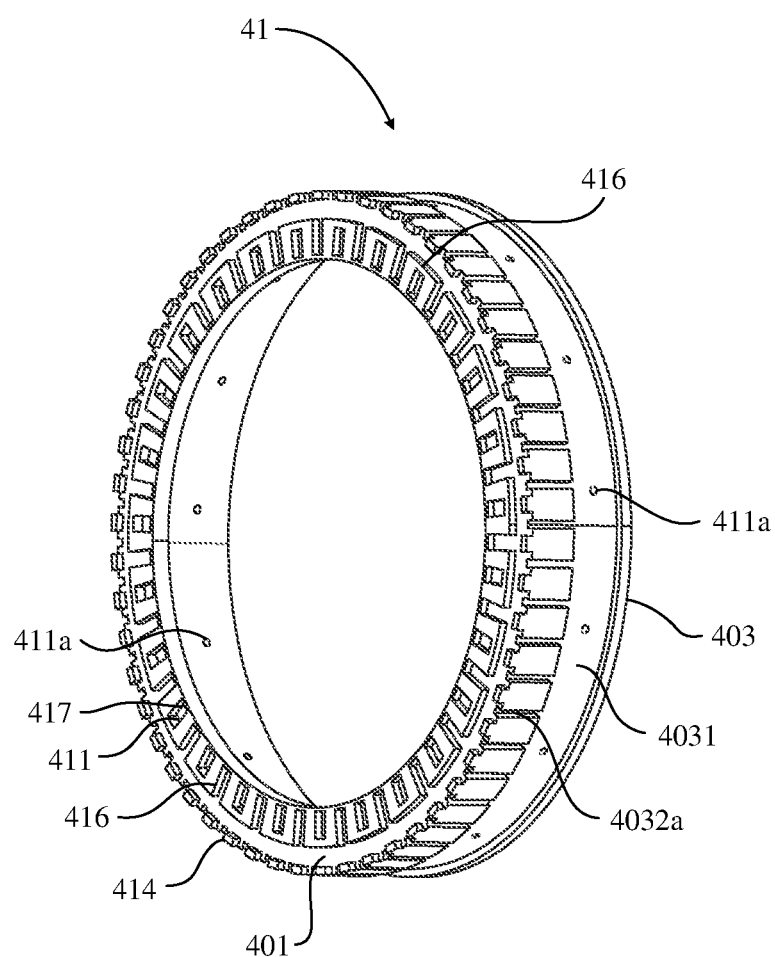
FIG. 45 is a schematic diagram of a structure of a first end cap, which is in a motor, in another direction according to an embodiment.

In this embodiment, when the first oil injection chamber 405 and the second oil injection chamber 406 are connected to the oil filling port 11, another possible implementation is as follows:

Referring to FIG. 44 and FIG. 45, a plurality of first through grooves 4032a may be provided on the outer surface of the first extension plate 403, that is, two ends of the first through grooves 4032a are open; and the two ends of the plurality of first through grooves 4032a may be connected to the first oil injection chamber 405 and one end of the plurality of first oil channels 101, respectively (refer to FIG. 49). In this way, the cooling oil enters the first oil injection chamber 405 through the first through groove 4032a along a solid arrow in FIG. 49.

Figure 46:
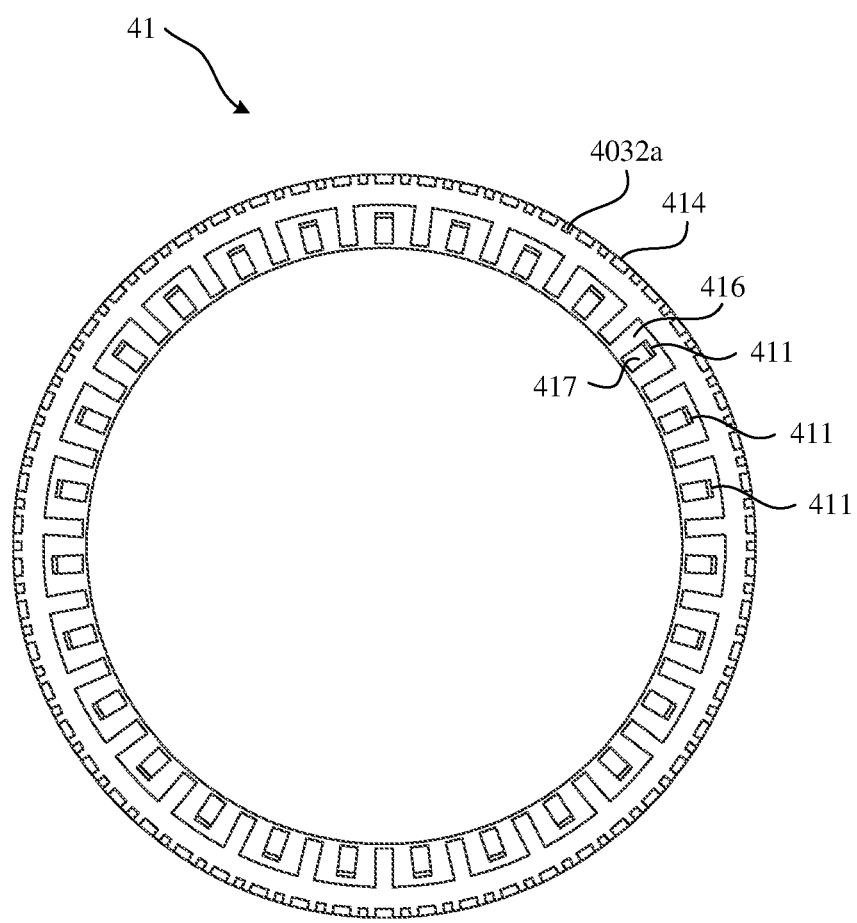
FIG. 46 is a schematic diagram of a rear side structure of a first end cap in a motor according to an embodiment.

Referring to FIG. 46, for a manner of disposing the first recessed portion 417, the first separation block 416, and the first bump 414, reference may be made to descriptions in the foregoing embodiments.

Referring to FIG. 47, a plurality of second through grooves 4042a may be provided on the outer surface of the second extension plate 404, that is, two ends of the second through grooves 4042a are open. Referring to FIG. 48 and FIG. 50, the two ends of the plurality of second through grooves 4042a are connected to the second oil injection chamber 406 and the other end of the plurality of first oil channels 101, respectively. In this way, the cooling oil enters the second oil injection chamber 406 through the second through groove 4042a along dashed arrows in FIG. 50.

Therefore, in this embodiment, referring to FIG. 48, the two ends of the plurality of first oil channels 101 are respectively connected to the third oil channel 103 and the fourth oil channel 104, and the two ends of the plurality of first oil channels 101 are also respectively connected to the first through groove 4032a and the second through groove 4042a. In this case, a part of the cooling oil in the plurality of first oil channels 101 enters the first oil injection chamber 405 and the second oil injection chamber 406 respectively through the first through groove 4032a and the second through groove 4042a and is sprayed out from the third nozzles 411a and the fourth nozzle 421a. The cooling oil sprayed out from the third nozzle 411a and the fourth nozzle 421a does not absorb heat through the plurality of second oil channels 102, and therefore temperature of the cooling oil sprayed out from the third nozzle 411a and the fourth nozzle 421a is lower than that of the cooling oil sprayed out from the first nozzle 411 and the second nozzle 421. In this way, the cooling oil sprayed out from the third nozzle 411a and the fourth nozzle 421a can achieve a better cooling effect on the first end part 31 and the second end part 32.

Embodiment 5

Figure 51:
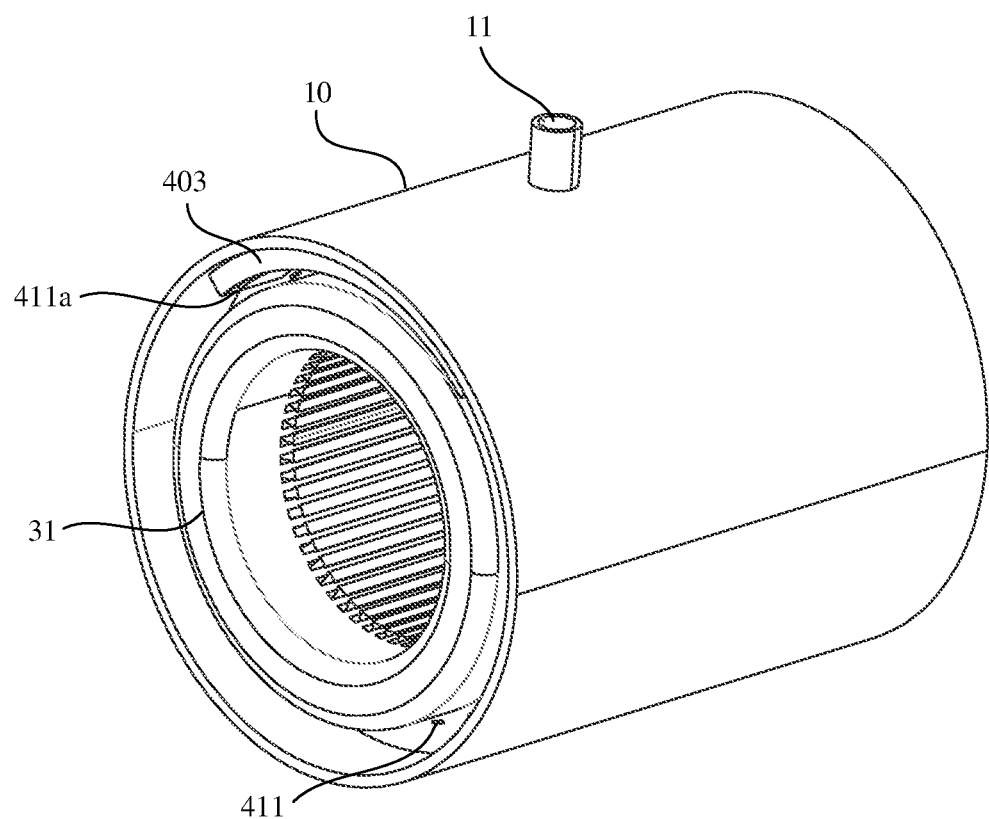
FIG. 51 is a schematic diagram of a three-dimensional structure of a motor according to an embodiment.
Figure 52:
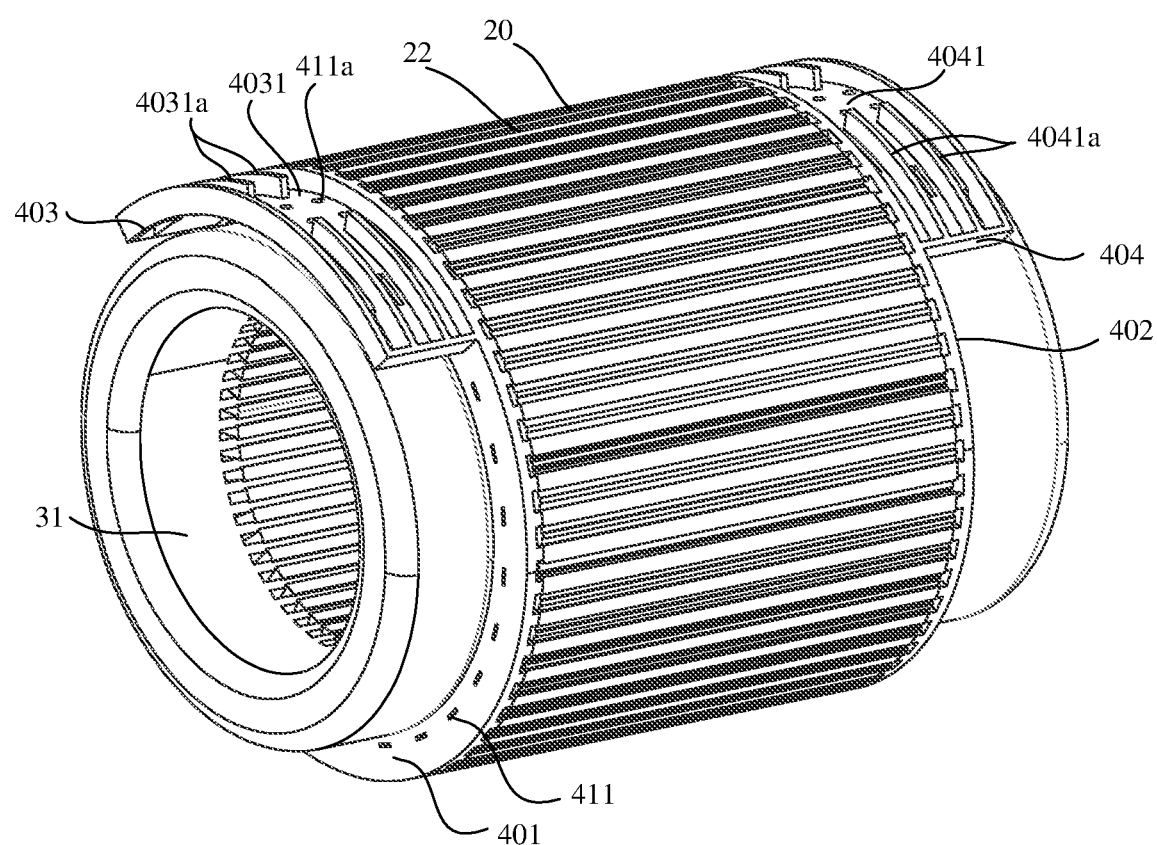
FIG. 52 is a schematic diagram of a three-dimensional structure of a motor after a housing is removed from the motor according to an embodiment.
Figure 53:
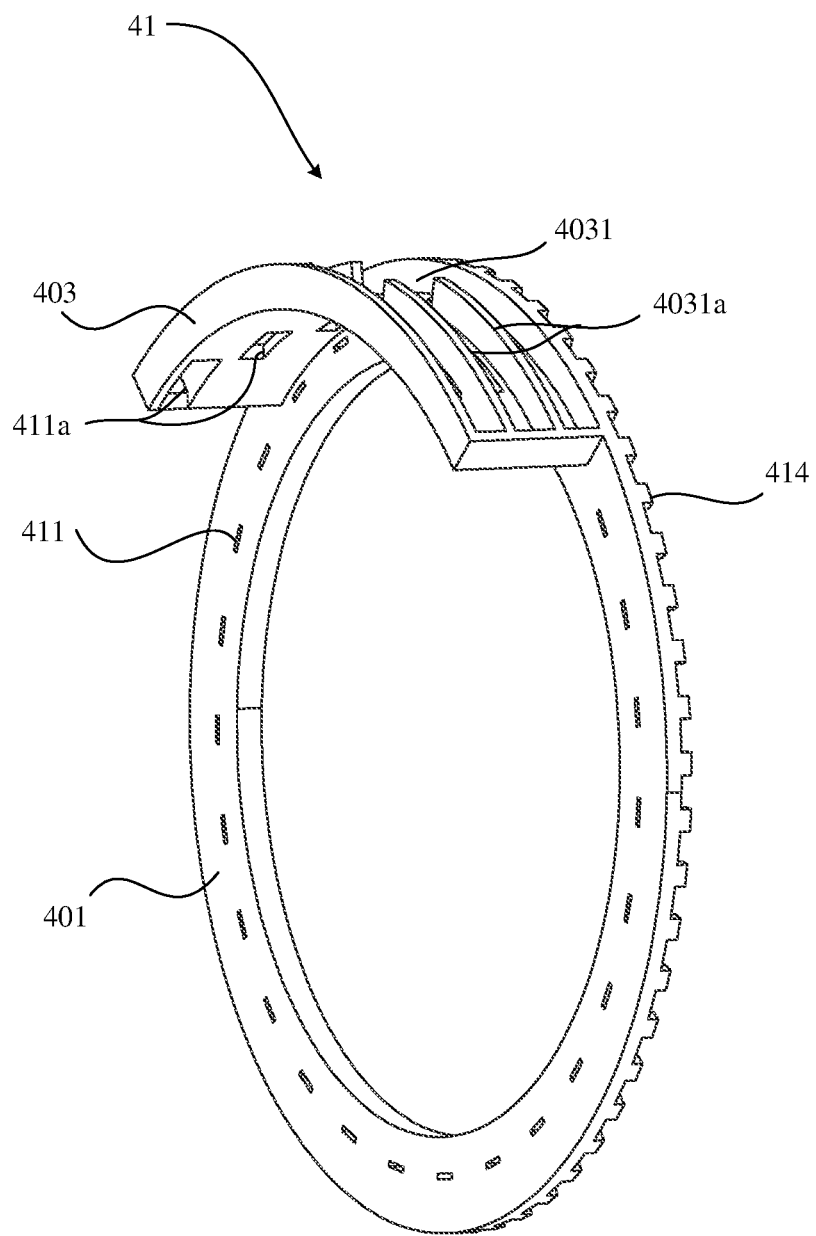
FIG. 53 is a schematic diagram of a structure of a first end cap in a motor according to an embodiment.
Figure 54:
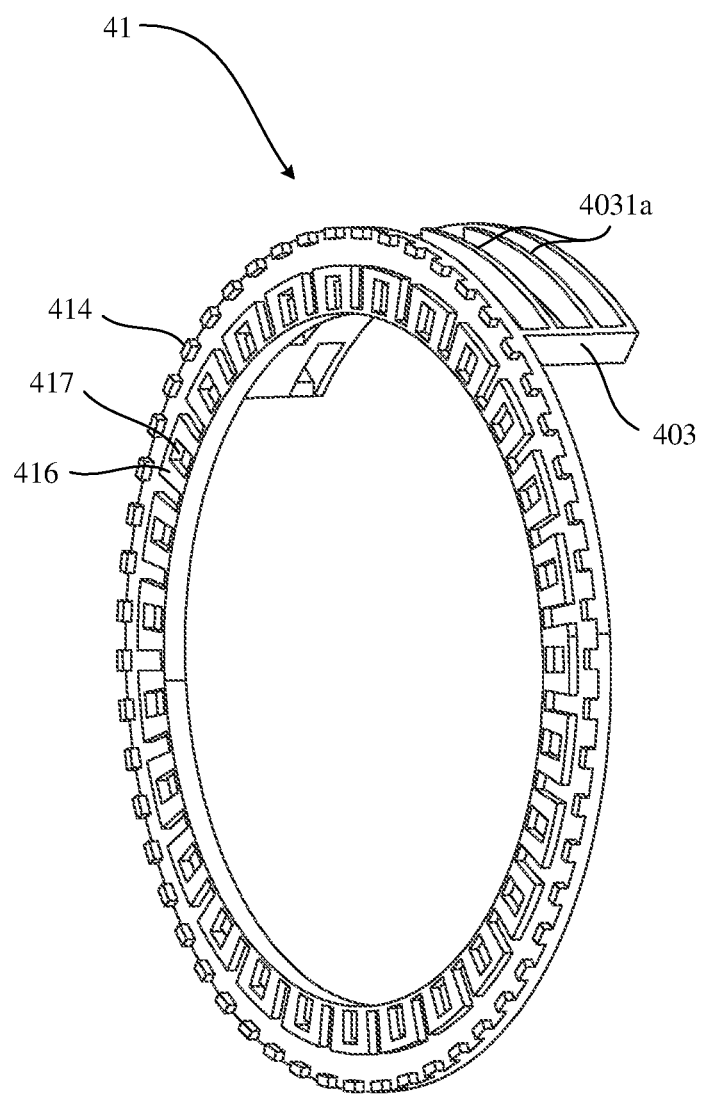
FIG. 54 is a schematic diagram of a structure of a first end cap, which is in a motor, in another direction according to an embodiment.
Figure 55:
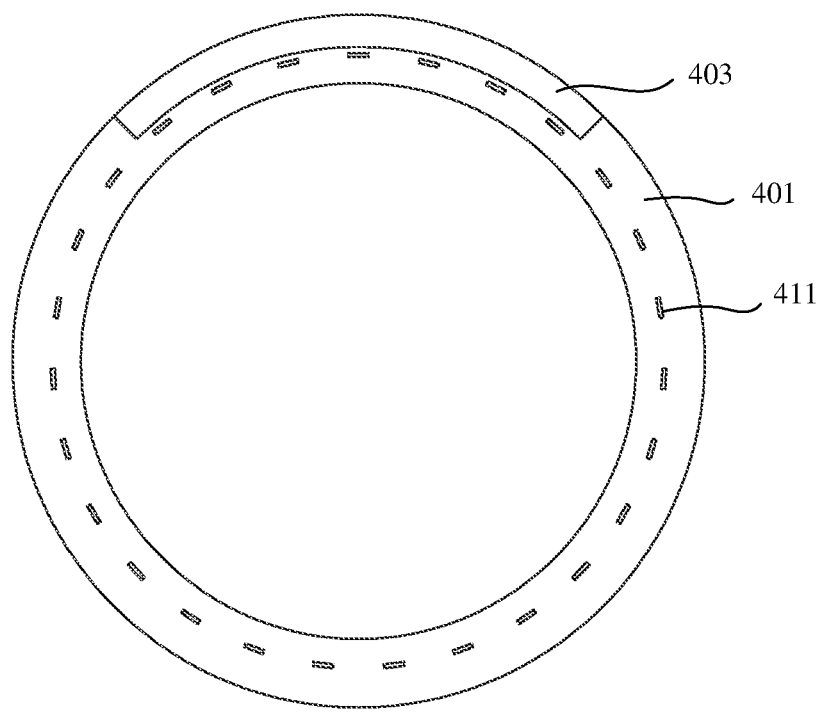
FIG. 55 is a schematic diagram of a front side structure of a first end cap in a motor according to an embodiment.

In this embodiment, FIG. 52 shows a structure of a stator after the housing 10 in FIG. 51 is removed, and FIG. 53 shows a structure of the first end cap 41. Referring to FIG. 51, FIG. 52, and FIG. 53, both the first extension plate 403 and the second extension plate 404 are arc segments, that is, the first extension plate 403 and the second extension plate 404 are of non-circular structures. The first extension plate 403 and the second extension plate 404 are located at top outer edges of the first annular end plate 401 and the second annular end plate 402, respectively. Referring to FIG. 54 and FIG. 55, one segment, namely, the first extension plate 403, is disposed along the outer edge of the first annular end plate 401, and the first extension plate 403 may be located over the first end part 31. Correspondingly, one segment, namely, the second extension plate 404, is disposed along the outer edge of the second annular end plate 402, and the second extension plate 404 may be located over the second end part 32.

The first oil injection chamber 405 formed between the third groove 4031 provided on the first extension plate 403 and the housing 10 is a non-circular chamber, and the second oil injection chamber 406 formed between the fourth groove 4041 provided on the second extension plate 404 and the inner surface of the housing 10 is also a non-circular chamber. The plurality of first nozzles 411 and the plurality of second nozzles 421 are respectively disposed on the first annular end plate 401 and the second annular end plate 402.

For a configuration manner thereof, reference may be made to the foregoing embodiments. Details are not described in this embodiment again.

Figure 56:
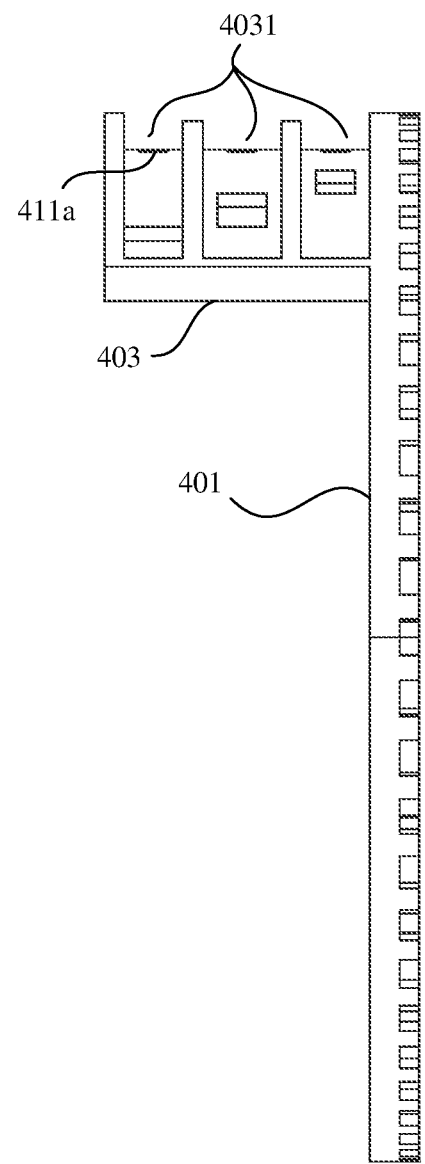
FIG. 56 is a schematic side view of a first end cap in a motor according to an embodiment.
Figure 57:
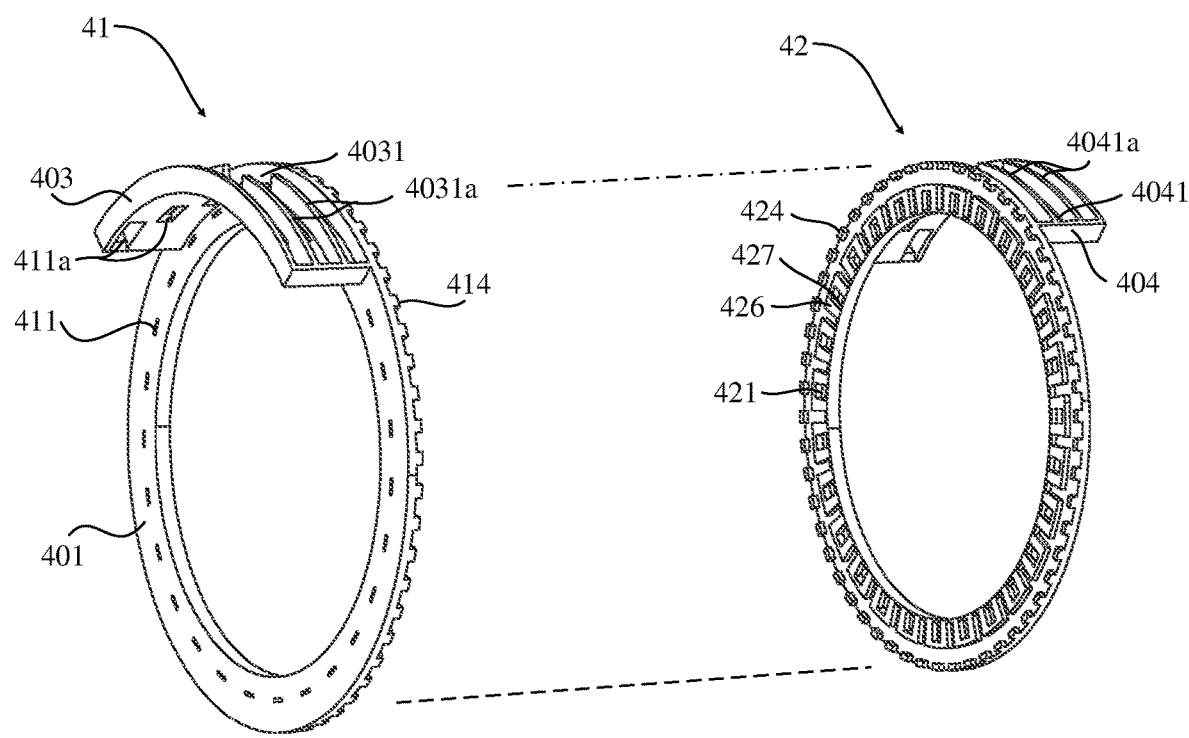
FIG. 57 is a schematic diagram of structures of a first end cap and a second end cap in a motor according to an embodiment.

Referring to FIG. 56, the third groove 4031 is provided on the first extension plate 403, and a plurality of separators 4031a are disposed at intervals in the third groove 4031. Referring to FIG. 57, the fourth groove 4041 is provided on the second extension plate 404, and a plurality of separators 4041a may be disposed at intervals in the fourth groove 4041. The separators 4031a and the separators 4041a respectively divide inner parts of the third groove 4031 and the fourth groove 4041 into a plurality of grooves. In this way, the cooling oil entering the first oil injection chamber 405 and the second oil injection chamber 406 can enter all the grooves in the first oil injection chamber 405 and the second oil injection chamber 406 because of separation by the separators 4031a and the separators 4041a.

Figure 58:
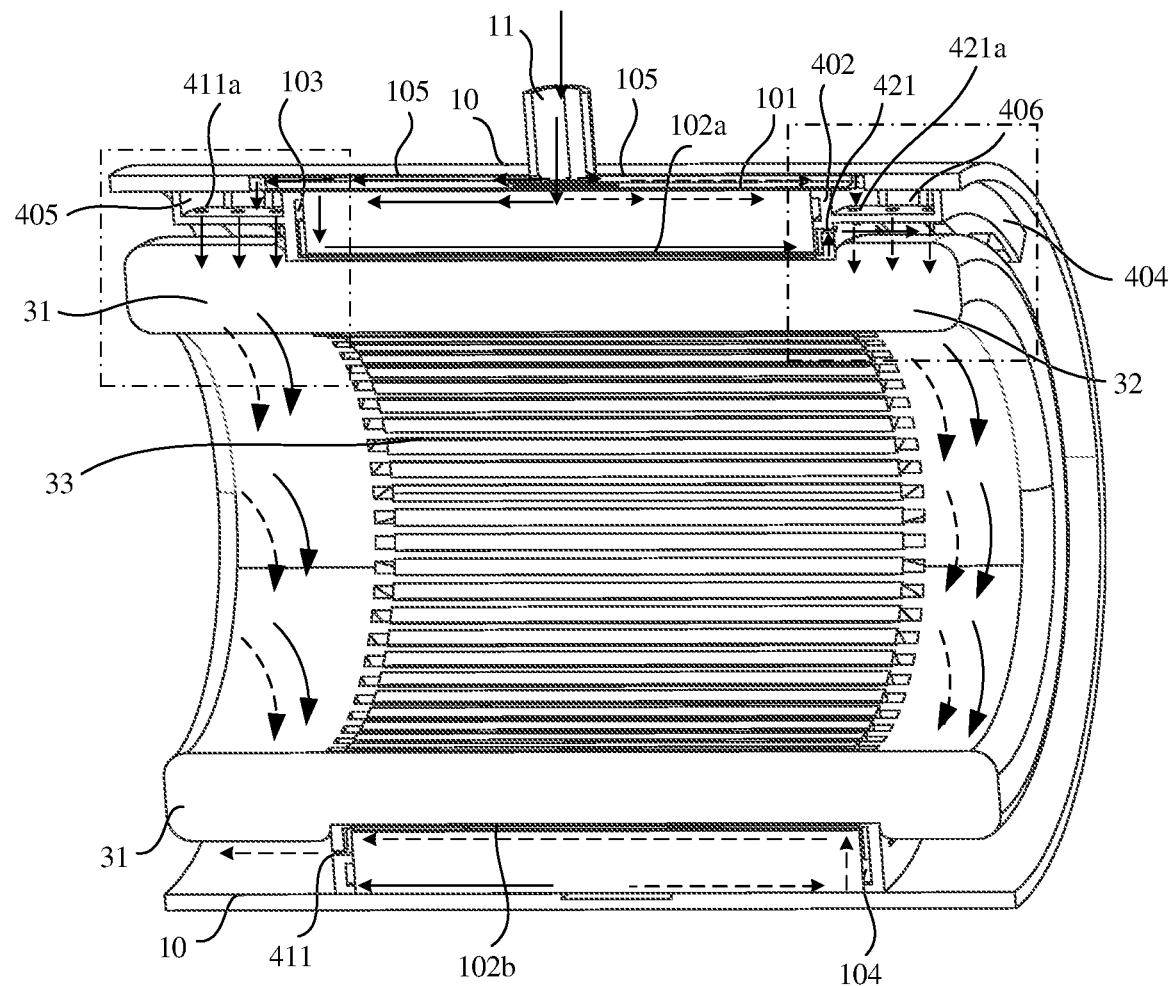
FIG. 58 is a schematic diagram of a cross-section of a motor according to an embodiment.

Referring to FIG. 58, a plurality of rows of third nozzles 411a may be provided on the first extension plate 403, and a plurality of rows of fourth nozzles 421a may be provided on the second extension plate 404. The plurality of rows of third nozzles 411a may be connected to each of the grooves obtained through separation in the first oil injection chamber 405, and the plurality of rows of fourth nozzles 421a may be connected to each of the grooves obtained through separation in the second oil injection chamber 406, so that the cooling oil can be sprayed out from the third nozzles 411a and the fourth nozzles 421a at different locations to the first end part 31 and the second end part 32. After being sprayed out to tops of the first end part 31 and the second end part 32, the cooling oil flows down under the action of gravity (refer to solid arrows above the first end part 31 and dashed arrows above the second end part 32 of the coil winding 30 in FIG. 58), to perform heat dissipation on the other portions of the first end part 31 and the second end part 32. Therefore, in this embodiment, the cooling oil sprayed out from the third nozzles 411a and the fourth nozzles 421a cools the first end part 31 and the second end part 32 of the coil winding 30 in a spray cooling manner.

Figure 59:
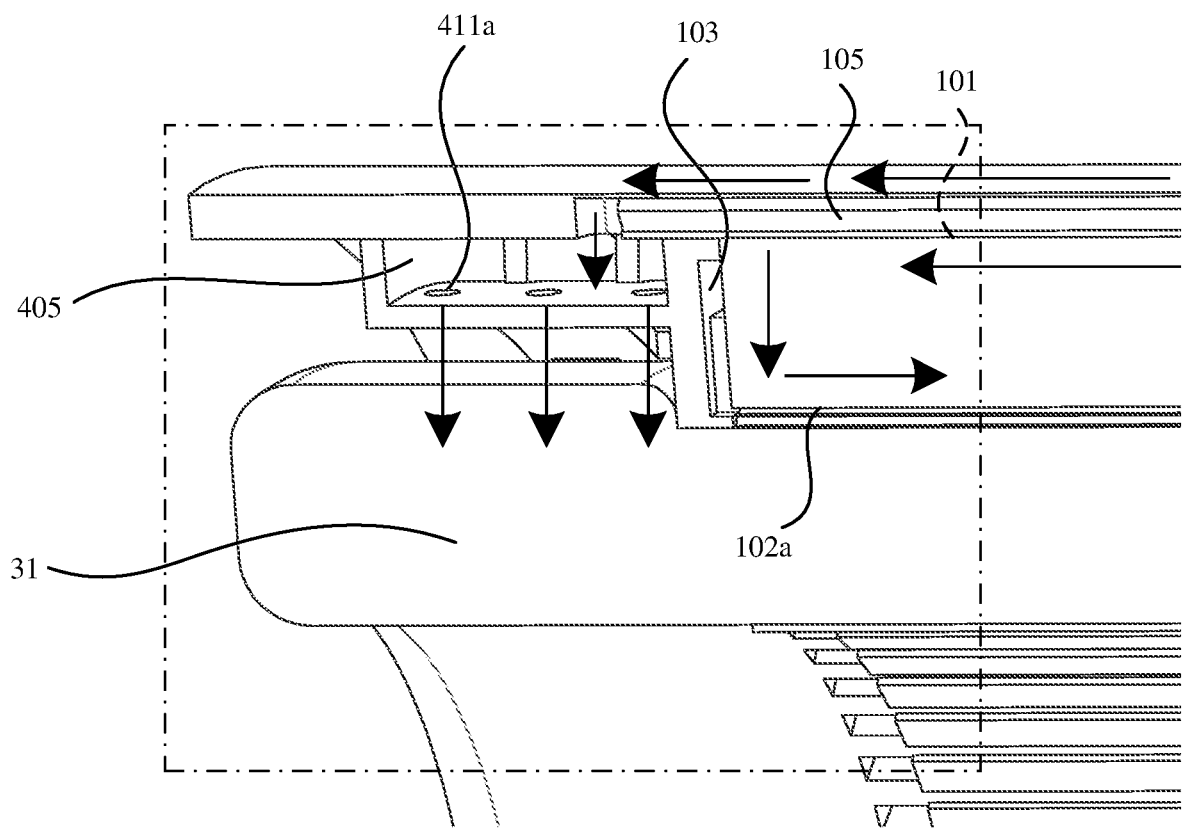
FIG. 59 is an enlarged schematic diagram of a dashed-line box portion in an upper left corner in FIG. 58.

In this embodiment, when the first oil injection chamber 405 and the second oil injection chamber 406 are connected to the oil filling port 11, a third possible implementation is as follows: Referring to FIG. 58, a fifth oil channel 105 is disposed in the housing 10, and the fifth oil channel 105 is connected to all of the oil filling port 11, the first oil injection chamber 405, and the second oil injection chamber 406. In other words, the first oil injection chamber 405 and the second oil injection chamber 406 are connected to the oil filling port 11 through the fifth oil channel 105 in the housing 10. As shown in FIG. 58, after the cooling oil is injected from the oil filling port 11, a part of the cooling oil enters the fifth oil channel 105, and the other part of the cooling oil enters the plurality of first oil channels 101. As shown in FIG. 59, a part of the cooling oil enters the first oil injection chamber 405 through the fifth oil channel 105 along solid arrows and is sprayed out from the third nozzle 411a to the first end part 31. In addition, the other part of the cooling oil enters the third oil channel 103, which is connected to some of the second oil channels 102a, through the first oil channel 101 along solid arrows, and finally is sprayed from the second nozzle 421 to the second end part 32 (refer to FIG. 58). The cooling oil flows at the second end part 32 to a bottom end of the second end part 32 along arrows in FIG. 58 under the action of gravity.

Figure 60:
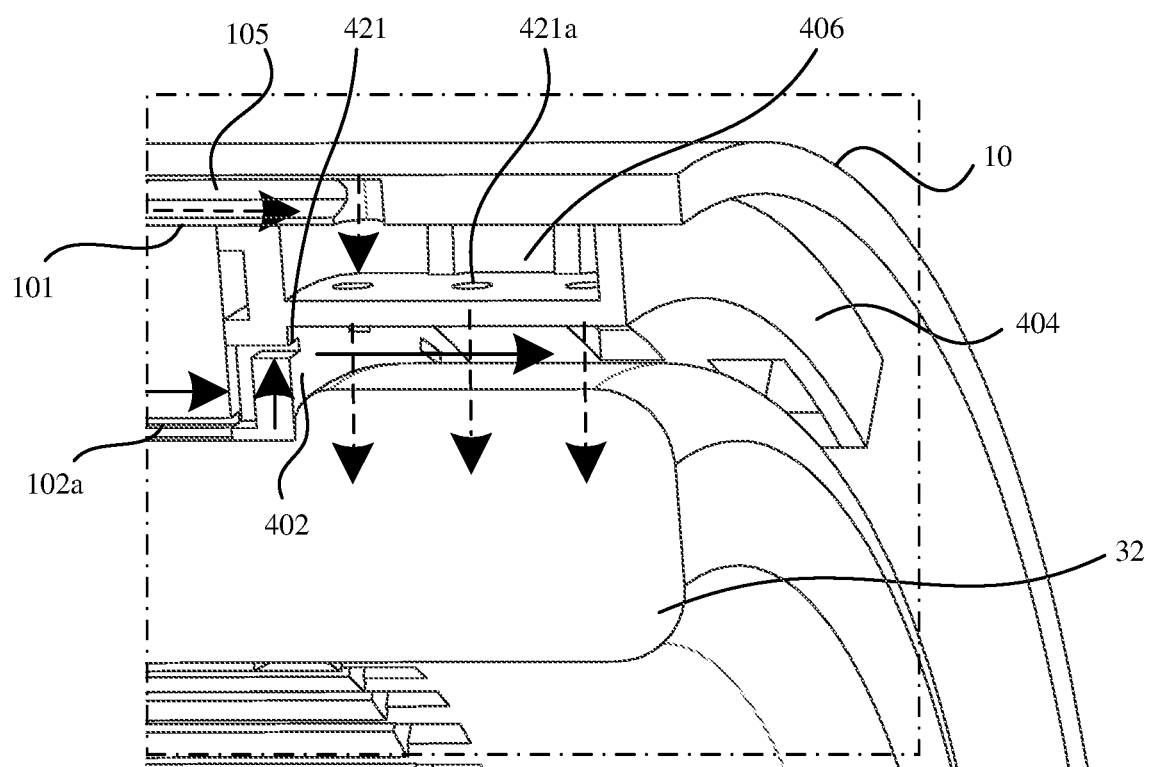
FIG. 60 is an enlarged schematic diagram of a dashed-line box portion in an upper right corner in FIG. 58.

Referring to FIG. 60, a part of the cooling oil enters the second oil injection chamber 406 through the fifth oil channel 105 along dashed arrows and is sprayed out from the fourth nozzle 421a to the second end part 32. In addition, the other part of the cooling oil passes through the second oil channel 102a along a solid arrow and is sprayed out from the second nozzle 421 to the second end part 32. It should be noted that the cooling oil may be sprayed out from the first nozzles 411 connected to some of the second oil channels 102b to the first end part 31 (refer to FIG. 58).

It should be noted that, in this embodiment, the first oil injection chamber 405 and the second oil injection chamber 406 may alternatively not be disposed. For example, the first end cap 41 includes only the first annular end plate 104, the second end cap 42 includes only the second annular end plate 402, and the first extension plate 403 and the second extension plate 404 are not disposed. In this case, openings at two ends of the fifth oil channel 105 respectively face the first end part 31 and the second end part 32 of the coil winding 30, and the oil is sprayed out to the first end part 31 and the second end part 32 of the coil winding 30 through the two openings of the fifth oil channel 105. The coolant flows down at the tops of the first end part 31 and the second end part 32 of the coil winding 30 under the action of gravity and cools the other portions of the first end part 31 and the second end part 32 of the coil winding 30 in a spray cooling manner.

An embodiment further provides a powertrain. The powertrain can be applied to an electric vehicle (EV), a pure electric vehicle (PEV/BEV), a hybrid electric vehicle (HEV), a range extended electric vehicle (REEV), a plug-in hybrid electric vehicle (PHEV), a new energy vehicle, and the like, or can be applied to devices such as a battery management device, a motor & driver, and a power converter.

Referring to FIG. 17, the powertrain includes at least a reducer and the motor 100 according to any one of the foregoing embodiments. The motor 100 is connected to the reducer (not shown) through a rotating shaft. An output shaft of the motor 100 is connected to the reducer, or the reducer may be integrated with the motor 100 into a powertrain 100.

In the powertrain provided in this embodiment, the motor 100 is included, so that double-layer oil channels are formed at an outer surface of a stator core 20 and a root of a coil slot 23 of the stator core 20. In this way, a first oil channel 101 can cool the outer surface of the stator core 20, and a second oil channel 102 can dissipate heat around the coil slot 23 of the stator core 20 and heat of a coil winding 30. After cooling oil is injected from an oil filling port 11, a flow direction of the cooling oil in some of second oil channels 102 is opposite to that of cooling oil in a remaining second oil channel 102, so that interleaved reverse flows are implemented, and axial temperature of the stator core 20 and the coil winding 30 is more even. This ensures effective cooling of the stator core 20 and the coil winding 30, thereby ensuring a heat dissipation requirement of the motor 100 in low-speed high-torque and high rotational speed conditions. In addition, the powertrain can be miniaturized, and a desirable heat dissipation capability and heat dissipation effect of the powertrain is ensured, thereby improving performance of the powertrain.

An embodiment may further provide a device. The device may be an electric vehicle (EV), a pure electric vehicle (PEV/BEV), a hybrid electric vehicle (HEV), a range extended electric vehicle (REEV), a plug-in hybrid electric vehicle (PHEV), a new energy vehicle, or the like.

The device includes at least a wheel, a transmission component, and the motor 100 according to any one of the foregoing embodiments, where the motor 100 is connected to the wheel through the transmission component. A rotating shaft of the motor 100 rotates to output power, and the transmission component transfers the power to the wheel to rotate the wheel. An output shaft of the motor 100 may be connected to a reducer, and the reducer may be connected to the transmission component.

In the device provided in this embodiment, the motor 100 is included, so that double-layer oil channels are formed at an outer surface of a stator core 20 and a root of a coil slot 23 of the stator core 20. In this way, a first oil channel 101 can cool the outer surface of the stator core 20, and a second oil channel 102 can dissipate heat around the coil slot 23 of the stator core 20 and heat of a coil winding 30. After cooling oil is injected from an oil filling port 11, a flow direction of the cooling oil in some of second oil channels 102 is opposite to that of cooling oil in a remaining second oil channel 102, so that interleaved reverse flows are implemented, and axial temperature of the stator core 20 and the coil winding 30 is more even. This ensures effective cooling of the stator core 20 and the coil winding 30, thereby ensuring a heat dissipation requirement of the motor 100 in low-speed high-torque and high rotational speed conditions, ensuring a desirable heat dissipation effect and heat dissipation capability of the device in different working conditions, and improving working performance of the device.

In the descriptions of the embodiments, it should be noted that, unless otherwise clearly specified and limited, terms "mount", "connect", and "link" should be understood in a broad sense. For example, the terms may mean a fixed connection, an indirect connection through an intermediary, an internal connection between two elements, or an interaction relationship between two elements. Persons of ordinary skill in the art can understand meanings of the terms in the embodiments.

In the embodiments and accompanying drawings, terms such as "first", "second", "third", and "fourth" (if any) are intended to distinguish between similar objects but do not necessarily indicate an order or sequence.

Further, it should be noted that the foregoing embodiments are merely intended to describe the embodiments but not to limit them. Although the embodiments are described in detail, persons of ordinary skill in the art should understand that they can still make modifications to the solutions described in the foregoing embodiments or make equivalent replacements to some or all features thereof, without departing from the scope of the embodiments.

The invention claimed is:

1. A motor, comprising a housing, wherein at least a stator is disposed in the housing, the stator comprises a stator core and a coil winding, an inner surface of the stator core is provided with a plurality of coil slots disposed at intervals, and the coil winding is partially located inside the coil slots;
   a plurality of first oil channels is formed between an inner surface of the housing and an outer surface of the stator core, wherein the plurality of first oil channels is circumferentially disposed at intervals along a periphery of the stator core, and the first oil channels are all connected to an oil filling port provided on the housing;
   second oil channels are formed at slot bottoms of at least some of the coil slots, the slot bottoms is the part of the coil slots that is farthest from the center axis of the stator core; and
   one end of the plurality of first oil channels is connected to one end of some of the second oil channels, the other end of the some of the second oil channels is connected to nozzles at one end of the motor, the other end of the plurality of first oil channels is connected to one end of a remaining second oil channel, and the other end of the remaining second oil channel is connected to nozzles at the other end of the motor;
   a first end cap and a second end cap are respectively located at two ends of the stator core, the first end cap is provided with a plurality of first nozzles disposed at intervals, and the second end cap is provided with a plurality of second nozzles disposed at intervals; or
   a first end cap of the motor comprises at least a first annular end plate, a second end cap of the motor comprises at least a second annular end plate, a plurality of first nozzles is circumferentially disposed at intervals along the first annular end plate, a plurality of second nozzles is circumferentially disposed at intervals along the second annular end plate, orthographic projections of the plurality of second nozzles towards the first annular end plate and the plurality of first nozzles are circumferentially arranged alternately on the first annular end plate.

2. The motor according to claim 1,
   When the first end cap is provided with a plurality of first nozzles disposed at intervals, and the second end cap is provided with a plurality of second nozzles disposed at intervals, wherein:
   one end of the plurality of first oil channels is connected to one end of the some of the second oil channels through the first end cap, and the other end of the some of the second oil channels is connected to the plurality of second nozzles; and
   the other end of the plurality of first oil channels is connected to one end of the remaining second oil channel through the second end cap, and the other end of the remaining second oil channel is connected to the plurality of first nozzles.

3. The motor according to claim 2, wherein a third oil channel is formed between the first end cap and one end face of the stator core;
   a fourth oil channel is formed between the second end cap and the other end face of the stator core;
   one end of the plurality of first oil channels is connected to one end of the some of the second oil channels through the third oil channel, and the other end of the plurality of first oil channels is connected to one end of the remaining second oil channel through the fourth oil channel; and
   the first nozzle is spaced from the third oil channel and is connected to the fourth oil channel, and the second nozzle is spaced from the fourth oil channel and is connected to the third oil channel.

4. The motor according to claim 3, wherein when the first end cap comprises at least a first annular end plate and the second end cap comprises at least a second annular end plate, the third oil channel is formed between the first annular end plate and one end face of the stator core; and
   the fourth oil channel is formed between the second annular end plate and the other end face of the stator core.

5. The motor according to claim 4, wherein an inner edge of the first annular end plate is provided with a plurality of first separation blocks disposed at intervals, one end of the first separation block abuts on one end face of the stator core, the first separation block is provided with the first nozzle, and the first nozzle is separated from the third oil channel by using the first separation block; and
   an inner edge of the second annular end plate is provided with a plurality of second separation blocks disposed at intervals, one end of the second separation block abuts on the other end face of the stator core, the second separation block is provided with the second nozzle, and the second nozzle is separated from the fourth oil channel by using the second separation block.

6. The motor according to claim 5, wherein the first separation block is provided with a first recessed portion, and the first nozzle is located at the first recessed portion; and the second separation block is provided with a second recessed portion, and the second nozzle is located at the second recessed portion.

7. The motor according to claim 4, wherein the first end cap further comprises an axially protruded first extension plate connected to an outer edge of the first annular end plate, and the second end cap further comprises an axially protruded second extension plate connected to an outer edge of the second annular end plate;

a first oil injection chamber is formed between an outer surface of the first extension plate and the housing, and the first extension plate is provided with a third nozzle connected to the first oil injection chamber;

a second oil injection chamber is formed between an outer surface of the second extension plate and the housing, and the second extension plate is provided with a fourth nozzle connected to the second oil injection chamber; and both the first oil injection chamber and the second oil injection chamber are connected to the oil filling port.

8. The motor according to claim 7, wherein both the first extension plate and the second extension plate are of annular structures, and both the first oil injection chamber and the second oil injection chamber are annular chambers.

9. The motor according to claim 7, wherein both the first extension plate and the second extension plate are arc segments, and the first extension plate and the second extension plate are located at top outer edges of the first annular end plate and the second annular end plate, respectively.

10. The motor according to claim 7, wherein a plurality of first through grooves and a plurality of second through grooves are provided on the outer surfaces of the first extension plate and the second extension plate, respectively;

two ends of the plurality of first through grooves are connected to the first oil injection chamber and one end of the plurality of first oil channels, respectively; and two ends of the plurality of second through grooves are connected to the second oil injection chamber and the other end of the plurality of first oil channels, respectively.

11. The motor according to claim 7, wherein a fifth oil channel is disposed in the housing, and the fifth oil channel is connected to all of the oil filling port, the first oil injection chamber, and the second oil injection chamber.

12. The motor according to claim 4, wherein the first end cap further comprises an axially protruded first extension plate connected to an outer edge of the first annular end plate, and the second end cap further comprises an axially protruded second extension plate connected to an outer edge of the second annular end plate;

a first oil injection chamber is formed between an outer surface of the first extension plate and the housing, and the first extension plate is provided with the plurality of first nozzles connected to the first oil injection chamber; and a second oil injection chamber is formed between an outer surface of the second extension plate and the housing, and the second extension plate is provided with the plurality of second nozzles connected to the second oil injection chamber.

13. The motor according to claim 12, wherein a plurality of sixth oil channels is disposed in the first annular end plate, and two ends of the plurality of sixth oil channels are connected to the first oil injection chamber and the some of the second oil channels, respectively; and a plurality of seventh oil channels is disposed in the second annular end plate, and two ends of the plurality of seventh oil channels are connected to the second oil injection chamber and the remaining second oil channel, respectively.

14. The motor according to claim 13, wherein a plurality of first grooves is provided on the outer surface of the first extension plate, and two ends of the first groove are connected to the sixth oil channel and the first oil injection chamber, respectively; and a plurality of second grooves is provided on the outer surface of the second extension plate, and two ends of the second groove are connected to the seventh oil channel and the second oil injection chamber, respectively.

15. The motor according to claim 14, wherein oil outlet ports are respectively provided on groove walls that are of the first groove and the second groove and that are close to the stator core, the oil outlet port on the first groove is connected to the sixth oil channel, and the oil outlet port on the second groove is connected to the seventh oil channel;

surfaces that are of the first annular end plate and the second annular end plate and that face the stator core are respectively provided with a plurality of first separation blocks disposed at intervals and a plurality of second separation blocks disposed at intervals, a first oil inlet port connected to the sixth oil channel is provided on the first separation block, and a second oil inlet port connected to the seventh oil channel is provided on the second separation block;

the plurality of sixth oil channels is connected to the some of the second oil channels through the first oil inlet port; and the plurality of seventh oil channels is connected to the remaining second oil channel through the second oil inlet port.

16. The motor according to claim 7, wherein a third groove is provided on the outer surface of the first extension plate, and the first oil injection chamber is enclosed by the third groove and the inner surface of the housing; and a fourth groove is provided on the outer surface of the second extension plate, and the second oil injection chamber is enclosed by the fourth groove and the inner surface of the housing.

17. The motor according to claim 1, wherein a plurality of oil grooves is provided on the outer surface of the stator core, the plurality of oil grooves is circumferentially disposed at intervals along the periphery of the stator core, and two ends of each oil groove extend to two end faces of the stator core; and the first oil channel is enclosed by the oil groove and the inner surface of the housing.

18. A powertrain, comprising at least a reducer and a motor, wherein the motor is connected to the reducer through a rotating shaft, wherein the motor comprises a housing, wherein at least a stator is disposed in the housing, the stator comprises a stator core and a coil winding, an inner surface of the stator core is provided with a plurality of coil slots disposed at intervals, and the coil winding is partially located inside the coil slots;

a plurality of first oil channels is formed between an inner surface of the housing and an outer surface of the stator core, wherein the plurality of first oil channels is circumferentially disposed at intervals along a periphery of the stator core, and the first oil channels are all connected to an oil filling port provided on the housing;

second oil channels are formed at slot bottoms of at least some of the coil slots, the slot bottoms is the part of the coil slots that is farthest from the center axis of the stator core; and one end of the plurality of first oil channels is connected to one end of some of the second oil channels, the other end of the some of the second oil channels is connected to nozzles at one end of the motor, the other end of the plurality of first oil channels is connected to one end of a remaining second oil channel, and the other end of the remaining second oil channel is connected to nozzles at the other end of the motor;

a first end cap and a second end cap are respectively located at two ends of the stator core, the first end cap is provided with a plurality of first nozzles disposed at intervals, and the second end cap is provided with a plurality of second nozzles disposed at intervals; or a first end cap of the motor comprises at least a first annular end plate, a second end cap of the motor comprises at least a second annular end plate, a plurality of first nozzles is circumferentially disposed at intervals along the first annular end plate, a plurality of second nozzles is circumferentially disposed at intervals along the second annular end plate, orthographic projections of the plurality of second nozzles towards the first annular end plate and the plurality of first nozzles are circumferentially arranged alternately on the first annular end plate.

\* \* \* \* \*